United States Patent
Taneja et al.

(10) Patent No.: US 7,406,098 B2
(45) Date of Patent: Jul. 29, 2008

(54) RESOURCE ALLOCATION IN A COMMUNICATION SYSTEM SUPPORTING APPLICATION FLOWS HAVING QUALITY OF SERVICE REQUIREMENTS

(75) Inventors: Mukesh Taneja, San Diego, CA (US); Rajesh Pankaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 991 days.

(21) Appl. No.: 10/425,895

(22) Filed: Apr. 28, 2003

(65) Prior Publication Data

US 2003/0198204 A1    Oct. 23, 2003

Related U.S. Application Data

(63) Continuation-in-part of application No. 10/007,297, filed on Nov. 8, 2001, now Pat. No. 6,993,006, which is a continuation of application No. 09/479,735, filed on Jan. 7, 2000, now Pat. No. 6,393,012, which is a continuation-in-part of application No. 09/229,432, filed on Jan. 13, 1999, now Pat. No. 6,229,795.

(60) Provisional application No. 60/455,906, filed on Mar. 17, 2003.

(51) Int. Cl.
*H04J 3/16* (2006.01)
*H04J 3/22* (2006.01)

(52) U.S. Cl. .................. 370/468; 370/338; 370/349

(58) Field of Classification Search ......... 370/229–236, 370/389, 401, 341, 412, 413, 428, 349, 338, 370/468, 329, 431
See application file for complete search history.

(56) References Cited

U.S. PATENT DOCUMENTS

| 4,901,307 A | 2/1990 | Gilhousen et al. |
| 5,056,109 A | 10/1991 | Gilhousen et al. |
| 5,103,459 A | 4/1992 | Gilhousen et al. |
| 5,267,261 A | 11/1993 | Blakeney, II et al. |

(Continued)

FOREIGN PATENT DOCUMENTS

CN    1408193    4/2003

(Continued)

OTHER PUBLICATIONS

"TIA/EIA/IS-95A Mobile Station-Base Station Compatibility Standard for Dual-Mode Wideband Spread Spectrum Cellular System".

(Continued)

*Primary Examiner*—Ajit Patel
(74) *Attorney, Agent, or Firm*—Bruce W. Greenhaus; Donald C. Kordich; Thomas R. Rouse

(57) ABSTRACT

A method and apparatus for allocating and using a resource to transmit wireless information signals to a plurality of subscriber units wherein application flows are selected based on associated Quality of Service (QoS) requirements. Compensation factors are evaluated for a plurality of QoS requirements. For a violation of a given QoS requirement, the corresponding compensation factor is calculated and applied to an adaptive weight, else the compensation factor is set to a default value.

46 Claims, 37 Drawing Sheets

U.S. PATENT DOCUMENTS

| | | | |
|---|---|---|---|
| 5,414,796 A | 5/1995 | Jacobs et al. | |
| 5,504,773 A | 4/1996 | Padovani et al. | |
| 5,859,835 A | 1/1999 | Varma et al. | |
| 5,870,629 A | 2/1999 | Borden et al. | |
| 5,923,650 A | 7/1999 | Chen et al. | |
| 5,933,462 A | 8/1999 | Viterbi et al. | |
| 5,982,758 A | 11/1999 | Hamdy | |
| 6,028,852 A | 2/2000 | Miya et al. | |
| 6,031,827 A | 2/2000 | Rikkinen et al. | |
| 6,064,678 A | 5/2000 | Sindhushayana et al. | |
| 6,067,301 A | 5/2000 | Aatresh | |
| 6,069,872 A | 5/2000 | Bonomi et al. | |
| 6,072,800 A | 6/2000 | Lee | |
| 6,101,193 A | 8/2000 | Ohba | |
| 6,122,291 A | 9/2000 | Robinson et al. | |
| 6,128,280 A | 10/2000 | Jamoussi et al. | |
| 6,157,654 A | 12/2000 | Davis | |
| 6,229,795 B1 | 5/2001 | Pankaj et al. | |
| 6,335,922 B1 | 1/2002 | Tiedemann, Jr. et al. | |
| 6,452,933 B1 | 9/2002 | Duffield et al. | |
| 6,526,060 B1 | 2/2003 | Hughes et al. | |
| 6,574,211 B2 | 6/2003 | Padovani et al. | |
| 7,058,027 B1 | 6/2006 | Alessi et al. | |
| 7,092,395 B2 | 8/2006 | He et al. | |
| 7,197,025 B2 | 3/2007 | Chuah | |
| 2001/0046208 A1* | 11/2001 | Eng et al. | 370/229 |
| 2002/0057706 A1 | 5/2002 | Michiel | |
| 2002/0061007 A1* | 5/2002 | Pankaj | 370/342 |
| 2002/0181494 A1 | 12/2002 | Rhee | |
| 2004/0013089 A1* | 1/2004 | Taneja et al. | 370/235 |
| 2004/0022191 A1 | 2/2004 | Bernet et al. | |
| 2005/0030896 A1* | 2/2005 | Bahl et al. | 370/231 |
| 2005/0083936 A1 | 4/2005 | Ma | |
| 2006/0159019 A1* | 7/2006 | Buskirk et al. | 370/235 |

FOREIGN PATENT DOCUMENTS

| | | |
|---|---|---|
| EP | 0886403 | 12/1998 |
| JP | 10084383 | 3/1998 |
| WO | 9637081 | 11/1996 |
| WO | 9835514 | 8/1998 |
| WO | 9845966 | 10/1998 |
| WO | 0160110 | 8/2001 |
| WO | 0163849 | 8/2001 |
| WO | 02056564 | 7/2002 |

OTHER PUBLICATIONS

Cain, et al. "Traffic Scheduling and Fairness for GPRA Air Interface" IEEE Conf. 50: 834-838 (Sep. 19-22, 1999, Amsterdam).

Douglas C. Schmidt, David L. Levine, Sumedh Mungee: "The design of the Tao real-time object request broker," Elsevier Computer Communications, No. 21, 1998, p. 1-31.

European Search Report EP05011081, Nov. 10, 2006.

International Search Report PCT/US00/00801, International Search Authority-EPO, Jul. 25, 2000.

International Search Report PCT/US01/00576, International Search Authority-EPO, May 11, 2001.

Leong C W et al., "Call admission control for voice and data traffic in wireless communication" Computer Communications, Elsevier Science Publishers BV, Amsterdam, NL Vol. 25, No. 10 Jun. 15, 2002 pp. 972-979.

International Search Report-PCT/US/2004/008283, International Search Authority EPO, Nov. 26, 2004.

Kadelka et al., "Serving IP quality of service with HiperLAN/2," Computer Networks, Elesevier Science Publishers B.V., Amsterdam, Netherlands, Vol. 37, No. 1, Sep. 2000 pp. 17-24.

* cited by examiner

| MODE | QoS REQUIREMENTS | QoS PARAMETERS |
|---|---|---|
| I | HIGH DELAY SENSITIVITY | RATE, DELAY, JITTER |
| II | MEDIUM DELAY SENSITIVITY | RATE, AVERAGE DELAY |
| III | RATE SENSITIVE | RATE |
| IV | NO QoS SPECIFIED | NONE |

FIG. 19

RESOURCE ALLOCATION IN A COMMUNICATION SYSTEM SUPPORTING APPLICATION FLOWS HAVING QUALITY OF SERVICE REQUIREMENTS

CLAIM OF PRIORITY UNDER 35 U.S.C. §119

The Present Application for Patent is a Continuation-in-part of patent application Ser. No. 10/007,297 entitled, "System for Allocating Resources in a Communication System," filed Nov. 8, 2001, now U.S. Pat. No. 6,993,006, which is a Continuation of patent application Ser. No. 09/479,735, filed on Jan. 7, 2000, now U.S. Pat. 6,393,012, which is a Continuation-in-part of patent application Ser. No. 09/229,432, filed on Jan. 13, 1999, now U.S. Pat. No. 6,229,795, all assigned to the assignee hereof, and hereby expressly incorporated by reference herein.

CLAIM OF PRIORITY UNDER 35 U.S.C. §120

The present Application for patent claims priority to patent application Ser. No. 10/007,297 entitled, "System for Allocating Resources in a Communication System," filed Nov. 8, 2001, assigned to the assignee hereof, and hereby expressly incorporated by reference herein.

REFERENCE TO CO-PENDING APPLICATION FOR PATENT

The present application for patent is related to the co-pending U.S. patent application entitled "Admission Control and Resource Allocation in a Communication System Supporting Application Flows Having Quality of Service Requirements," having Ser. No. 10/425,854, filed concurrently herewith, assigned to the assignee hereof, and hereby expressly incorporated by reference herein.

BACKGROUND

1. Field of the Invention

The present application relates to communication systems. Particularly, these embodiments are directed to allocating communication resources among the plurality of subscribers to a communication system.

2. Related Art

Several solutions have been presented to address the problem of allocating limited communication resources provided by a single node in a communication system among a plurality of subscribers. It is an objective of such systems to provide sufficient resources at the nodes to satisfy the requirements of all subscribers while minimizing costs. Accordingly, such systems are typically designed with the objective of efficient allocation of resources among the various subscribers.

Various systems have implemented a Frequency Division Multiple Access (FDMA) scheme, which allocates resources to each of the subscribers concurrently. A communication node in such systems typically has a limited bandwidth for either transmitting information to or receiving information from each subscriber in the network at any point in time. This scheme typically involves allocating distinct portions of the total bandwidth to the individual subscribers. While such a scheme may be effective for systems in which subscribers require uninterrupted communication with the communication node, better utilization of the total bandwidth may be achieved when such constant, uninterrupted communication is not required.

Other schemes for allocating communication resources of a single communication node among a plurality of subscribers includes Time Division Multiple Access (TDMA) schemes. These TDMA schemes are particularly effective in allocating the limited bandwidth resources of a single communication node among a plurality of subscribers, which do not require constant, uninterrupted communication with the single communication node. TDMA schemes typically dedicate the entire bandwidth of the single communication node to each of the subscribers at designated time intervals. In a wireless communication system which employs a Code Division-Multiple Access (CDMA) scheme, this may be accomplished by assigning to each of the subscriber units all code channels at the designated time intervals on a time multiplexed basis. The communication node implements the unique carrier frequency or channel code associated with the subscriber to enable exclusive communication with the subscriber. TDMA schemes may also be implemented in land line systems using physical contact relay switching or packet switching.

TDMA systems typically allocate equal time intervals to each subscriber in a round robin fashion. This may result in an under utilization of certain time intervals by certain subscribers. Similarly, other subscribers may have communication resource requirements, which exceed the allocated time interval, leaving these subscribers under served. The system operator may choose to either incur the cost of increasing the bandwidth of the node to ensure that no subscribers are under-served, or allow the under-served subscribers to continue to be under-served.

Accordingly, there is a need to provide a system and method of allocating communication resources among subscribers to a communication network efficiently and fairly according to a network policy of allocating the communication resources among the subscribers.

BRIEF DESCRIPTION OF THE FIGURES

FIG. 19 is a table identifying class types according to one embodiment.

DETAILED DESCRIPTION

Embodiments of the present invention are directed to a system and apparatus for allocating resources among a plurality of subscribers to a communication network, which are serviced by a single communication node. At individual discrete transmission intervals, or "service intervals," individual subscribers seize a finite resource of the communication node to the exclusion of all other subscribers. The individual subscribers are selected to seize the finite resource based upon a weight or score associated with the individual subscribers. Changes in a weight associated with an individual subscriber are preferably based upon an instantaneous rate at which the individual subscriber is capable of consuming the finite resource.

Figure 1:
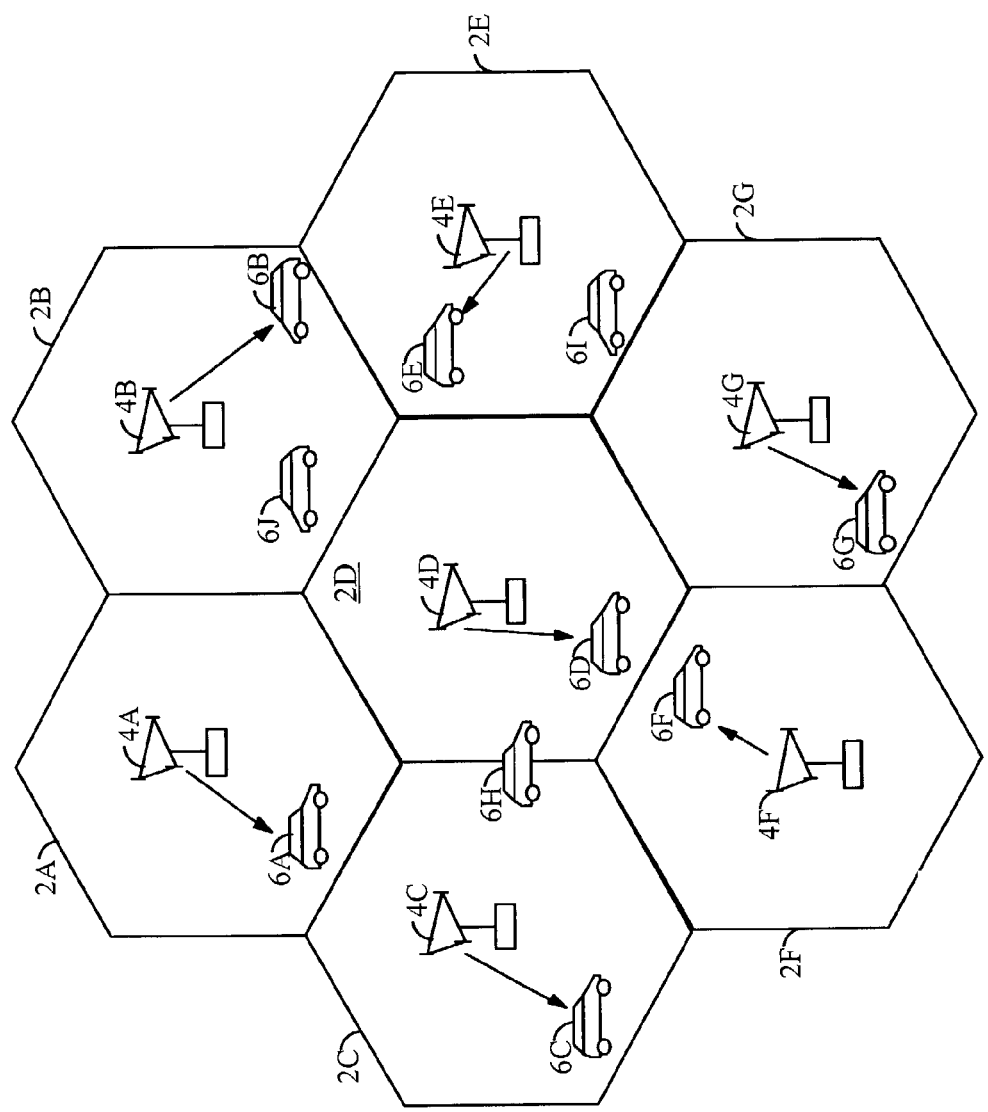
FIG. 1 shows a communication network according to an embodiment of the present invention.

Referring to the figures, FIG. 1 represents an exemplary variable rate communication system. One such system is described in the U.S. patent application Ser. No. 08/963,386, entitled Method and Apparatus for High Rate Packet Data Transmission, filed on Nov. 3, 1997, assigned to Qualcomm, Inc. and incorporated herein by reference. The variable rate communication system comprises multiple cells 2A-2G. Each cell 2 is serviced by a corresponding base station 4. Various remote stations 6 are dispersed throughout the communication system. In the exemplary embodiment, each of remote stations 6 communicates with at most one base station 4 on a forward link at any data transmission interval. For example, base station 4A transmits data exclusively to remote station 6A, base station 4B transmits data exclusively to remote station 6B, and base station 4C transmits data exclusively to remote station 6C on the forward link at time slot n. As shown by FIG. 1, each base station 4 preferably transmits data to one remote station 6 at any given moment. In other embodiments, the base station 4 may communicate with more than one remote station 6 at a particular data transmission interval to the exclusion of all other remote stations 6 associated with the base station 4. In addition, the data rate is variable and in one embodiment is dependent on the carrier-to-interference ratio (C/I) as measured by the receiving remote station 6 and the required energy-per-bit-to-noise ratio ($E_b/N_0$). The reverse link from remote stations 6 to base stations 4 is not shown in FIG. 1 for simplicity. According to an embodiment, the remote stations 6 are mobile units with wireless transceivers operated by wireless data service subscribers.

Figure 2A:
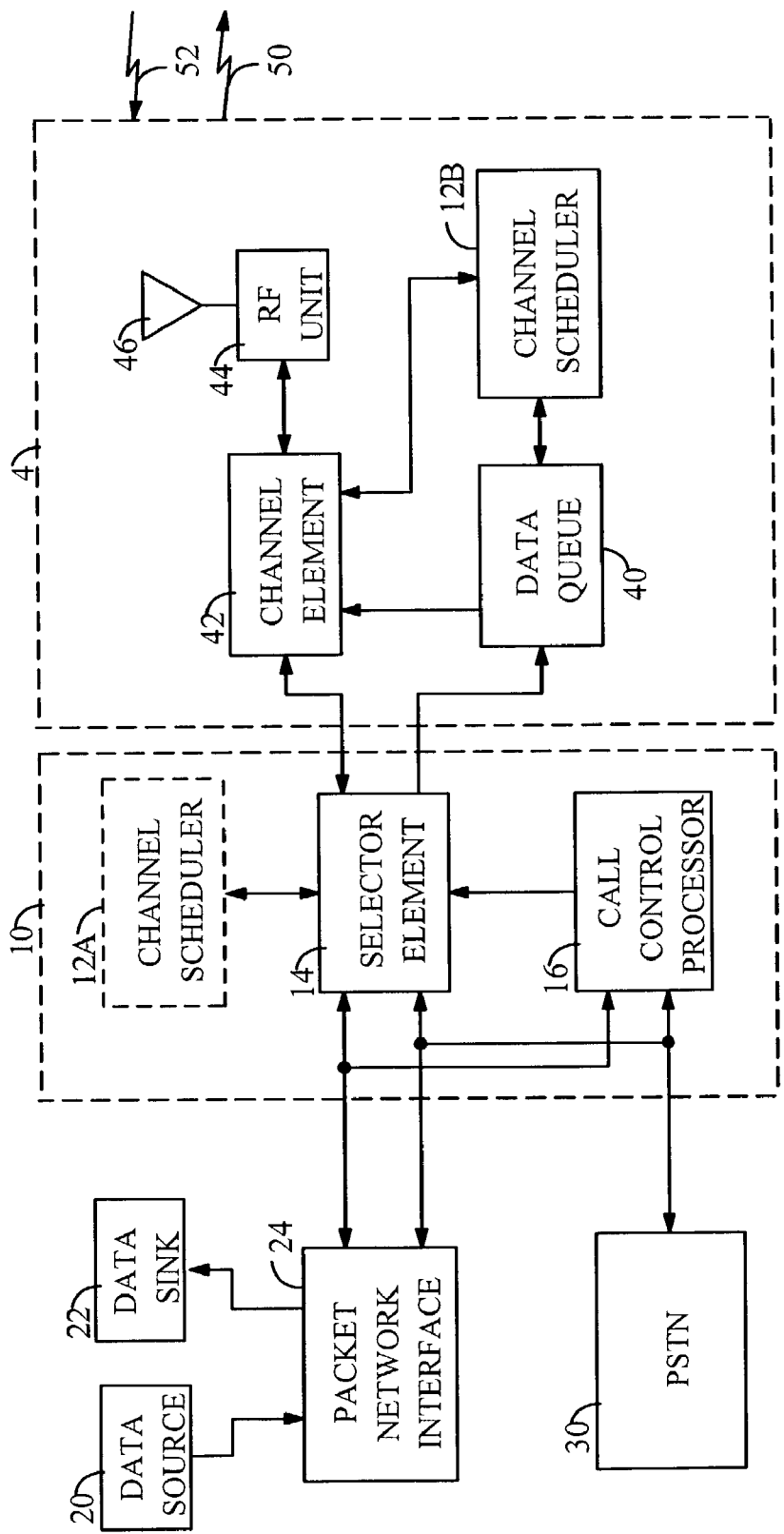
FIG. 2A shows a block diagram of a base station controller and base station apparatus configured in accordance with an embodiment of the present invention.
Figure 2B:
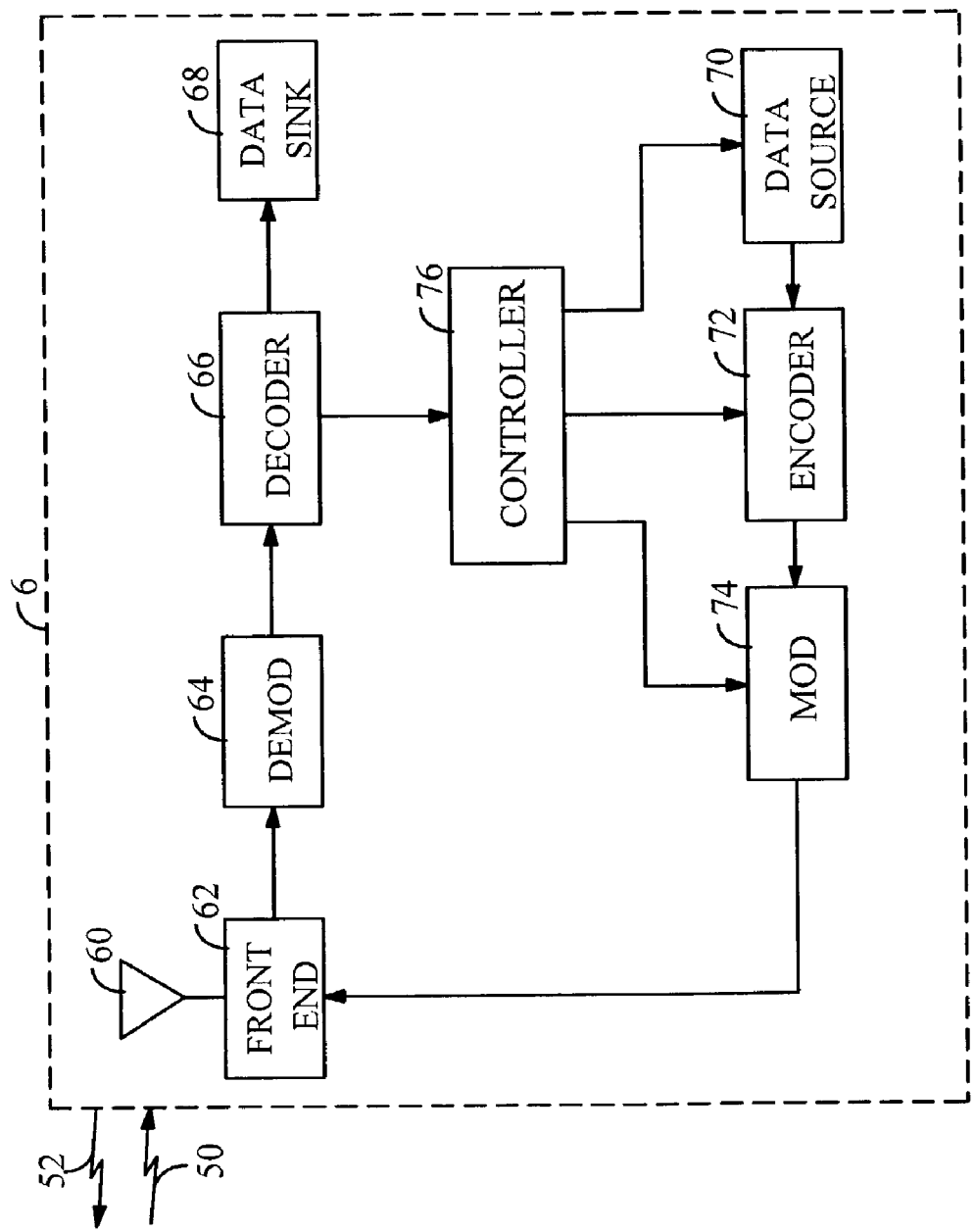
FIG. 2B shows a block diagram of a remote station apparatus configured in accordance with an embodiment of the present invention.

A block diagram illustrating the basic subsystems of an exemplary variable rate communication system is shown in FIGS. 2A-2B. Base station controller 10 interfaces with packet network interface 24, Public Switched Telephone Network (PSTN) 30, and all base stations 4 in the communication system (only one base station 4 is shown in FIG. 2A for simplicity). Base station controller 10 coordinates the communication between remote stations 6 in the communication system and other users connected to packet network interface 24 and PSTN 30. PSTN 30 interfaces with users through a standard telephone network (not shown in FIG. 2).

Base station controller 10 contains many selector elements 14, although only one is shown in FIG. 2 for simplicity. Each selector element 14 is assigned to control communication between one or more base stations 4 and one remote station 6. If selector element 14 has not been assigned to remote station 6, call control processor 16 is informed of the need to page remote station 6. Call control processor 16 then directs base station 4 to page remote station 6.

Data source 20 contains a quantity of data, which is to be transmitted to the remote station 6. Data source 20 provides the data to packet network interface 24. Packet network interface 24 receives the data and routes the data to the selector element 14. Selector element 14 transmits the data to each base station 4 in communication with remote station 6. In the exemplary embodiment, each base station 4 maintains a data queue 40 which stores the data to be transmitted to the remote station 6.

The data is transmitted in data packets from data queue 40 to channel element 42. In the exemplary embodiment, on the forward link, a "data packet" refers to a quantity of data which is the maximum of 1024 bits and a quantity of data to be transmitted to a destination remote station 6 within a "time slot" (such as ≈1.667 msec). For each data packet, channel element 42 inserts the necessary control fields. In the exemplary embodiment, channel element 42 CRC encodes the data packet and control fields and inserts a set of code tail bits. The data packet, control fields, CRC parity bits, and code tail bits comprise a formatted packet. In the exemplary embodiment, channel element 42 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 44 which quadrature modulates, filters, and amplifies the signal. The forward link signal is transmitted over the air through antenna 46 on forward link 50.

At remote station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the short PNI and PNQ codes and decovered with the Walsh cover. The demodulated data is provided to decoder 66 which performs the inverse of the signal processing functions done at base station 4, specifically the de-interleaving, decoding, and CRC check functions. The decoded data is provided to data sink 68.

The hardware, as pointed out above, supports variable rate transmissions of data, messaging, voice, video, and other communications over the forward link. The rate of data transmitted from the data queue 40 varies to accommodate changes in signal strength and the noise environment at the remote station 6. Each of the remote stations 6 preferably transmits a Data Rate Control (DRC) signal to an associated base station 4 at each time slot. DRC refers to a control mechanism whereby a remote station determines a desired data rate for the forward link, i.e., data rate to receive data at the remote station. The remote station sends the desired data rate as a data rate request or instruction to the base station via a DRC message. The DRC signal provides information to the base station 4, which includes the identity of the remote station 6 and the rate at which the remote station 6 is to receive data from its associated data queue. Accordingly, circuitry at the remote station 6 measures the signal strength and estimates the noise environment at the remote station 6 to determine the rate information to be transmitted in the DRC signal.

The DRC signal transmitted by each remote station 6 travels through reverse link channel 52 and is received at base station 4 through antenna 46 and RF unit 44. In the exemplary embodiment, the DRC information is demodulated in channel element 42 and provided to a channel scheduler 12A located in the base station controller 10 or to a channel scheduler 12B located in the base station 4. In a first exemplary embodiment, the channel scheduler 12B is located in the base station 4. In an alternate embodiment, the channel scheduler 12A is located in the base station controller 10, and connects to all selector elements 14 within the base station controller 10.

In one embodiment, channel scheduler 12B receives information from data queue 40 indicating the amount of data queued up for each remote station, also called queue size. Channel scheduler 12B then performs scheduling based on DRC information and queue size for each remote station serviced by base station 4. If queue size is required for a scheduling algorithm used in the alternate embodiment, channel scheduler 12A may receive queue size information from selector element 14.

Embodiments of the present invention are applicable to other hardware architectures, which may support variable rate transmissions. The present invention may be readily extended to cover variable rate transmissions on the reverse link. For example, instead of determining the rate of receiving data at the base station 4 based upon a DRC signal from remote stations 6, the base station 4 measures the strength of the signal received from the remote stations 6 and estimates the noise environment to determine a rate of receiving data from the remote station 6. The base station 4 then transmits to each associated remote station 6 the rate at which data is to be transmitted in the reverse link from the remote station 6. The base station 4 may then schedule transmissions on the reverse link based upon the different data rates on the reverse link in a manner similar to that described herein for the forward link.

Also, a base station 4 of the embodiment discussed above transmits to a selected one, or selected ones, of the remote stations 6 to the exclusion of the remaining remote stations associated with the base station 4 using a CDMA scheme. At any particular time, the base station 4 transmits to the selected one, or selected ones, of the remote station 6 by using a code, which is assigned to the receiving base station(s) 4. However, the present invention is also applicable to other systems employing different TDMA methods for providing data to select base station(s) 4, to the exclusion of the other base stations 4, for allocating transmission resources optimally.

The channel scheduler 12 schedules the variable rate transmissions on the forward link. The channel scheduler 12 receives the queue size, which is indicative of the amount of data to transmit to remote station 6, and messages from remote stations 6. The channel scheduler 12 preferably schedules data transmissions to achieve the system goal of maximum data throughput while conforming to a fairness constraint.

As shown in FIG. 1, remote stations 6 are dispersed throughout the communication system and may be in communication with zero or one base station 4 on the forward link. In the exemplary embodiment, channel scheduler 12 coordinates the forward link data transmissions over the entire communication system. A scheduling method and apparatus for high speed data transmission are described in detail in U.S. Pat. No. 6,335,922, issued Jan. 1, 2002, assigned to the assignee of the present invention and incorporated by reference herein.

According to an embodiment, the channel scheduler 12 is implemented in a computer system, which includes a processor, Random Access Memory (RAM) and a program memory for storing instructions to be executed by the processor (not shown). The processor, RAM and program memory may be dedicated to the functions of the channel scheduler 12. In other embodiments, the processor, RAM and program memory may be part of a shared computing resource for performing additional functions at the base station controller 10.

Figure 3:
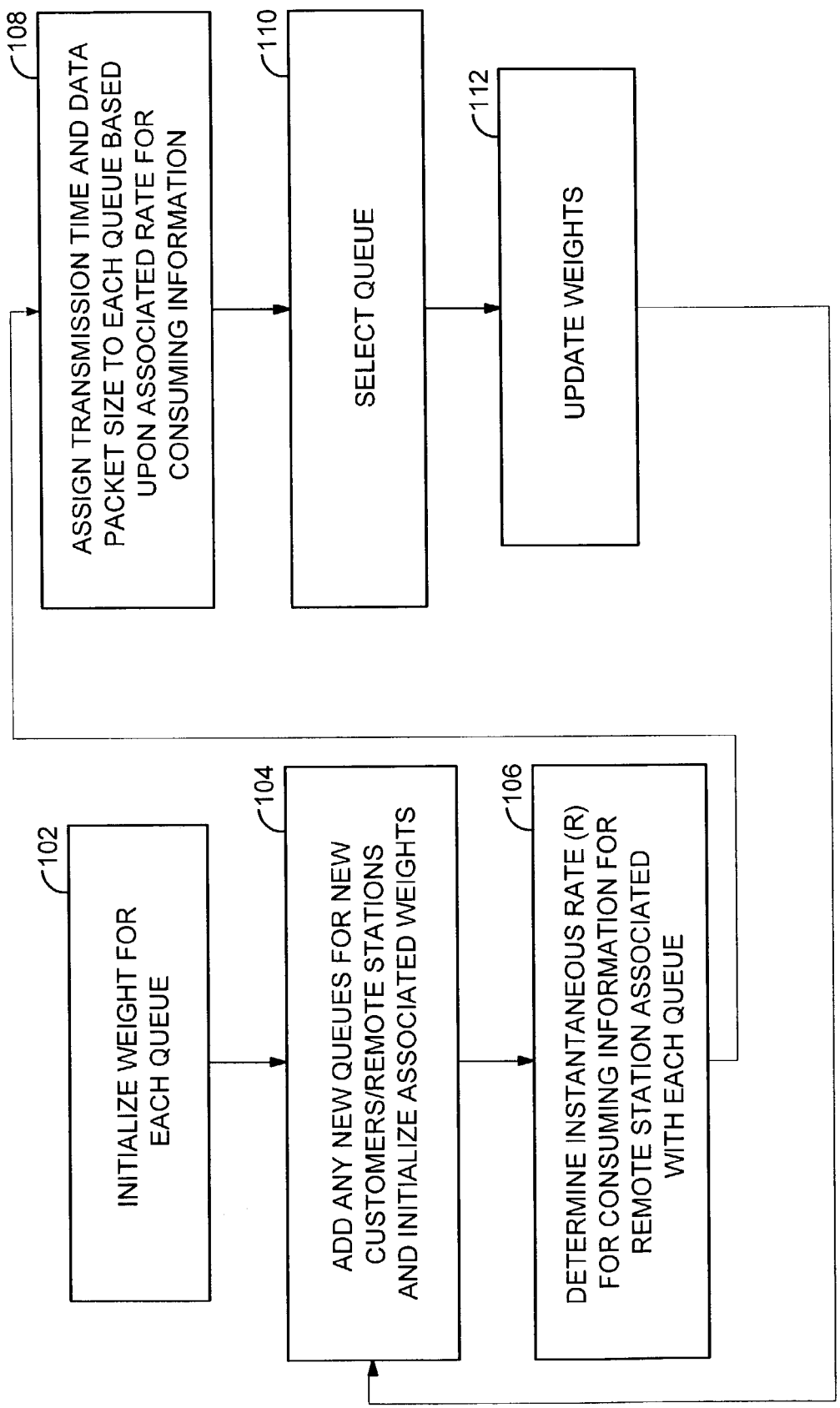
FIG. 3 shows a flow diagram illustrating the execution of a scheduling algorithm in an embodiment of the channel scheduler shown in FIG. 2.

FIG. 3 shows an embodiment of a scheduling algorithm, which controls the channel scheduler 12 to schedule transmissions from the base station 4 to the remote stations 6. As discussed above, a data queue 40 is associated with each remote station 6. The channel scheduler 12 associates each of the data queues 40 with a "weight" which is evaluated at a step 110 for selecting the particular remote station 6 associated with the base station 4 to receive data in a subsequent service interval. The channel scheduler 12 selects individual remote stations 6 to receive a data transmission in discrete service intervals. At step 102, the channel scheduler initializes the weight for each queue associated with the base station 4.

A channel scheduler 12 cycles through steps 104 through 112 at transmission intervals or service intervals. At step 104, the channel scheduler 12 determines whether there are any additional queues to be added due to the association of an additional remote station 6 with the base station 4 detected in the previous service interval. The channel scheduler 12 also initializes the weights associated with the new queues at step 104. As discussed above, the base station 4 receives the DRC signal from each remote station 6 associated therewith at regular intervals, such as time slots.

This DRC signal also provides the information which the channel scheduler uses at step 106 to determine the instantaneous rate for consuming information (or receiving transmitted data) for each of the remote stations associated with each queue. According to an embodiment, a DRC signal transmitted from any remote station 6 indicates that the remote station 6 is capable of receiving data at any one of eleven effective data rates shown in Table 1. Such a variable rate transmission system is described in detail in U.S. Pat. No. 6,064,678, issued May 16, 2000, assigned to the assignee of the present invention and incorporated by reference herein.

TABLE 1

| Effective Data Rate ($R_i$) | Data Transmitted in Service Interval (Data_Size ($L_i$)) (bits) | Length/Transmission Time of Service Interval ($L_i$) (time slots ≈ 1.667 msec) |
|---|---|---|
| 38.4 kbps | 1024 | 16 |
| 76.8 kbps | 1024 | 8 |
| 102.4 kbps | 1024 | 6 |
| 153.6 kbps | 1024 | 4 |
| 204.8 kbps | 1024 | 3 |
| 307.2 kbps | 1024 | 2 |
| 614.4 kbps | 1024 | 1 |
| 921.6 kbps | 1536 | 1 |
| 1228.8 kbps | 2048 | 1 |
| 1843.2 kbps | 3072 | 1 |
| 2457.6 kbps | 4096 | 1 |

The channel scheduler 12 at step 108 determines the length of a service interval during which data is to be transmitted to any particular remote station 6 based upon the remote station's 6 associated instantaneous rate for receiving data (as indicated in the most recently received DRC signal). According to an embodiment, the instantaneous rate of receiving data $R_i$ determines the service interval length $L_i$ associated with a particular data queue at step 106. Table 1 summarizes the $L_i$ values for each of the eleven possible rates for receiving data at a remote station 6.

The channel scheduler 12 at step 110 selects the particular data queue for transmission. The associated quantity of data to be transmitted is then retrieved from a data queue 40 and then provided to the channel element 42 for transmission to the remote station 6 associated with the data queue 40. As discussed below, the channel scheduler 12 at step 110 selects the queue for providing the data, which is transmitted in a following service interval using information including each weight associated with each queue. The weight associated with the transmitted queue is then updated at step 112.

Figure 4:
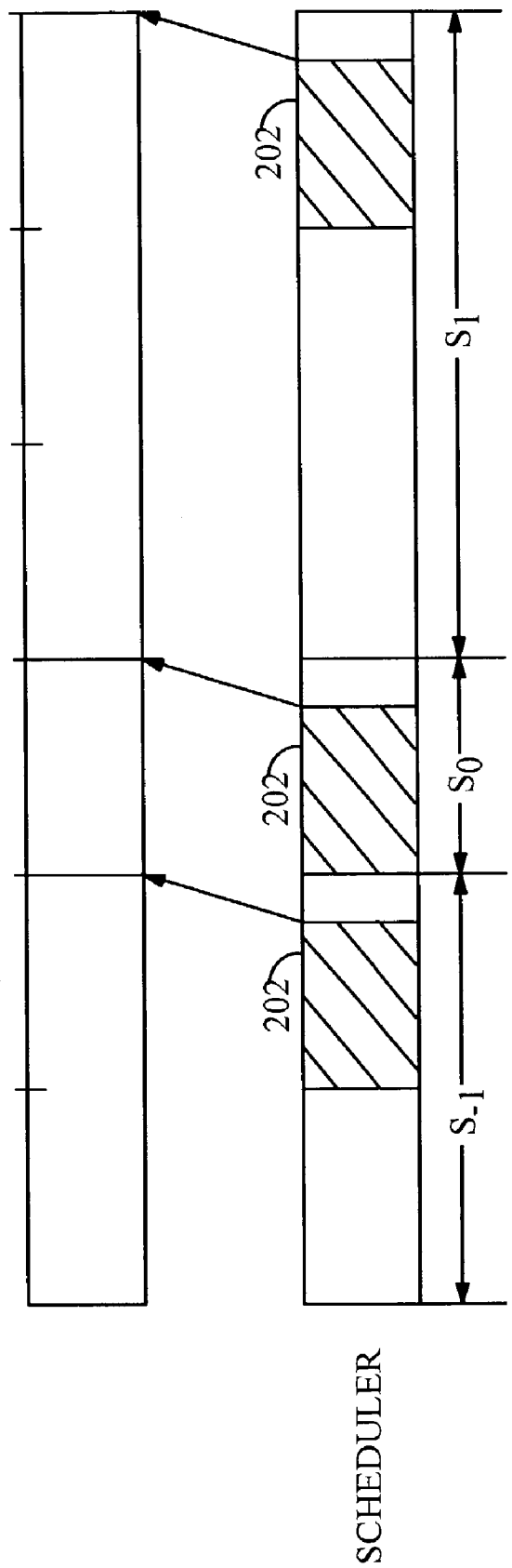
FIG. 4 shows a diagram illustrating the timing of the execution of an embodiment of the scheduling algorithm shown in FIG. 3.

FIG. 4 shows a diagram illustrating the timing of the channel scheduler 12 and data transmission in service intervals. FIG. 4 shows three discrete service intervals during transmission at time intervals $S_{-1}$, $S_0$ and $S_1$. As steps 104 through 112 of the scheduling algorithm of FIG. 4 are executed during service intervals 202, the scheduling algorithm executing during the interval $S_0$ preferably determines which queue is to be transmitted at the interval $S_1$. Also, as discussed below, the execution of steps 104 through 112 relies on information in the DRC signals received from the remote stations 6. This information is preferably extracted from the most recently received DRC signals. Accordingly, the steps 104 through 110 are preferably executed and completed during the last time slot of the service intervals. This ensures that the decisions for allocating the subsequent service interval are based upon the most recent DRC signals (i.e., those DRC signals which are in the time slot immediately preceding the execution of the steps 104 through 110).

Steps 104 and 110 are preferably completed within a time slot while providing sufficient time for the channel scheduler 12 to schedule the transmissions for the subsequent service interval. Thus the processor and RAM employed in the channel scheduler 12 are preferably capable of performing the steps 104 through 112 within the time constraints illustrated in FIG. 4. That is, the processor and RAM are preferably sufficient to execute steps 104 through 110, starting at the beginning of a time slot and completing steps 104 through 110, within sufficient time before the end of the time slot for the channel scheduler 12 to schedule transmissions in a subsequent service interval.

One skilled in the art will appreciate that channel scheduler 12 may be implemented using a variety of approaches without departing from the present invention. For example, channel scheduler 12 may be implemented using a computer system including a processor, random access memory (RAM) and a program memory for storing instructions to be executed by the processor (not shown). In other embodiments, the functions of channel scheduler 12 may be incorporated into a shared computing resource also used to perform additional functions at the base station 4 or the base station controller 10. In addition, the processor used to perform channel scheduler functions may be a general-purpose microprocessor, digital signal processor (DSP), programmable logic device, application specific integrated circuit (ASIC), or other device capable of performing the algorithms described herein, without departing from the present invention.

Figure 5:
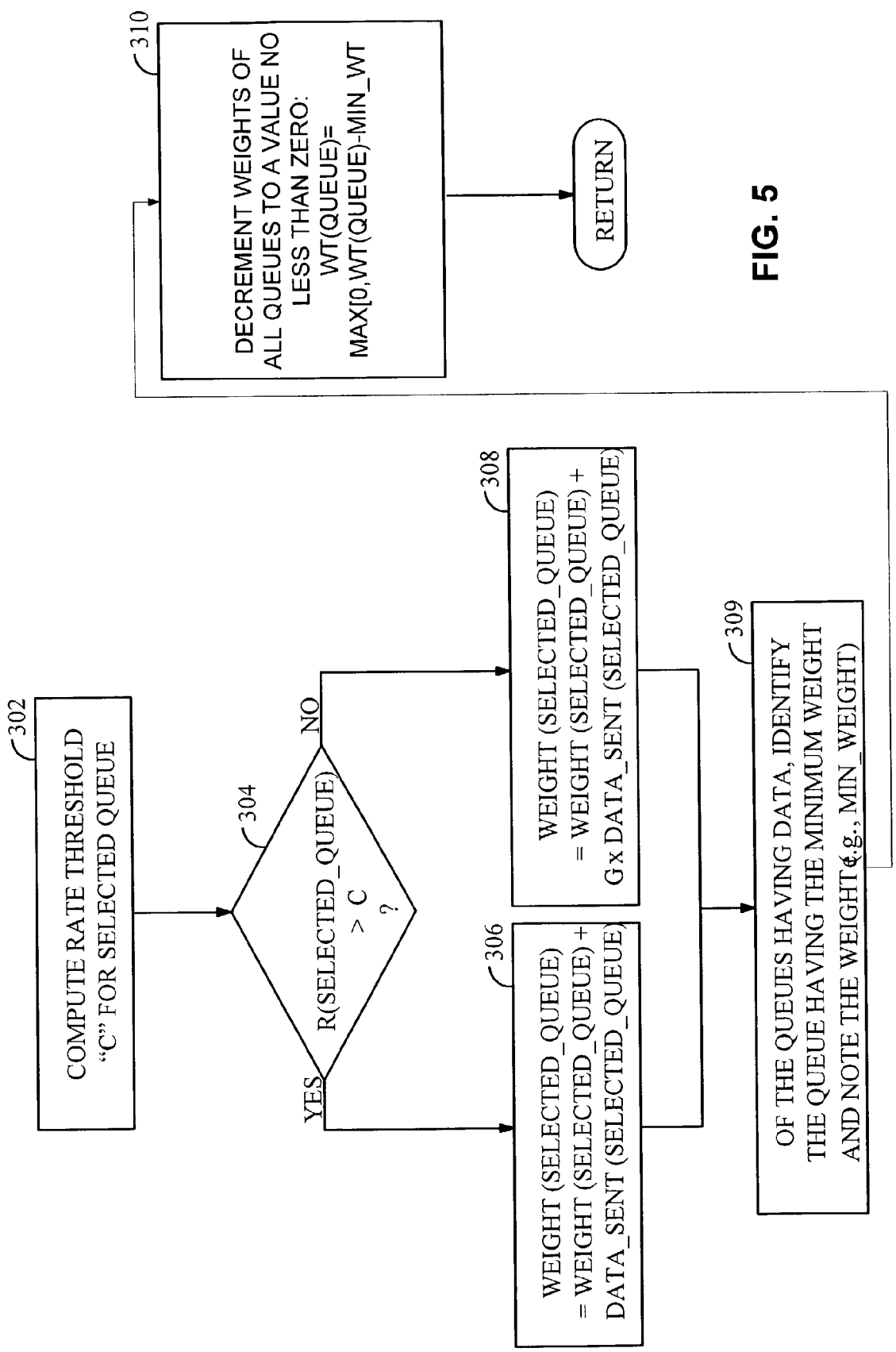
FIG. 5 shows flow diagram illustrating an embodiment of the process for updating the weights for a selected queue in the embodiment identified in FIG. 3.

FIG. 5 shows an embodiment of the process for updating the weights at step 112 (FIG. 3). Step 302 computes a rate threshold "C" which is an average of all of the instantaneous rates associated with queues having data. The instantaneous rates associated with queues, which do not include data are preferably eliminated for this calculation. Step 304 compares the instantaneous rate associated with the Selected_Queue selected at step 110. If an instantaneous rate associated with a Selected_Queue exceeds the threshold C, step 306 increments the weight associated with this Selected_Queue by a lower value which is preferably a number representing the quantity of data to be transmitted during the subsequent service interval from the Selected_Queue in units such as bits, bytes or megabytes. If the instantaneous rate associated with the Selected_Queue does not exceed the threshold calculated at step 302, step 308 increments the weight of the Selected_ Queue by a higher value which is preferably a multiple "G" of the quantity of data which is to be transmitted during the subsequent service interval from the Selected_Queue such as bits, bytes or megabyte quantities.

The selection of G is preferably based upon a fairness criteria which favors the allocation of service intervals to remote stations 6 having the capacity to receive data at higher rates. The system designer selects the size of G based upon the extent to which remote stations 6 receiving data at the higher rates are to be favored over the slower receiving remote stations 6. The larger the value of G, the more efficiently the forward link of the base station 4 is utilized. This efficiency, however, comes at the cost of depriving the subscribers of the slower receiving remote station 6 of the transmission resources of the forward link. The system designer therefore preferably selects the value of G in a manner which balances the two competing objectives of 1) enhancing the overall efficiency of the forward link and 2) preventing accute deprivation of the slower receiving remote stations 6.

Steps 304, 306 and 308 illustrate that selected queues having a faster associated instantaneous data rate (i.e., exceeding the threshold C) will tend to have the associated weight incremented by only a small amount, while selected queues having a lower data rate (i.e., not exceeding the threshold C) will have its associated weight incremented by a significantly greater amount. As discussed below in connection with the algorithm performed at step 110 of FIG. 3, this implementation tends to favor servicing remote stations, which receive data at relatively faster rates over those remote stations receiving data at lower data rates.

This tendency enhances the throughput efficiency of the base station 4 in transmitting data in the forward link. However, as the weights associated with the often selected queues associated with the remote stations having the higher rates of receiving data-(i.e., exceeding the threshold C) continue to be incremented, these weights eventually approach the weights of the queues associated with the less often selected queues associated with the remote stations having the slower rates of receiving data (i.e., not exceeding the threshold). The selection process at step 110 will then begin to favor the slower receiving remote stations as the weights of the faster receiving remote stations begin to exceed the weights of the slower receiving remote stations. This imposes a fairness restraint on the selection process at step 110 by preventing the faster receiving remote stations from dominating the forward link transmission resources of the base station to the exclusion of the slower receiving remote stations.

It is an objective of the present embodiment to ensure that queues having no data to transmit are not given an unfair preference for transmission over those queues having data. At steps 102 and 104, all new queues are initialized with a weight of zero. Without being selected, such queues will continue to maintain the weight of zero provided that the queue is not selected. Therefore, step 310 in FIG. 5 decrements the weight of all queues, to a value no less than zero, by the minimum weight of any queue with data (determined at step 309). This is illustrated in detail below in an example shown in Table 2.

through 7. It is also assumed that the data rates at remote station 1 and remote station 2 each exceed the threshold C at step 304, and that the data rate associated with remote station 3 does not exceed this threshold. It is further assumed that step 306 will increment the weight of the Selected_Queue by one if the Selected_Queue is associated with the remote station 1 or remote station 2, and that step 308 will increment the weight of the Selected_Queue by eight if the Selected_Queue is associated with the remote station 3.

At service interval 1, the channel scheduler 12 selects the remote station 1 to receive data in the subsequent service interval, since, while it has the lowest weight along with remote stations 2 and 3, remote station 1 has a higher rate of receiving data. Data is then transmitted to remote station 1 during service interval 2 and the weight associated with the remote station 1 is incremented by one at the end of service interval 1. The channel scheduler 12 then selects remote station 2 to receive data in service interval 3 (since remote station 2 has the lowest weight and a faster rate of receiving data than does remote station 3). As shown in Table 2, the weight of remote station 2 is incremented by 1 by the end of the service interval 2.

At the beginning of service interval 3, remote station 3 has the lowest weight. The channel scheduler 12 selects remote station 3 to receive data at the service interval 4. The state at the end of interval 3 reflects that weight of the remote station 3 was incremented from zero to eight to reflect the selection of the remote station 3. The weights at the remote stations 1, 2 and 3 are then decremented by one, which is consistent with step 310 (FIG. 5) as indicated in Table 2. At service interval 4, the channel scheduler 12 selects remote station 1 to receive data in service interval 4 since the queue associated with remote station 1 has the lowest weight and the highest rate for receiving data.

The channel scheduler 12 at service interval 5 selects remote station 2 to receive data during service interval 6. The weight associated with the remote station 2 is first incremented at step 306 and the weights of all of the remote stations are decremented by one as reflected in the weights at the end of the service interval 5 as shown in Table 2. Remote station 1, having the lowest weight, is then selected again in service interval 6 for receiving data in service interval 7.

TABLE 2

| Service Interval | Weights at the End of the Service Interval | | | Remote Station Selected in Service Interval | Remote Station Serviced in Service Interval | Amount by Which Weights are Decremented |
|---|---|---|---|---|---|---|
| | Remote Station 1 | Remote Station 2 | Remote Station 3 | | | |
| 0 | 0 | 0 | 0 | N/A | N/A | N/A |
| 1 | 1 | 0 | 0 | 1 | N/A | 0 |
| 2 | 1 | 1 | 0 | 2 | 1 | 0 |
| 3 | 0 | 0 | 7 | 3 | 2 | 1 |
| 4 | 1 | 0 | 7 | 1 | 3 | 0 |
| 5 | 0 | 0 | 6 | 2 | 1 | 1 |
| 6 | 1 | 0 | 6 | 1 | 2 | 0 |
| 7 | 0 | 0 | 5 | 2 | 1 | 1 |

This example has three remote stations each associated with a queue of data to be transmitted from a base station. The example assumes that remote station 1 has the highest data rate, remote station 2 has the next highest data rate and remote station 3 has the lowest data rate. For simplicity, it is assumed that these data rates do not change over the service intervals 1

As shown in the embodiment of FIG. 1, the remote stations 6 are mobile and capable of changing associations among the different base stations 4. For example, a remote station 6F is initially receiving data transmissions from the base station 4F. The remote station 6f may then move out of the cell of the base station 4F and into the cell of the base station 4G. The remote station 6F may then start transmitting a DRC signal to alert the base station 4G instead of the base station 4F. By not receiving a DRC signal from the remote station 6F, logic at the base station 4F deduces that the remote station 6F has disengaged and is no longer to receive data transmissions. The data queue associated with the remote station 6F may then be transmitted to the base station 4G via a land line or RF communication link.

According to an embodiment of the present invention, the channel scheduler 12 at a base station 4 assigns a weight to a queue of a remote station 6 which has disengaged and re-engaged the base station 4. Rather than simply assigning a weight of zero to the re-engaging remote station 6, the base station 4 preferably assigns a weight, which does not give the re-engaging remote station an unfair advantage for receiving data transmissions from the base station 4. In one embodiment, the channel scheduler 12 randomly assigns a weight to the queue of the re-engaging remote station 6 according to a uniform distribution between zero and the highest weight of any queue currently serviced by the channel scheduler 12. In another embodiment, the base station 4 receives the weight of the re-engaging remote station 6 from the last base station associated with the remote station 6 via a land line transmission.

Figure 6A:
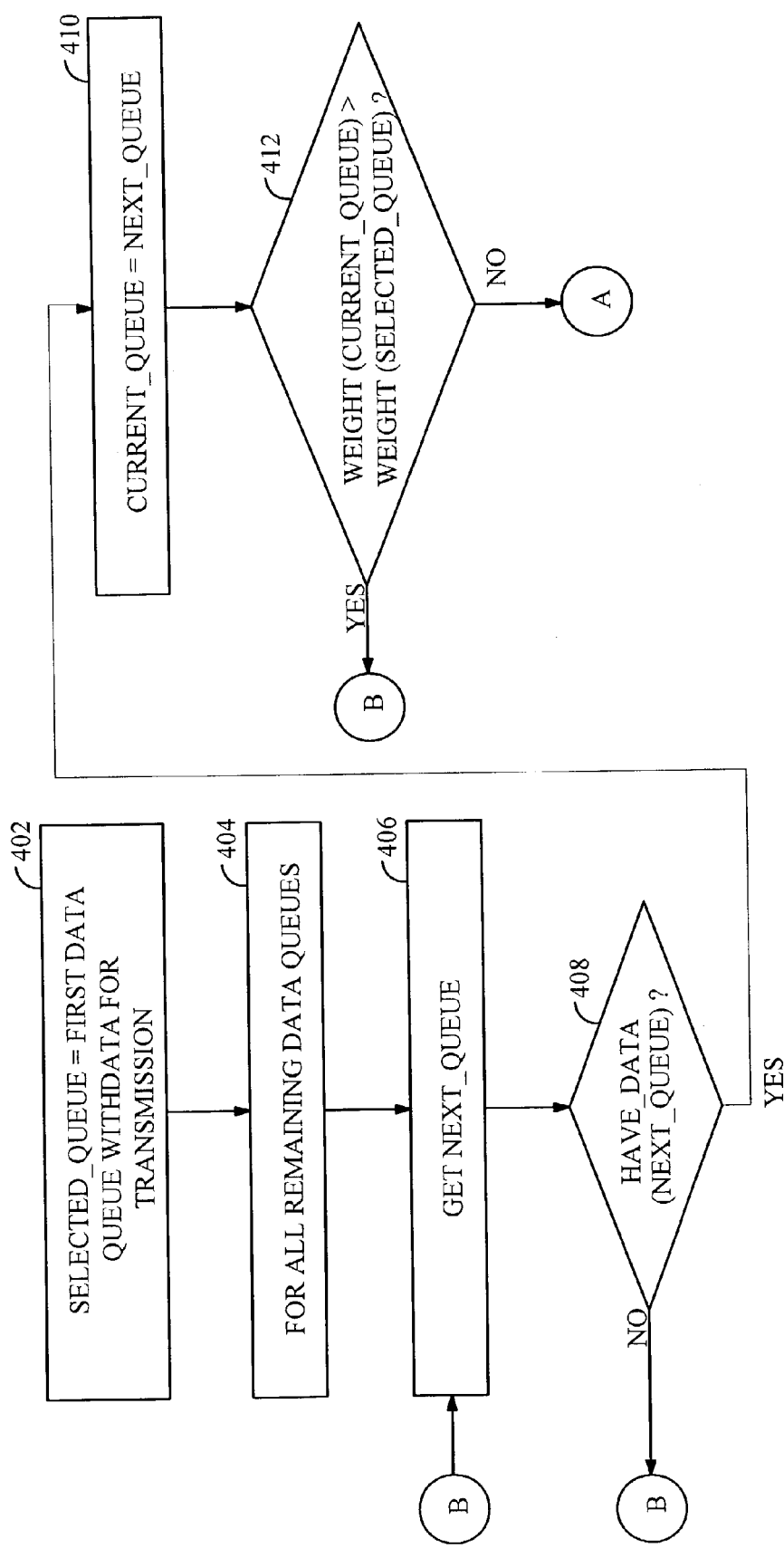
FIGS. 6A through 6C show a flow diagram illustrating a first embodiment of the process for selecting a queue to receive data transmission in a service interval identified in FIG. 3.
Figure 6B:
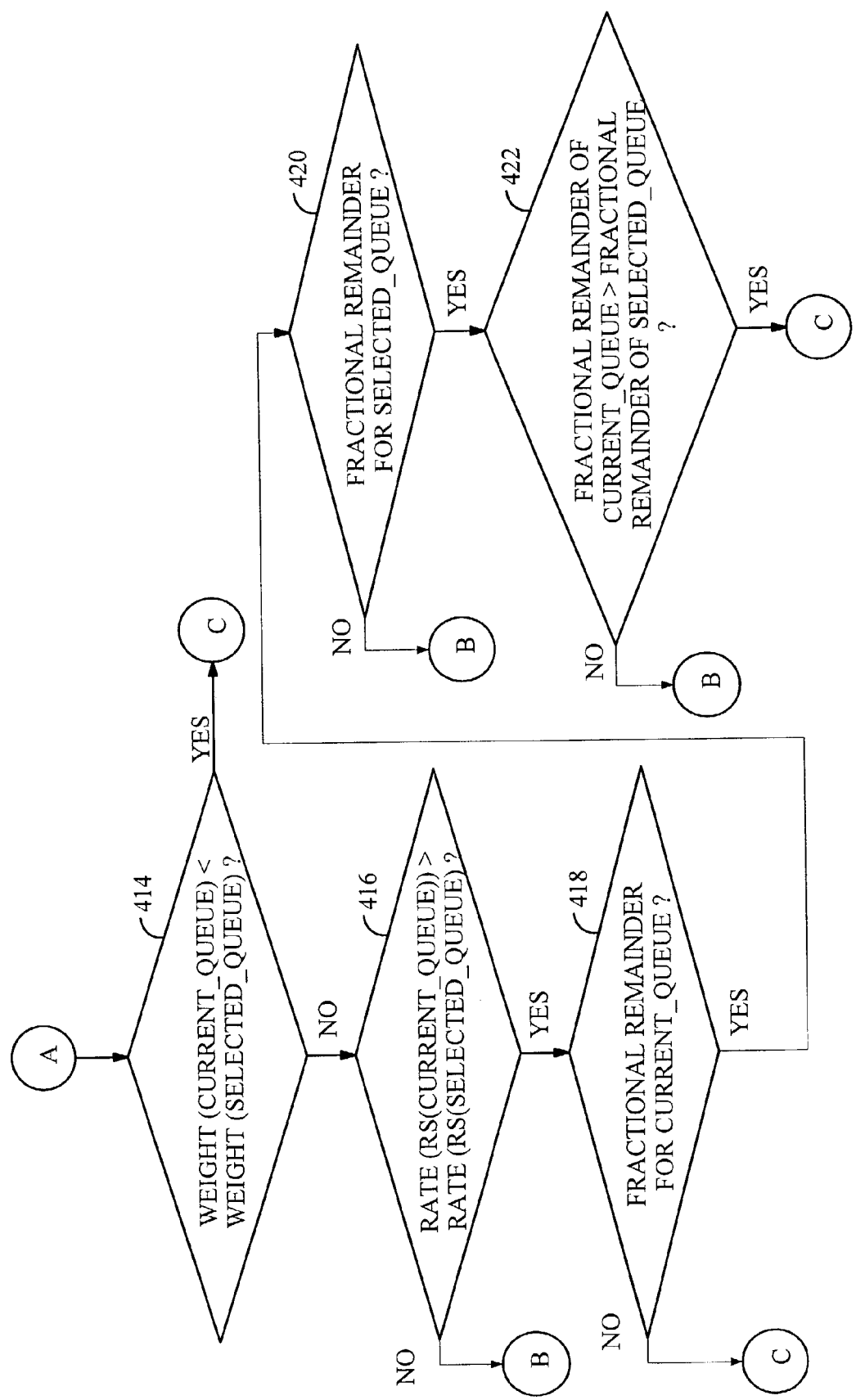
Figure 6C:
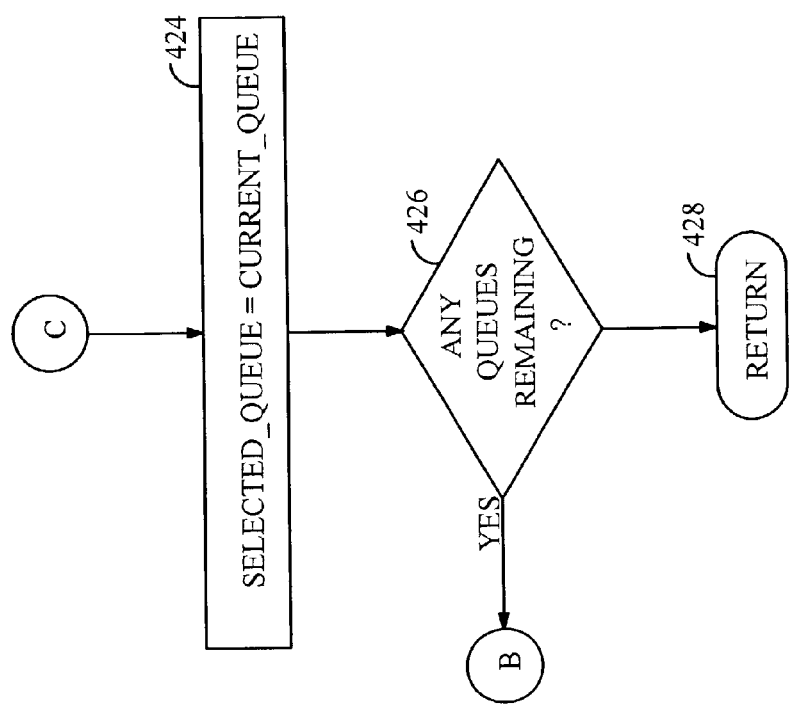

In an alternative embodiment, the channel scheduler 12 gives a re-engaging remote station 6 "partial credit" for having a past association with the base station 4. The channel scheduler 12 determines the number of time slots that the previous service interval spans "$n_i$" and maintains a history of the number of time slots "$m_i$" during the previous service interval that the base station 4 received a DRC from the remote station i. The weight of the queue associated with the remote station i is then decremented at step 310 as follows:

$$W_i = W_i - m_i/n \times W_{min}$$

where:
- $W_i$ = the weight of queue i
- $W_{min}$ = the minimum weight of any queue with data to transmit to a remote station
- $m_i$ = the number of time slots during the previous service interval that the base station received a DRC from the remote station i
- n = the number of time slots that the previous service interval spans FIGS. 6A through 6C show a flow diagram illustrating the logic performed at step 110 (FIG. 3) according to an embodiment. Step 402 initializes the identity of the Selected_Queue as being the first data queue having data for transmission to an associated remote station 6. At steps 402 through 422, the channel scheduler 12 determines whether this initial queue or a different data queue having data should be selected for transmission to its associated remote station 6. The Next_Queue is then retrieved at step 406 and step 408 determines whether this Next_Queue has data. If the Next_Queue does not have data, execution returns to step 406 to select a subsequent data queue. Otherwise, if this Next_Queue has data, the identity of the Current_Queue is assigned the Next_Queue. If the weight of the Current_Queue exceeds the weight of the Selected_Queue, step 412 returns execution to step 406 to retrieve a subsequent Next_Queue. Otherwise, step 414 determines whether the weight of the Current_Queue is less than the weight of the Selected_Queue. If the weight of the Current_Queue is less than the weight of the Selected_Queue, step 414 moves execution to step 420 to assign the identity of the Current_Queue to the Selected_Queue.

Otherwise, the logic at steps 412 and 414 dictate that if execution reaches step 416, the weights of the Current_Queue and the Selected_Queue are equal. Step 424 assigns the Current_Queue as the Selected_Queue when the following conditions are met:

1) the instantaneous rate of receiving data associated with the Current_Queue exceeds the instantaneous rate of receiving data associated with the Selected_Queue (step 416); and
2) if the service interval assigned to the Current_Queue would exhaust all of the data stored in the Current_Queue, leaving a fractional remainder of data in the service interval assigned to the Current_Queue, such a fractional remainder would not exceed any such fractional remainder of data in the Selected_Queue in the service interval assigned to the Selected_Queue (steps 418 through 422).

Otherwise, execution returns to step 406 to select the Next_Queue.

Figure 7A:
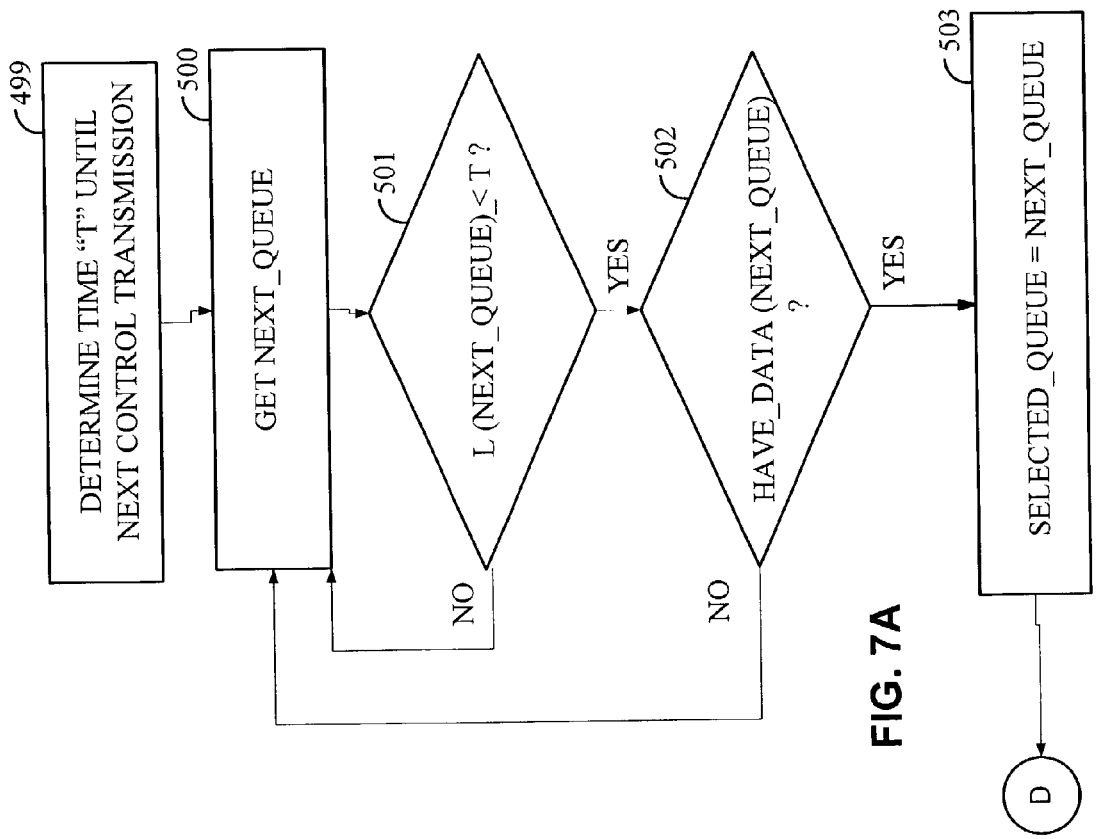
FIGS. 7A through 7D show a flow diagram illustrating a second embodiment of the process for selecting a queue to receive data transmission in a service interval identified in FIG. 3.
Figure 7B:
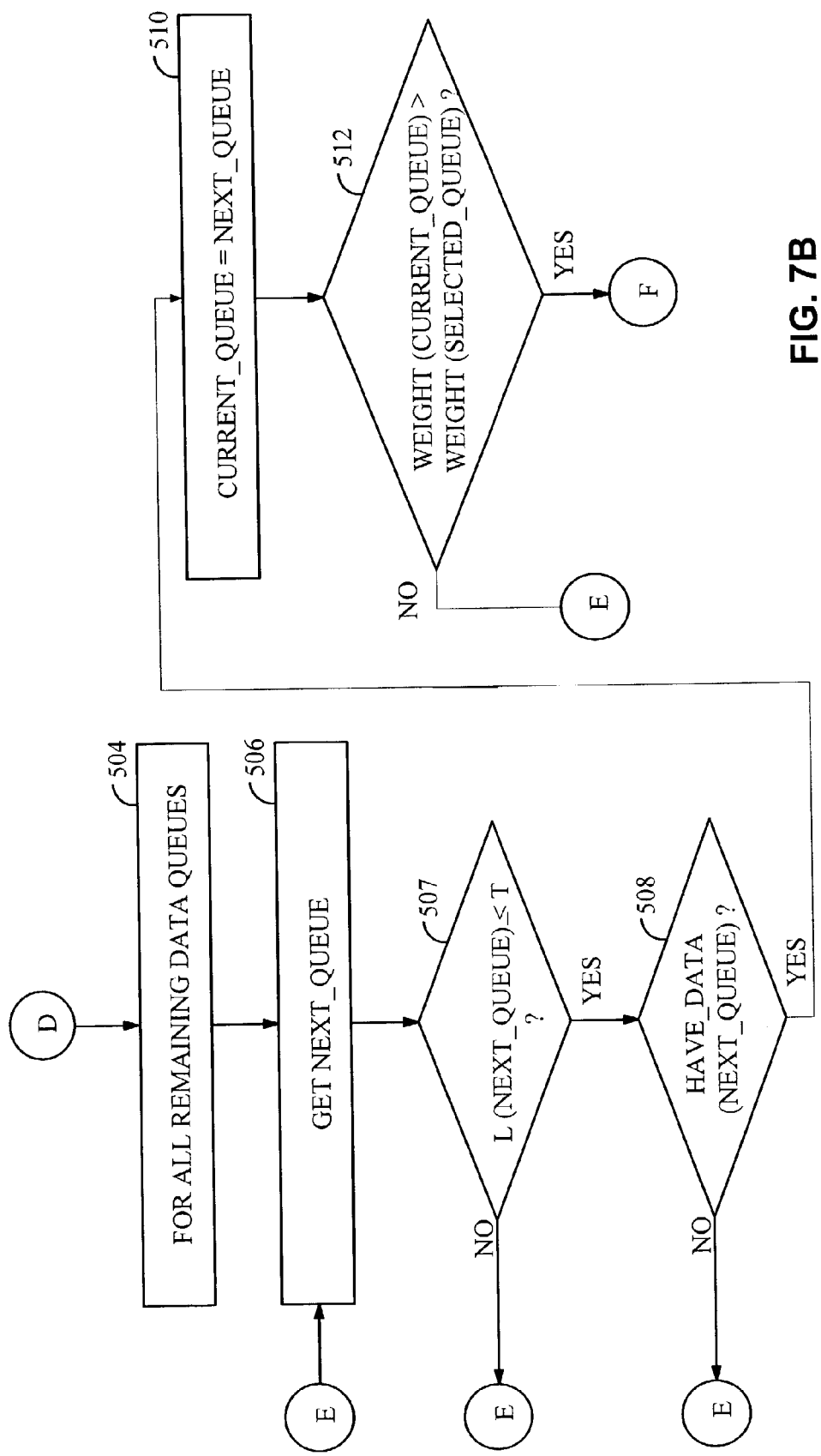
Figure 7C:
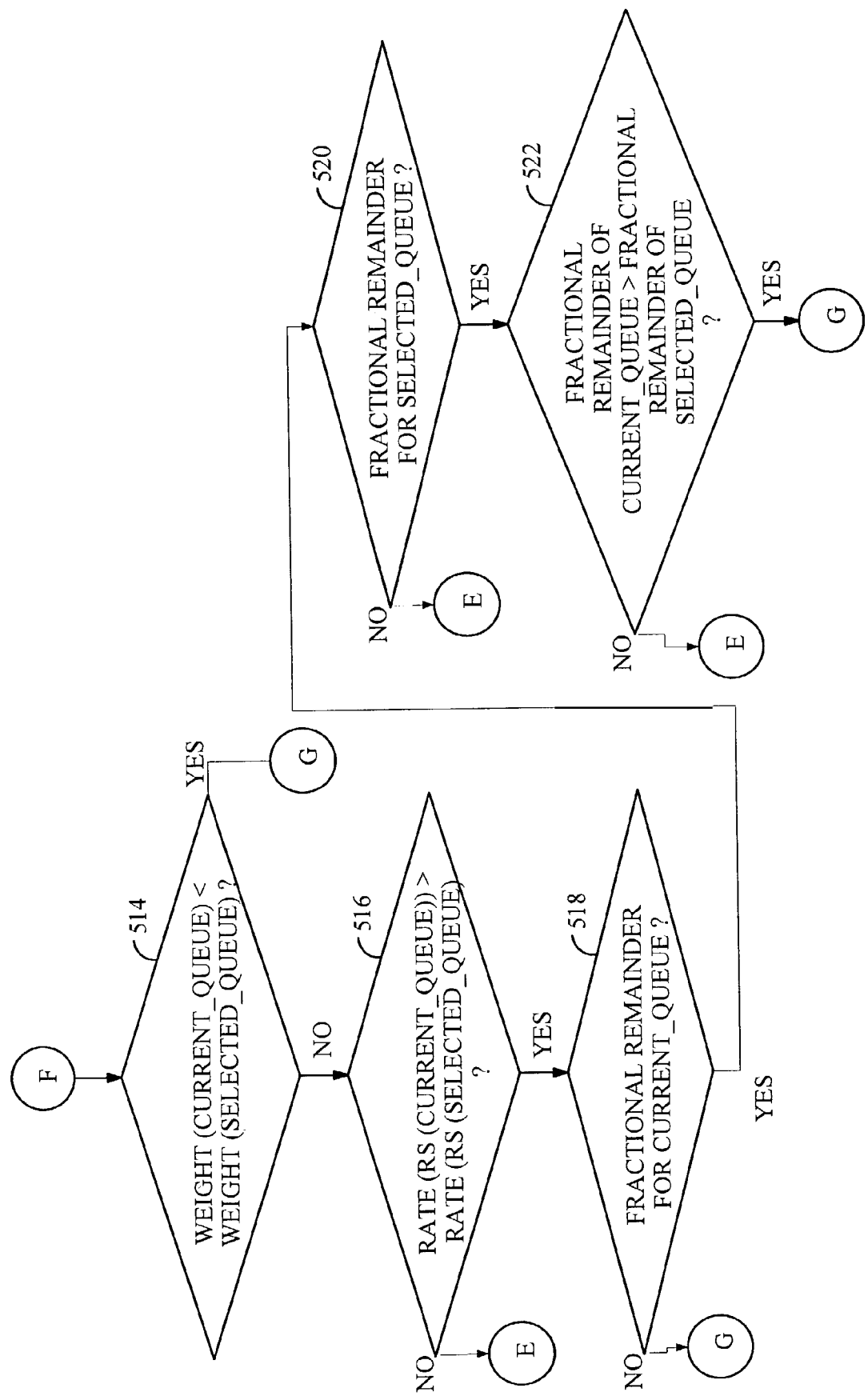
Figure 7D:
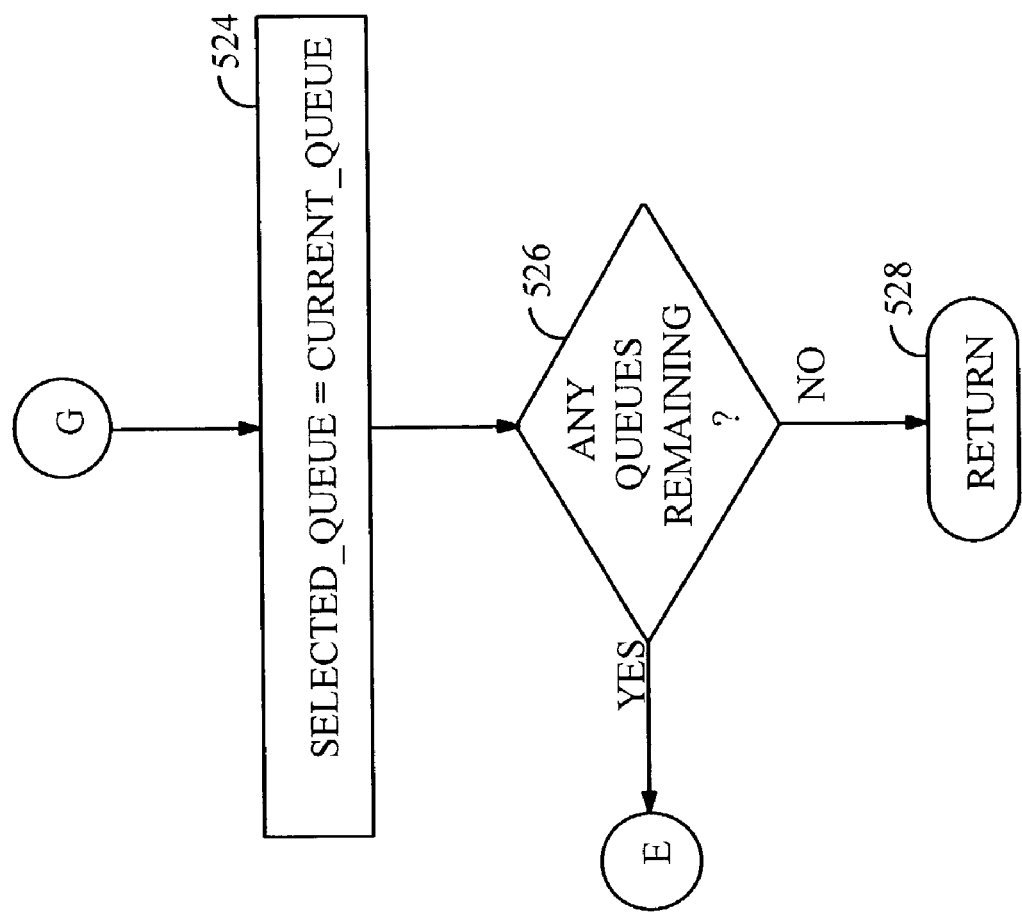

FIGS. 7A through 7D show a flow diagram illustrating a second embodiment of the logic performed at the step 110 for selecting a queue for transmission to an associated remote station 6. In this embodiment, it is assumed that each base station 4 periodically transmits a control signal to all associated remote stations 6 having a fixed duration (such as eight to sixteen time slots). According to an embodiment, the base station 4 transmits this control signal once every 400 msec. During this control transmission, no data from any data queue 40 (FIG. 2) may be transmitted to an associated remote station 6. An objective of the embodiment shown at FIGS. 7A and 7B is to select only those data queues, which may completely transmit for a service interval having a length determined at step 108 before the beginning of the next control signal transmission.

Steps 499 through 507 filter all of the queues to determine which queues are candidates for completion before the beginning of the next control signal transmission. Step 499 determines the time "T" until the next control signal transmission by, for example, subtracting the scheduled time of the beginning of the next control signal transmission by the beginning of the next scheduled service interval. Step 501 determines whether the length of service interval associated with each queue determined at step 108 may be transmitted within the time T based upon the instantaneous rate of transmission for the remote unit 6 associated with the queue determined at step 106. According to an embodiment, step 501 compares the service interval length with T. Step 502 then determines whether the Next_Queue includes any data. If the Next_Queue satisfies the conditions at steps 501 and 502, the identity of the Next_Queue is assigned to the Selected_Queue.

Steps 504 through 508 examine the remaining data queues to determine the data queues having associated service interval (determined at step 108), which may be completely transmitted prior to the beginning of the next control signal transmission. Upon meeting the criteria set forth at steps 507 and 508, the Current_Queue is assigned as the Next_Queue. Steps 512 through 526 then perform a selection process according to queue weights in a manner similar to that discussed above in connection with steps 412 through 426 in FIGS. 6A through 6C. However, in the embodiment of FIGS. 7A through 7D, only those data queues having an assigned packet length, which may be completed prior to the beginning of the next control signal transmission may be candidates for selection based upon the associated queue weight.

Figure 8A:
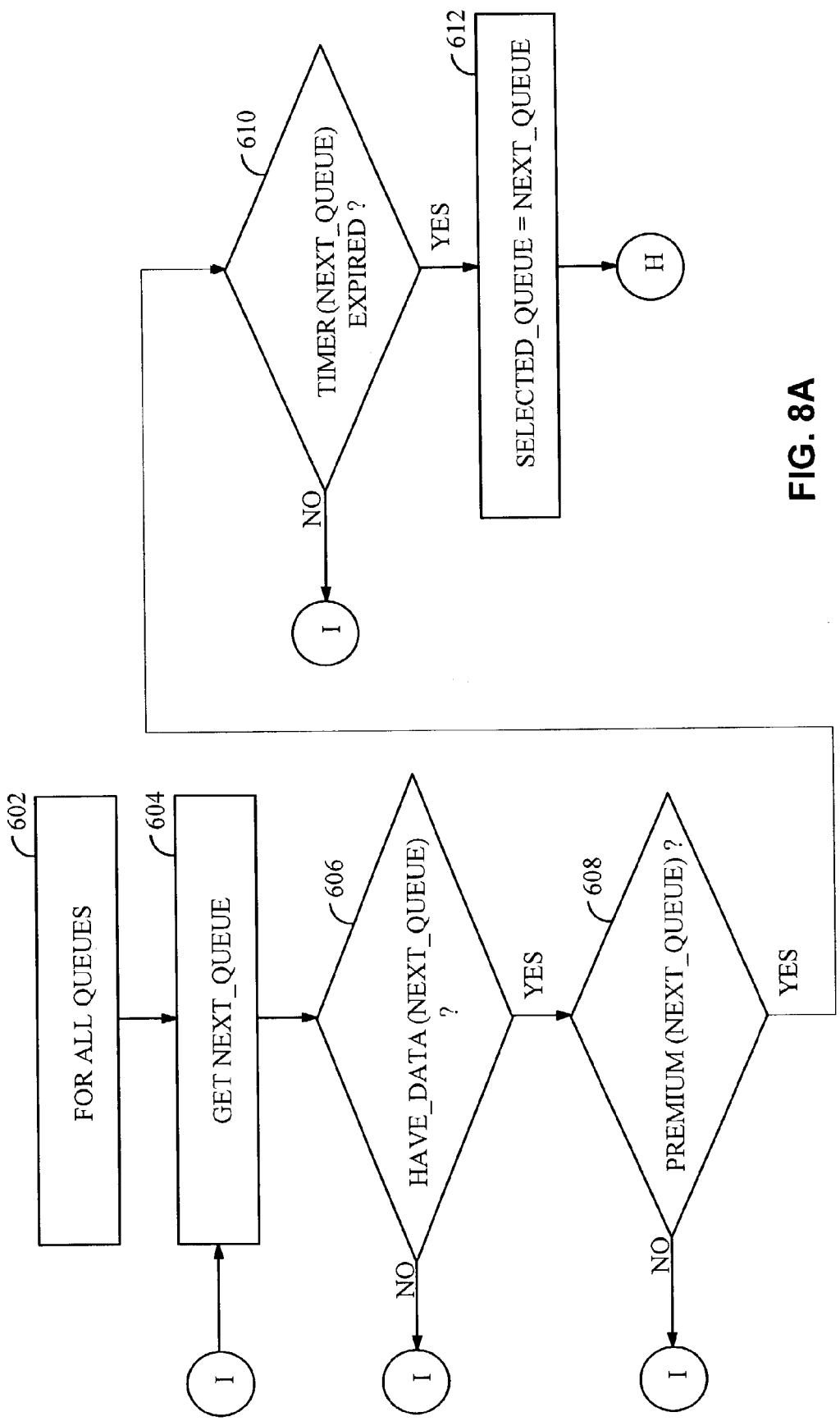
FIGS. 8A and 8B show a flow diagram illustrating a third embodiment of the process for selecting a queue to receive data transmission in a service interval identified in FIG. 3.
Figures 8B, 9:
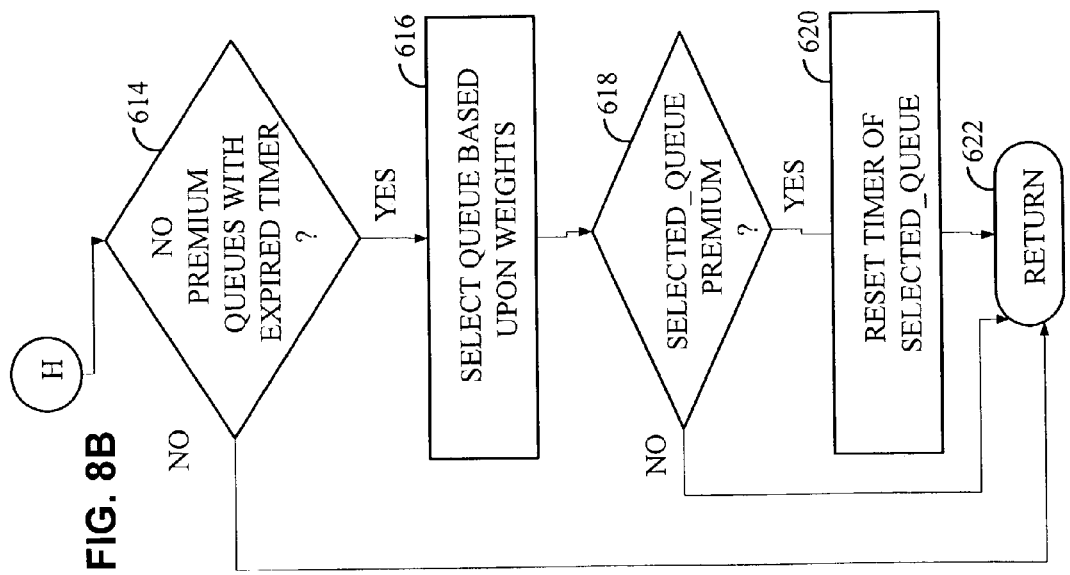
FIG. 9 shows a high level flow diagram illustrating an alternate process for updating the weights for a selected queue in the embodiment identified in FIG. 3.

FIGS. 8A and 8B show a flow diagram illustrating a third embodiment of the logic executed at step 110 at FIG. 3 for selecting a queue for transmission. In this embodiment, subscribers of select remote units 6 are guaranteed a minimum average rate of data transmission. For each such premium remote unit, the channel scheduler 12 maintains a timer, which alerts the channel scheduler 12 to schedule a transmission to its premium queue, regardless of the weights associated with the remaining queues. The time interval for the particular timer is determined based upon the average data rates guaranteed to the customer, the service interval assigned to that data queue at step 108 (see center column of Table 1), and any instantaneous data rate for receiving data determined at step 106. Thus, the time interval associated with the premium queue timer is dynamic with respect to these values. According to an embodiment, the timer interval is determined whenever the timer is reset as follows:

$$T_j = \frac{\text{Data\_Size}(L_j)}{r_j}$$

where:

$T_j$=timer interval for premium queue j

Data_Size ($L_j$)=quantity of data to be transmitted in service interval assigned to the premium queue j $r_j$=average data transmission rate guaranteed to the premium subscriber associated with the premium queue j The timer is reset at either of two events. The first event initiating a reset of the timer is an expiration of the timer interval. The second event for initiating a reset of the timer is a selection of the associated premium data queue based upon its associated weight in a manner discussed above with reference to FIGS. 6A through 6C.

Steps 606 through 610 determine whether the Next_Queue is a premium queue entitled to a minimum average rate of receiving data and, if so, whether the timer associated with that premium queue has expired. If the timer has expired, step 612 assigns the identity of the Next_Queue to the Selected_Queue and execution at step 110 completes. The weight of the selected queue is then updated at step 112 as discussed above. If there are no premium queues with an expired timer, step 614 initiates the selection of the queue for transmission in the subsequent service interval at step 616 based upon the weights of the queues in a manner discussed above with references to FIGS. 6A through 6C. If the queue selected at step 616 is a premium queue having an associated timer, step 618 initiates a reset of the timer associated with the selected queue at step 620.

As outlined above, the timer associated with any particular premium data queue is reset following its selection based upon the associated weight at step 620. The associated timer is also reset when it expires before selection of the data queue. The timer thus alerts the channel scheduler 12 to override the logic directed to selecting data queues based upon weights to ensure that this subscriber is associated with the premium data queues receive a guaranteed minimum average rate of receiving data.

FIG. 9 shows an alternate embodiment of the process for updating the weights at step 110 (FIG. 3). This alternate embodiment allows the selection of a queue that does not have the smallest weight. Volatility in transmission rates makes it advantageous to sometimes select a queue that does not have the smallest weight. For example, a queue might have the lowest weight during a time slot when its requested rate is temporarily low. If the rate increases in a subsequent time slot, then transmission may then take place at the higher rate. Waiting a few time slots may allow transmission from that low-weight queue at a higher requested rate.

The alternate embodiment begins with step 702 by determining the sum of the values M and K. M is the minimum weight of all queues, including those with no data to send or with invalid DRC values. K is an offset used to define a range of weight values within which a queue is selected based on a Desirability Metric.

After determining the sum of M and K, a decision is made in step 704 about whether or not to use the Desirability Metric for queue selection. The Desirability Metric is only used to choose among queues having weights less than or equal to (M+K) as well as having valid DRC's and data to send.

First, all queues having valid DRC's and data to send are evaluated to determine how many also have a weight greater than the sum (M+K). If all queues having valid DRC's and data to send also have weights greater than the sum (M+K), then the lowest-weight queue among them is selected in step 706. If one or more queues with valid DRC's and data to send have a weight less than or equal to (M+C), then one of those queues is selected in step 708 according to the Desirability Metric.

Once a queue is selected in either step 706 or step 708, then queue selection is complete (shown as step 710), and processing continues from step 110 to 112 as in FIG. 3.

Figure 10:
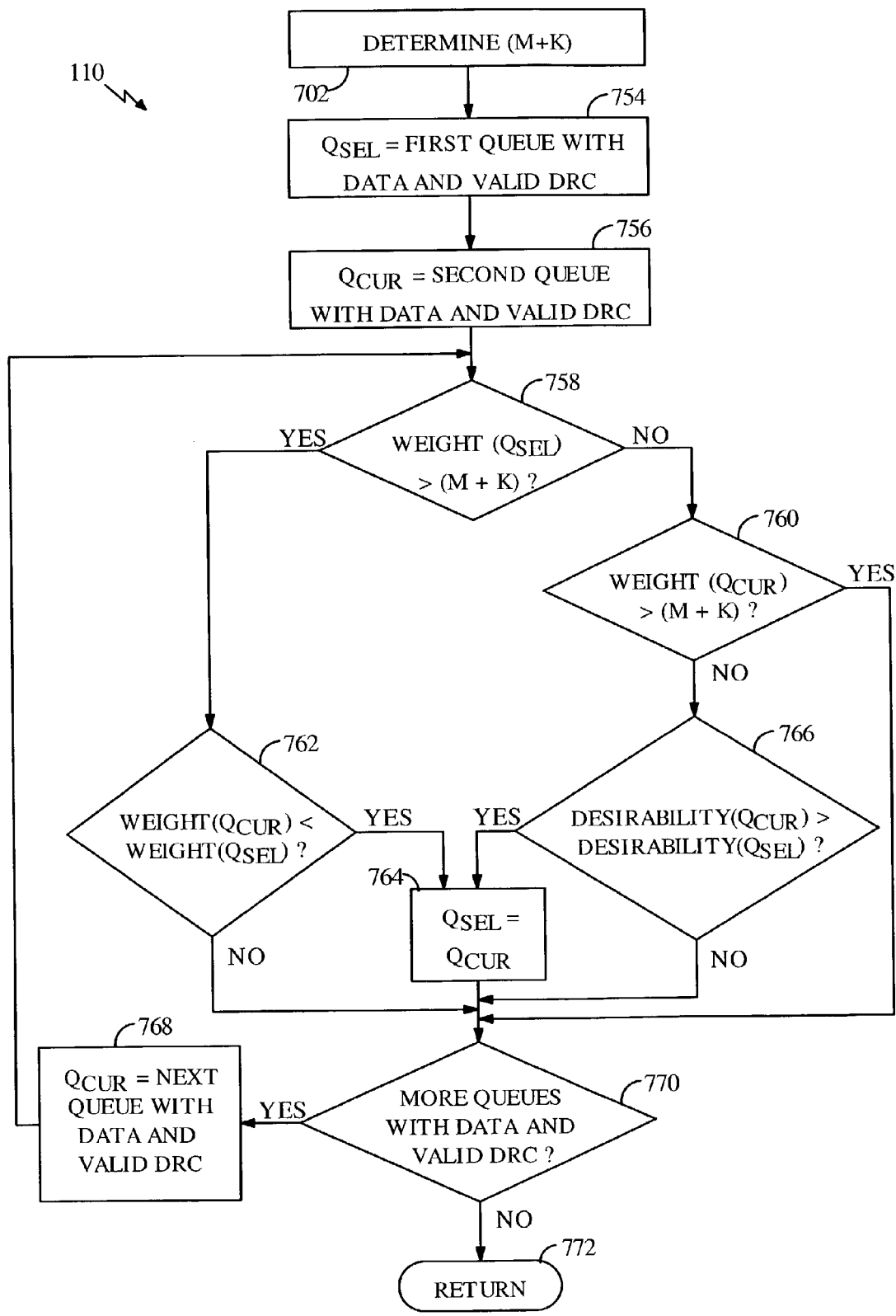
FIG. 10 shows a detailed flow diagram of an embodiment of the process shown in FIG. 9.

FIG. 10 is a more detailed flow chart depicting an exemplary embodiment of the queue selection method depicted in FIG. 9. In FIG. 10, after determining in step 702 the sum (M+K), each queue that has a valid DRC and data to send is evaluated and one queue is selected and returned from step 110.

In the exemplary embodiment, the first step 702 is again to determine the sum (M+K). If there are no queues having data and a valid DRC, then no queue is selected and the method proceeds to step 772 (return to the flow of FIG. 3). If there is only one queue in the list having data and a valid DRC, that queue is returned. Otherwise, $Q_{SEL}$ and $Q_{CUR}$ are assigned in steps 754 and 756 from the two or more queues having data and a valid DRC. $Q_{SEL}$ represents the currently selected queue, and $Q_{CUR}$ represents the current queue being compared with $Q_{SEL}$. Each queue having data and a valid DRC is compared with $Q_{SEL}$, and if certain selection criteria are met, that queue replaces the current $Q_{SEL}$. After all queues have been evaluated, the $Q_{SEL}$ remaining is the selected queue for transmission and is returned at step 772.

At step 758, the weight of the selected queue $Q_{SEL}$ is compared to (M+K). If the weight of $Q_{SEL}$ is greater than (M+K), then the decision in step 762 of whether to replace $Q_{SEL}$ with $Q_{CUR}$ in step 764 is based solely on which queue has the lower weight. If at step 758 the weight of selected queue $Q_{SEL}$ is less than or equal to (M+K), then the weight of current queue $Q_{CUR}$ is compared to (M+K) at step 760. If only $Q_{SEL}$ is less than or equal to (M+K), then $Q_{CUR}$ is not selected and the method proceeds to step 770. If the weights of both $Q_{SEL}$ and $Q_{CUR}$ are less than or equal to (M+K), then in step 766 the queues are evaluated according to a Desirability Metric. If $Q_{CUR}$ is deemed more desirable than $Q_{SEL}$ according to the Desirability Metric, then $Q_{CUR}$ becomes the new selected queue $Q_{SEL}$ in step 764).

After each queue is evaluated, step 770 checks for queues having data to send and a valid DRC that remain to be evaluated. If more such queues remain to be evaluated, then one is selected in step 768 as the next $Q_{CUR}$, and is evaluated beginning at step 758. If no more queues remain to be evaluated, then the selected queue $Q_{SEL}$ is returned at step 772.

Several alternate embodiments of the present invention vary in the method used to determine K. In some embodiments, K is simply a constant. In other embodiments, K is calculated at the beginning of each round of queue selections. Some alternate embodiments also differ in the Desirability Metric used. Any methods of determining K or Desirability Metrics may be used without departing from the present invention.

In a particular embodiment using a "Modified Grade of Service (GOS)" algorithm, K is a constant that does not depend on the number of remote stations in the system. A filtered average throughput is maintained for each user and associated queue according to the following equation:

$$\text{Average\_Throughput} = \{(11/TC) * \text{Old\_Average\_Throughput}\} + (1/TC * \text{Rate}) \quad (1)$$

where Average_Throughput is the average throughput for each queue used in calculating the Desirability Metric value of the queue, TC is a time constant, Old_Average_Throughput is the previous value of Average_Throughput, and Rate is the bit rate used to transmit from the queue in each time slot. The Average_Throughput is updated for each queue for every transmission time slot. For all queues except the selected queue in each time slot, the Rate will be zero. The Desirability Metric value of any queues evaluated at steps 708 or 766 are determined according to the following equation:

$$\text{Desirability\_Metric} = \text{Current\_Requested\_Rate} - \text{Average\_Throughput} \quad (2)$$

where Current_Requested_Rate is the DRC rate of the queue and Average_Throughput is as calculated in Equation (1).

One skilled in the art will appreciate that other formulas may be used to determine the Desirability Metric and the updated average throughput. For example, the formula for updating the average throughput may take into account more values of requested rate than the current value, such as the previous two requested rate values. Additionally, TC may vary over time based on the number of active users in the system or based on the variability of previous requested rates. Some of the alternate formulas that may be used to compute the Desirability Metric are described below.

The Modified GOS algorithm is advantageous in that it allows optimization of queue selection in an environment where DRC rates are changing over time. So, although one queue has the lowest weight during a particular time slot, that queue might not be selected if it is experiencing a transient decrease in its requested DRC rate. The Modified GOS algorithm permits a limited delay in transmission to such a queue in anticipation that the rate will increase for one of the subsequent time slots.

In an alternate embodiment using a "Modified GOS High DRC" algorithm, the Desirability Metric value is equal to the average throughput computed according to Equation (1). This algorithm results in slightly lower overall throughput, but requires less computational complexity. The Modified GOS High DRC algorithm does not require maintenance of a filtered average throughput value for each queue.

In another alternate embodiment using a "Hybrid" algorithm, the Desirability Metric value is equal to the Rate divided by Average_Throughput. The Hybrid algorithm sacrifices throughput to achieve a greater degree of "fairness" in selecting a queue for transmission by selecting a queue based on the percentage by which the requested rate exceeds the average rate. For example, the algorithm selects a first user having a requested Rate of 76.8K and an Average_Throughput of 30K instead of a second user having a requested Rate of 1228.8K and an Average_Throughput of 900K. Although greater overall throughput may be achieved by taking advantage of the rate spike of the second user, the Hybrid algorithm chooses the first user because the first user has a current rate that is more than twice his or her average throughput.

In a suboptimal embodiment, the Hybrid algorithm is modified by varying K according to the number of users to create a "Modified Hybrid" algorithm. In the Modified Hybrid algorithm, K is inversely proportional to the number of users, and the Desirability Metric value is equal to the Rate divided by Average_Throughput. By varying K according to the number of users to modify the Modified GOS and Modified GOS High DRC algorithms, similar alternate suboptimal embodiments are created.

In an alternate suboptimal embodiment, the Hybrid algorithm is modified by varying K according to the number of users to create a "Modified Hybrid" algorithm. The Modified Hybrid algorithm seeks to impose an additional degree of "fairness" at the expense of throughput.

Figure 11A:
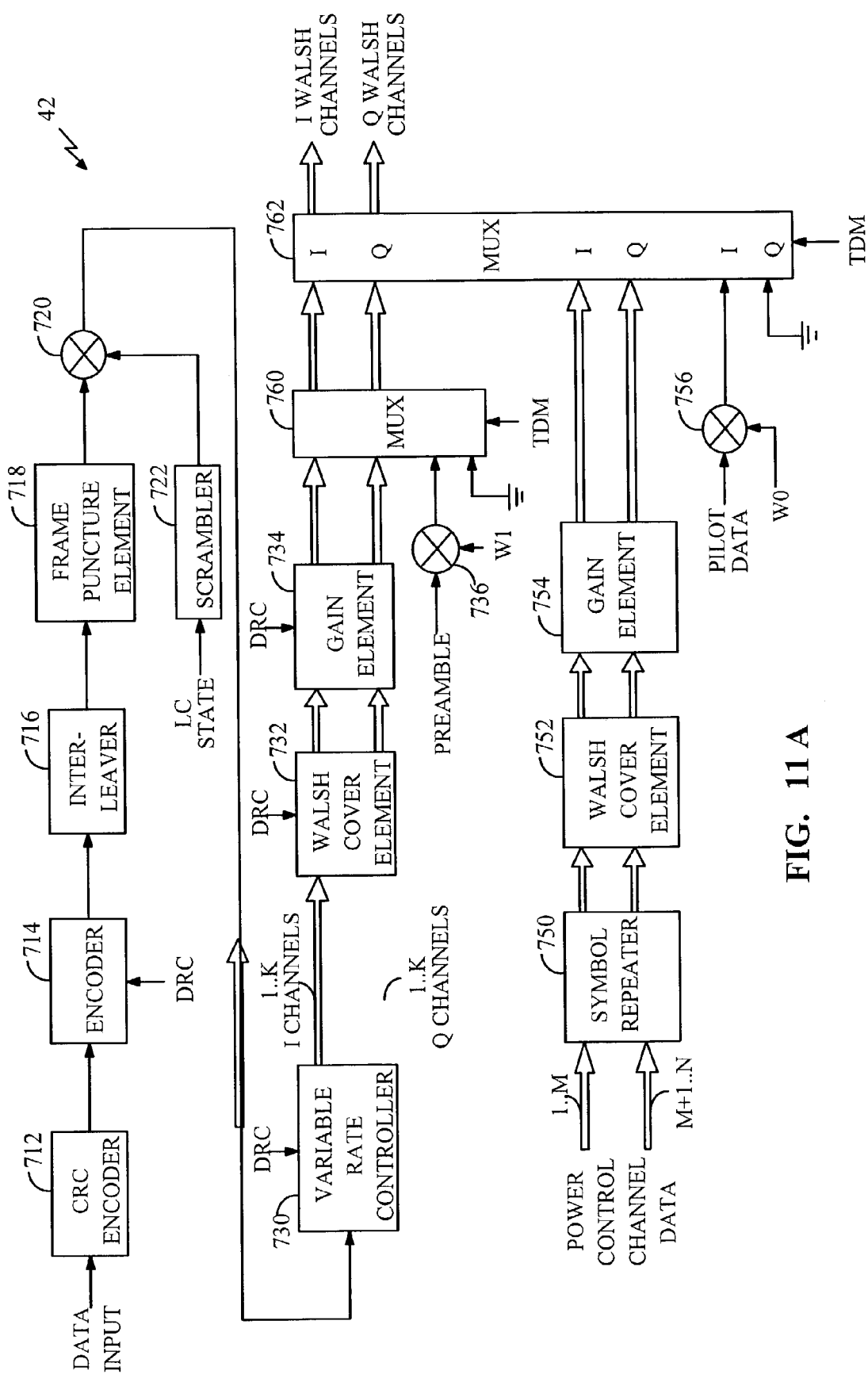
FIGS. 11A-11B are block diagrams of the exemplary forward link architecture of the present invention.

FIG. 11A is a block diagram of a forward link architecture configured in accordance with an exemplary embodiment of the present invention. The data is partitioned into data packets and provided to CRC encoder 712. For each data packet, CRC encoder 712 generates frame check bits (e.g., the CRC parity bits) and inserts code tail bits. The formatted packet from CRC encoder 712 comprises the data, the frame check and code tail bits, and other overhead bits described below. In the exemplary embodiment, encoder 714 encodes the formatted packet in accordance with the encoding format disclosed in U.S. Pat. No. 5,933,462, issued Aug. 3, 1999, assigned to the assignee of the present invention and incorporated by reference herein. One skilled in the art will appreciate that other well known encoding formats may also be used and are within the scope of the present invention. The encoded packet from encoder 714 is provided to interleaver 716, which reorders the code symbols in the packet. The interleaved packet is provided to frame puncture element 718, which removes a fraction of the packet in a manner described below. The punctured packet is provided to multiplier 720, which scrambles the data with the scrambling sequence from scrambler 722. Puncture element 718 and scrambler 722 are described in detail in the aforementioned U.S. patent application Ser. No. 08/963,386. The output from multiplier 720 comprises the scrambled packet.

The scrambled packet is provided to variable rate controller 730, which demultiplexes the packet into K parallel inphase and quadrature channels, where K is dependent on the data rate. In the exemplary embodiment, the scrambled packet is first demultiplexed into the inphase (I) and quadrature (Q) streams. In the exemplary embodiment, the I stream comprises even-indexed symbols and the Q stream comprises odd-indexed symbols. Each stream is further demultiplexed into K parallel channels such that the symbol rate of each channel is fixed for all data rates. The K channels of each stream are provided to Walsh cover element 732, which covers each channel with a Walsh function to provide orthogonal channels. The orthogonal channel data are provided to gain element 734, which scales the data to maintain a constant total-energy-per-chip (and hence constant output power) for all data rates. The scaled data from gain element 734 is provided to multiplexer (MUX) 760, which multiplexes the data with the preamble. The preamble is discussed in detail in the aforementioned U.S. patent application Ser. No. 08/963,386. The output from MUX 760 is provided to multiplexer (MUX) 762, which multiplexes the traffic data, the power control bits, and the pilot data. The output of MUX 762 comprises the I Walsh channels and the Q Walsh channels.

In the exemplary embodiment, a forward link pilot channel provides a pilot signal that is used by remote stations 6 for initial acquisition, phase recovery, timing recovery, and ratio combining. These uses are similar to those in CDMA communication systems conforming to the IS-95 standard. In the exemplary embodiment, the pilot signal is also used by remote stations 6 to perform the C/I measurement.

The block diagram of the forward link pilot channel of the exemplary embodiment is also shown in FIG. 11A. In the exemplary embodiment, the pilot data comprises a sequence of all zeros (or all ones), which is provided to multiplier 756. Multiplier 756 covers the pilot data with Walsh code $W_0$. Since Walsh code $W_0$ is a sequence of all zeros, the output of multiplier 756 is the pilot data. The pilot data is time multiplexed by MUX 762 and provided to the I Walsh channel, which is spread by the short $PN_I$ code within complex multiplier 814 (see FIG. 11B).

The exemplary block diagram of the power control channel is also shown in FIG. 11A. The Reverse Power Control (RPC) bits are provided to symbol repeater 750, which repeats each RPC bit a predetermined number of times. The repeated RPC bits are provided to Walsh cover element 752, which covers the bits with the Walsh covers corresponding to the RPC indices. The covered bits are provided to gain element 754, which scales the bits prior to modulation to maintain a constant total transmit power. In the exemplary embodiment, the gains of the RPC Walsh channels are normalized so that the total RPC channel power is equal to the total available transmit power. The gains of the Walsh channels may be varied as a function of time for efficient utilization of the total base station transmit power while maintaining reliable RPC transmission to all active remote stations 6. In the exemplary embodiment, the Walsh channel gains of inactive remote stations 6 are set to zero. Automatic power control of the RPC Walsh channels is possible using estimates of the forward link quality measurement from the corresponding DRC channel from remote stations 6. The scaled RPC bits from gain element 754 are provided to MUX 762.

Figure 11B:
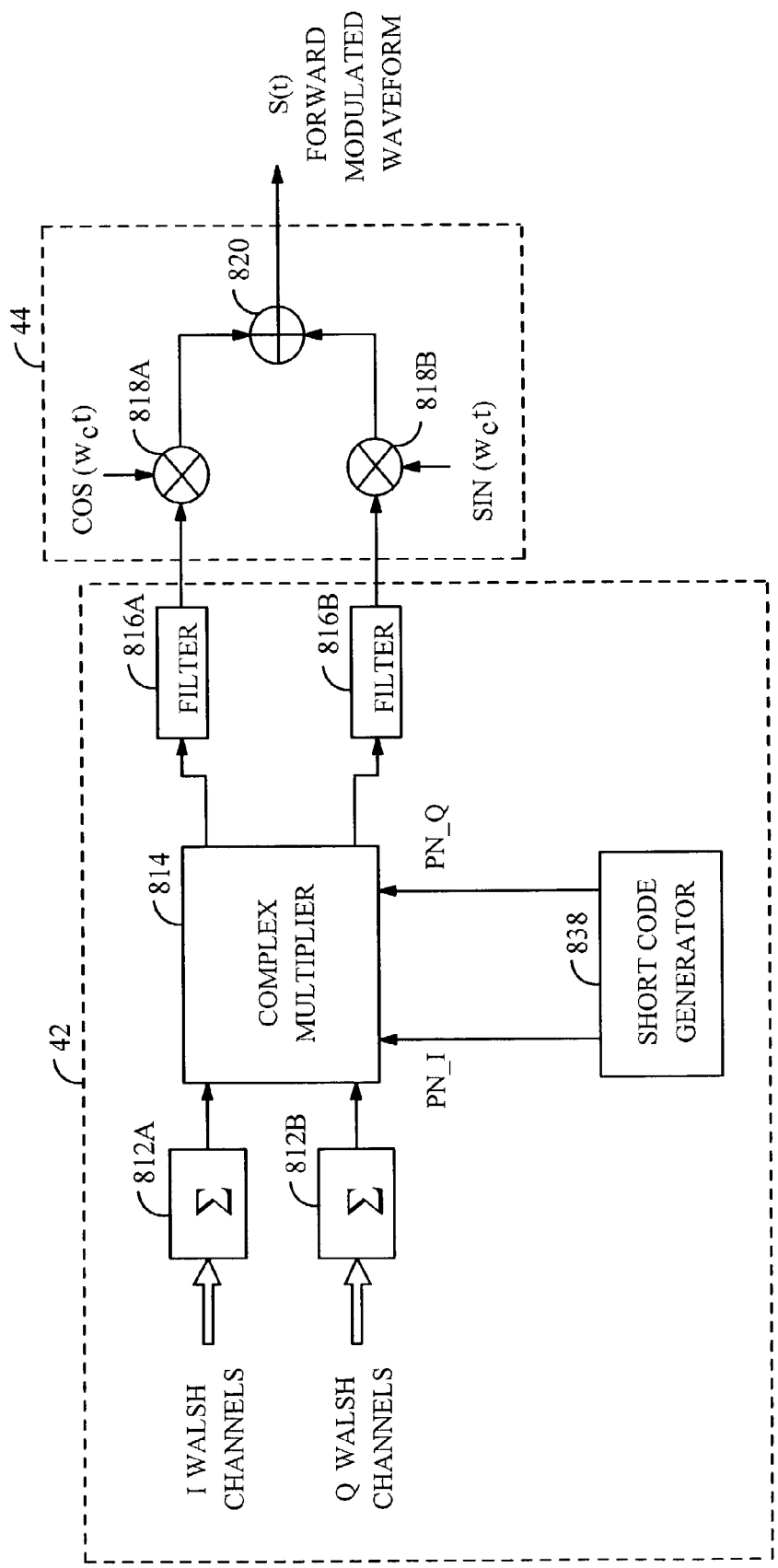

A block diagram of the exemplary modulator used to modulate the data is illustrated in FIG. 11B. The I Walsh channels and Q Walsh channels are provided to summers 812A and 812B, respectively, which sum the K Walsh channels to provide the signals $I_{sum}$ and $Q_{sum}$, respectively. The $I_{sum}$ and $Q_{sum}$ signals are provided to complex multiplier 814. Complex multiplier 814 also receives short $PN_I$ and $PN_Q$ sequences from short code generator 838, and multiplies the two complex inputs in accordance with the following equation:

$$(I_{mult} + jQ_{mult}) = (I_{sum} + jQ_{sum}) \cdot (PN\_I + jPN\_Q) \qquad (3)$$
$$= (I_{sum} \cdot PN\_I - Q_{sum} \cdot PN\_Q) +$$
$$j(I_{sum} \cdot PN\_Q + Q_{sum} \cdot PN\_I),$$

where $I_{mult}$ and $Q_{mult}$ are the outputs from complex multiplier 814 and j is the complex representation. The $I_{mult}$ and $Q_{mult}$ signals are provided to filters 816A and 816B, respectively, which filter the signals. The filtered signals from filters 816A and 816B are provided to multipliers 818A and 818B, respectively, which multiply the signals with the inphase sinusoid $COS(w_c t)$ and the quadrature sinusoid $SIN(w_c t)$, respectively. The I modulated and Q modulated signals are provided to summer 820 which sums the signals to provide the forward modulated waveform S(t).

The block diagram of the exemplary traffic channel shown in FIGS. 3A and 3B is one of numerous architectures that support data encoding and modulation on the forward link. Other architectures, such as the architecture for the forward link traffic channel in the CDMA system conforming to the IS-95 standard, may also be utilized and are within the scope of the present invention.

For example, one skilled in the art will appreciate that complex multiplier 814 and short code generator 838 may be replaced by a pseudonoise (PN) spreader that performs simple multiplication of signals by PN short codes instead of complex multiplication. In addition, encoder 714 may use any of several forward error correction techniques including turbo-coding, convolutional coding, or other forms of soft decision or block coding. Also, interleaver 716 may utilize any of a number of interleaving techniques, including block interleaving, e.g., bit reversal interleaving, or pseudo-random interleaving.

Adaptive Weighted Scheduling Algorithm

Still further, a problem exists when multimedia services, or other services having a variety of transmission requirements, are transmitted in a wireless communication system, wherein the multimedia service transmissions, referred to as "flows" (which are described further hereinbelow), create bursty traffic. Bursty traffic is characterized by several variables, including a measure of burstiness, and an average data rate. Additionally, there is a need to satisfy a Quality of Service (QoS) requirements for each of the various flows in the system. The current scheduling methods, such as the Proportional Fair (PF) algorithm, generally select a flow to serve based upon a metric given as a ratio of a requested data rate, referred to as Data Rate Control data request or "DRC," to throughput, identified as "T." Such calculations may not guarantee the required QoS of all users. Therefore, pure PF algorithms may not provide sufficient complexity to satisfy the QoS requirements of users accessing multimedia or other applications. There is a need for a scheduler able to satisfy these various requirements.

Note that the following discussion considers a cdma2000 system supporting High Rate Packet Data (HRPD) services as described in IS-856. This system is used as an example. The present invention is applicable to other systems wherein users are selected for service according to a scheduling algorithm In an HRPD system, the air interface may support up to four parallel application streams. The first stream carries Signaling, and the other three may be used to carry applications with different Quality of Service (QoS) requirements or other applications.

The following glossary is provided for clarity in understanding one embodiment presented hereinbelow. The following glossary is not intended to be exhaustive. The following glossary is not intended to limit the present invention thereto, but rather is provided for clarity and understanding with respect to one embodiment of a communication system supporting an adaptive weighted scheduling algorithm.

GLOSSARY

Access Network (AN)—the network equipment providing data connectivity between a cellular network and a packet switched data network (typically the Internet) and the ATs. An AN in an HRPD system is equivalent to a base station in a cellular communication system.

Access Terminal (AT)—a device providing data connectivity to a user. An AT in an HRPD system corresponds to a mobile station in a cellular communication system. An AT may be connected to a computing device such as a laptop personal computer or it may be a self-contained data device such as a Personal Digital Assistant (PDA).

Application flow—the designated transmission path from source to AT for a given application stream. Each application flow is identified by a source, destination, traffic profile and quality of service profile.

Application stream—a data communication corresponding to an application. Most applications streams have designated quality of service requirements.

Automatic repeat request (ARQ)—a mechanism whereby the transmitter initiates a retransmission of data based on occurrence or non-occurrence of an event.

Average data rate (r)—average input data rate over time for a given application flow.

Average delay (AvgD)—average of the delay incurred over multiple packets or bits from an AN to an AT.

Burstiness ($\sigma$)—measure of the burstiness or density and relation in time of packets in an application flow.

Data Rate Control (DRC)—a mechanism whereby an AT transmits a requested data rate to the AN.

Deficit Packets (defpkts)—defined for flow k at the beginning of slot n. The deficit packet is a packet not yet transmitted in the flow, and defpkts is specifically defined as the number of equal-size (MAC) packets that have stayed in the BTS longer than the delay threshold for flow k.

Deficit Bits (defbits)—number of bits corresponding to the deficit packets.

Delay bound—specified time allowed for transmission of a packet of data from AN to AT.

Delay threshold—function of delay bound or jitter bound and used to compute defpkts.

Delay compensation factor ($\Phi$)—compensation factor used to compensate for delay violations.

DRC compensation factor ($\beta$)—compensation factor accounting for data request requirements associated with a user of an application flow. Used to do graceful recovery of applications.

Enhanced Jitter Threshold (dv)—used for computation of enhanced jitter compensation function on detection of jitter violation between two consecutive IP packets of a flow.

Flow weight (w)—initial weight value applied to each application flow using an adaptive weighted scheduling algorithm. Adaptive weight (aw) is its adaptive value.

Forward Link (FL)—transmission air link from AN to AT.

Head Of Line (HOL) packet—first packet in a queue.

High Rate Packet Data (HRPD)—a data service transmitting packet data communications at a high data rate. Also referred to as High Data Rate (HDR), and specified in the IS-856 standard entitled "cdma2000 High Rate Packet Data Air Interface Specification."

Jitter—time variation between received successive packets.

Jitter bound (j)—bound on the jitter for a given application flow.

(Enhanced) Jitter compensation factor ($\delta$)—compensation factor to compensate for jitter violations for a flow.

Normalized Deficit Packets (ndefpkts)—normalized deficit packets computed using deficit packets and required rate of that flow.

Normalized Deficit Bits (ndefbits)—normalized deficit bits corresponding to normalized deficit packets.

Motion Pictures Experts Group (MPEG)—protocol for transmission of multimedia materials.

Pending packets—$\text{pend}_{k,j}[n]$—number of pending bytes of IP packet j of flow k in the BTS and BSC in the slot n.

Proportional Fair (PF) algorithm—a scheduling algorithm wherein data communications are scheduled according to a selection factor calculated for each AT as a ratio of a requested data rate to throughput.

Quality of Service (QoS)—requirements relating to transmission of a packet data communication, including but not limited to, delay, required rate, and jitter.

QoS and network compensation functions ($\Phi,\gamma,\alpha,\beta,\delta$)—compensation functions as used in the adaptive weighted scheduling algorithm.

Quality of Service Group (QSG)—group of application types that have similar QoS requirements.

Rate compensation factor ($\alpha$)—compensation factor calculated to compensate for rate violations.

Rate of Service (R) or required rate (required_rate)—rate requested by a flow.

Reverse Link (RL)—transmission air link from AT to AN.

Rx—Retransmission queue storing application flows scheduled for retransmission.

Selection metric (Y)—metric used for comparison of application flows for scheduling determinations.

Traffic Profile ($\sigma$, r)—measures relating to burstiness and data rate.

Tx—Transmission queue storing application flows for a given BTS. Waiting time parameter ($\gamma$)—measure of waiting time for the HOL of an IP packet within the AN.

Applying Adaptive Weights to the Proportion Fair Scheduling Algorithm

A Proportional Fair (PF) scheduling algorithm, which selects a flow to serve based upon the metric DRC/T, is described for the Forward Link of a cdma2000 1xEV-DO network. The PF algorithm is designed to provide each user with approximately the same number of transmission slots. To enhance such a scheduling algorithm, described herein is an adaptive weighted DRC/T algorithm, which extends and optimizes the DRC/T algorithm to satisfy the various QoS requirements for different types of applications. Each multimedia application has a respective specified QoS requirement. The goals of a scheduling algorithm includes satisfying the various QoS requirements. The adaptive w*DRC/T algorithm presented herein provides a variety of performance benefits over the DRC/T algorithm for forward link of a cdma2000 1xEV-DO network wherein application flows include multimedia application services. Delay and jitter bound requirements of delay and jitter sensitive applications on forward link of a CDMA 1xEV-DO network are met. Further, an adaptive scheduling algorithm ensures that rate requirements are met and the average delay is reduced for multimedia applications. While multimedia applications are provided as an example to illustrate implementation of an adaptive scheduling algorithm, the methods and apparatus described herein may be applied to other applications having QoS requirements or other quantifiable requirements associated therewith.

For applications having rate and latency requirements, such as web browsing and gaming, an adaptive scheduling algorithm provides rate guarantees and reduces average delay. For other applications having only rate requirements, an adaptive weighted scheduling algorithm may be used to satisfy the rate guarantees. While providing these QoS guarantees, an adaptive weighted scheduling algorithm also works to maintain the total throughput at a reasonably high level and achieve a total throughput close to that achieved when a pure PF scheduling algorithm is used, wherein pure PF scheduling refers to an algorithm employing the DRC/T calculation. While giving extra resources to flows with QoS violations, an adaptive weighted scheduling algorithm distributes available resources in a fair manner. Various compensation mechanisms consistent therewith are provided herein.

Figure 12:
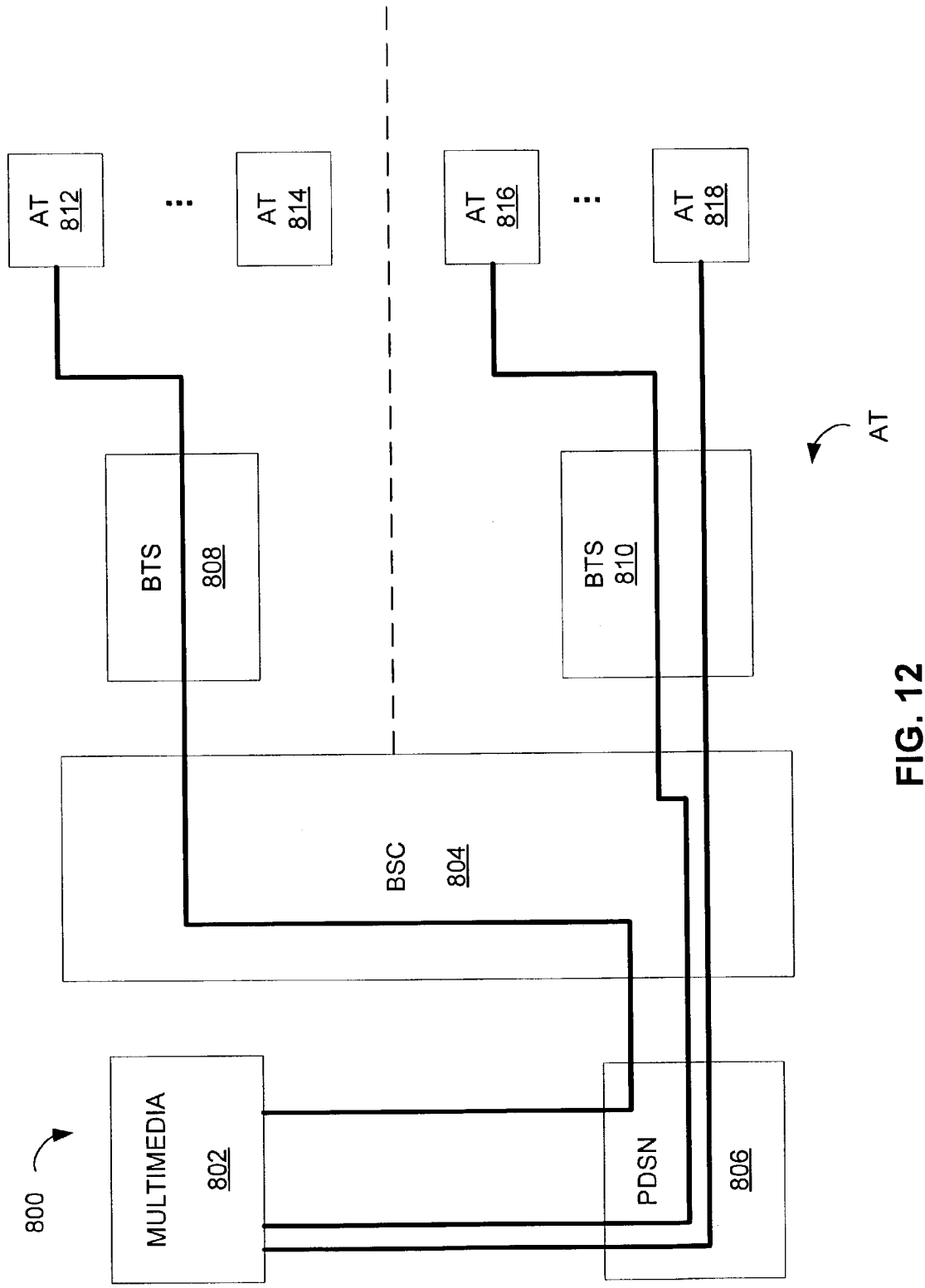
FIG. 12 is a communication system supporting multimedia applications, wherein each application communication is represented by an application flow.

FIG. 12 illustrates a system 800, which supports multimedia applications. Note again that the present invention is applicable to other systems wherein flows have QoS requirements. System 800 includes multimedia source 802 coupled to a Packet Data Service Node (PDSN) 806. The PDSN 806 is also coupled to the Base Station Controller (BSC) 804, which may include multiple BSCs. The BSC 804 communicates with the various ATs 812, 814, 816, 818, etc., via Base Station Transceiver Systems (BTSs) 808, 810. The system 800 may include more BTSs and ATs than those illustrated. Three flows are illustrated: a first flow from multimedia source 802 via PDSN 806, BSC 804, and BTS 808, to AT 812; a second flow from multimedia source 802 via PDSN 806, BSC 804, and BTS 810, to AT 816; and a third flow from multimedia source 802 via PDSN 806, BSC 804, and BTS 810 to AT 818. Note that one AT may be the destination of multiple flows. In one example, transmission of a Moving Picture Experts Group (MPEG) type application separates the audio and video into separate flows.

Each application flow to be transmitted in system 800 has an associated source address, destination address, and QoS requirements. The application flow is then scheduled for transmission from the source to the destination. The application flow traverses a path, similar to one of those illustrated in FIG. 12.

Figure 13:
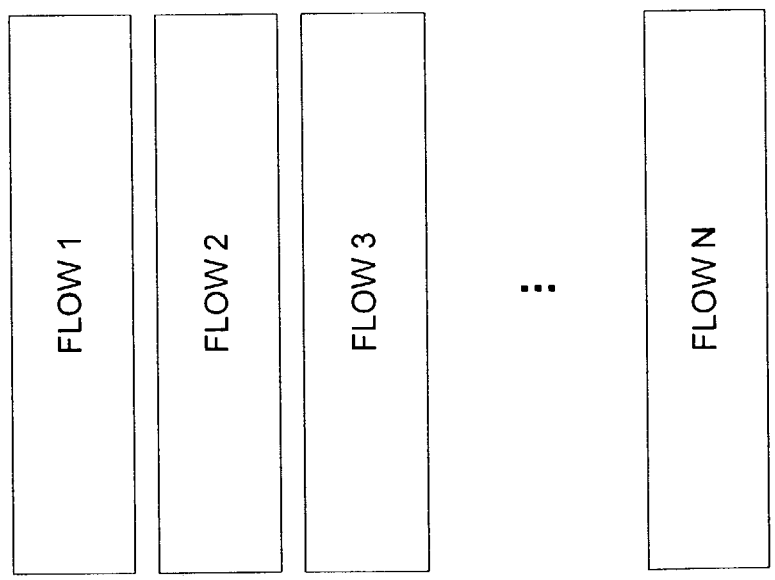
FIG. 13 is an application flow queue.

Each BTS 808, 810 is adapted to maintain a queue of flows as illustrated in FIG. 13. Note each BTS maintains one set of queues corresponding to each application flow on its Forward Link (FL). One application flow is directed to one AT. Note, however, multiple flows may be directed to an AT. Each flow has a Quality of Service Group (QSG) type associated therewith. For each of the flows in a queue, the BTS maintains a set including three separate queues: (1) original transmission queue (Tx); (2) retransmission queue (Rx); and (3) automatic repeat request queue (ARQ). In one embodiment, the ARO queue may correspond to a queue storing flows for any type repeat mechanism performed between the BTS and the MS, such as an early decision ARO. The multimedia applications may include a delay sensitive application, such as video conferencing, having delay bound requirements. The delay bound is a specified time allowed from transmission from an AN to receipt by an AT. An adaptive weighting algorithm works to meet the delay bound requirements and to reduce the average delay experienced by IP packets of such applications. For applications having both rate and average delay requirements, an adaptive weighted scheduling algorithm works to meet the rate requirements and to reduce the average delay.

Another consideration for some types of applications, such as multimedia video applications, is the "jitter" experienced between successive packets in a multimedia transmission. Jitter refers to the variation in time between received packets. Jitter occurs when successive waveforms arrive at the receiver slightly early or late. In wireless communications, such waveforms typically convey a logical one or zero, which is then decoded at the receiver. The timing variations defined as jitter distort the visual impact of the received transmission. An adaptive weighted scheduling algorithm reduces the worst-case delay variation as well as the delay variation between consecutive packets for delay sensitive applications.

While satisfying the QoS requirements of the various users, an adaptive algorithm is also designed to meet the rate requirements of application flows when those flows are "conforming." An application flow is said to be conforming if it sends data per the pre-specified traffic profile. If flows with rate requirements are non-conforming, i.e., sends more data than pre-specified in their traffic profiles, the algorithm gives higher preference to the flows with smaller data rate. While the adaptive weighted algorithm is described in the context of a cdma2000 1xEV-DO network herein, the concepts and methods may be applied to other types of wireless networks as well.

With respect to the multimedia application flows, each flow is defined by: (1) traffic profile; (2) QoS profile; (3) Internet Protocol (IP) source address; and (4) IP destination address. A flow may also include: (5) L4 protocol type; (6) L4 Port Number; and (7) L4 Destination Port Number, wherein L4 refers to the Transfer Control Protocol (TCP)/Unreliable Datagram Protocol (UDP) layer in a protocol stack. For example, MPEG-audio and MPEG-video flows corresponding to an MPEG application may be treated as separate flows.

Figure 14:
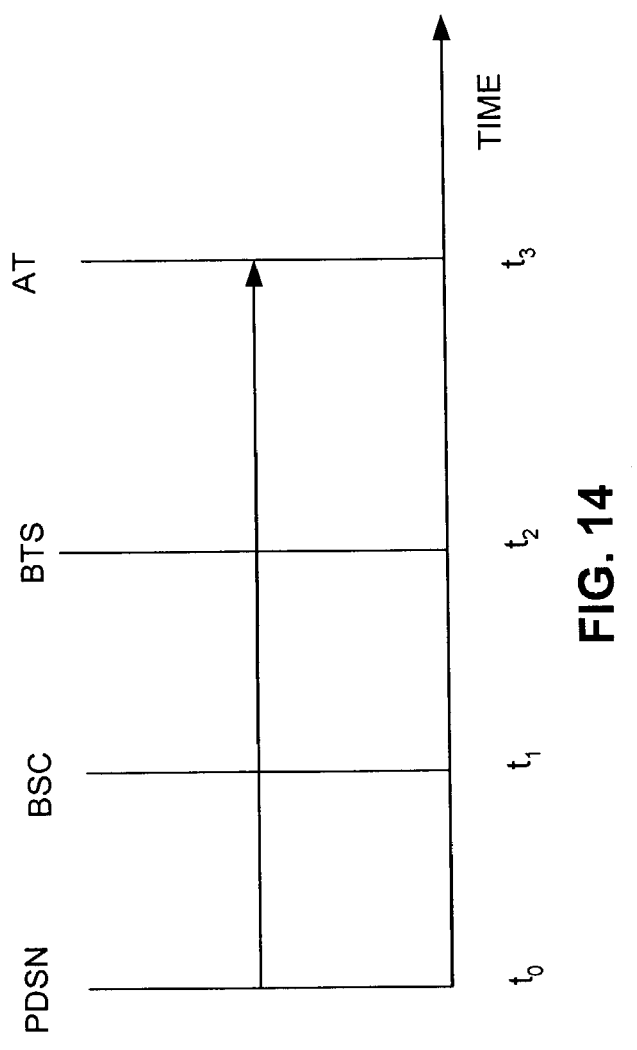
FIG. 14 is a timing diagram illustrating signal timing of part of an application flow.

Each flow is specified by a traffic profile and is monitored or shaped to ensure that it conforms to that traffic profile. The traffic profile is defined by a variable representing a measure of burstiness, identified as $\sigma$, and the average data rate of the flow, identified as r. Each flow is therefore described by a traffic profile ($\sigma$, r.) The QoS profile is defined by at least one of the following parameters: (1) delay bound, identified as "D," which defines the time allowed from transmission to receipt for an IP packet; (2) jitter bound, identified as "j," which defines the maximum allowable variation in time between received packets at the AT; (3) and a rate of service (or required rate), identified as "R" or "req_rate". For multimedia application flows, a system may specify the delay bound. For some other application flows, such as web browsing, the system may specify average delay (AvgD) in place of or in addition to delay bound;

To define the delay bound D, refer to FIG. 14, which is a timing diagram including various AN elements and an AT. A multimedia flow is transmitted from the multimedia source (not shown) via the PDSN, BSC, and BTS to the AT. An IP packet is transmitted from the PDSN at time $t_0$, and is received at the AT at time $t_3$. The parameter D defines the maximum allowable time from time $t_0$ to time $t_3$, i.e., D specifies the limit(s) of $t_3-t_0$.

Figure 15A:
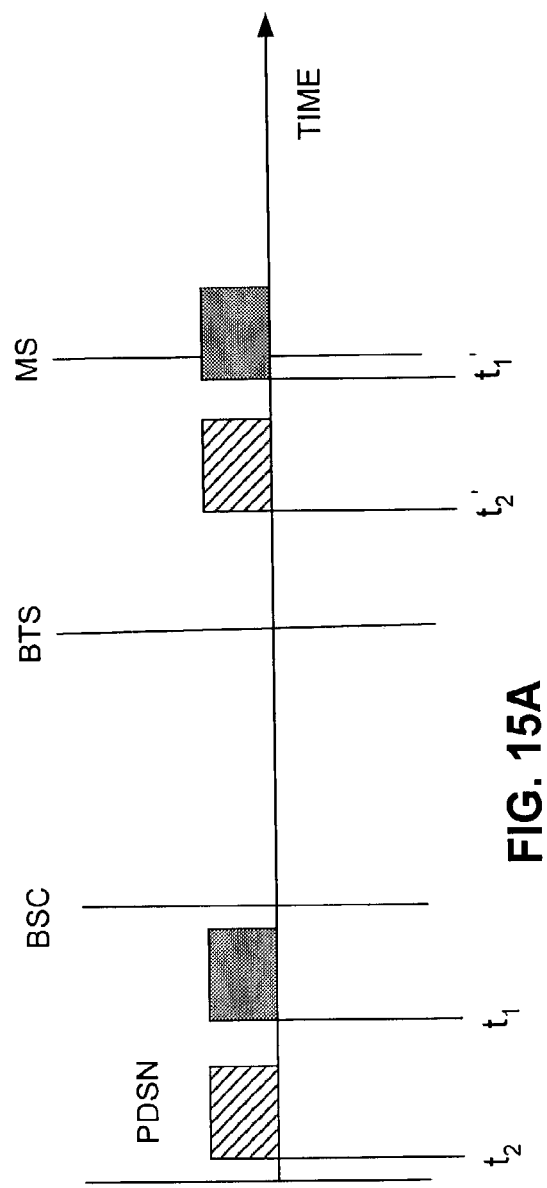
FIG. 15A is a timing diagram illustrating jitter measurements for an application flow.
Figure 15B:
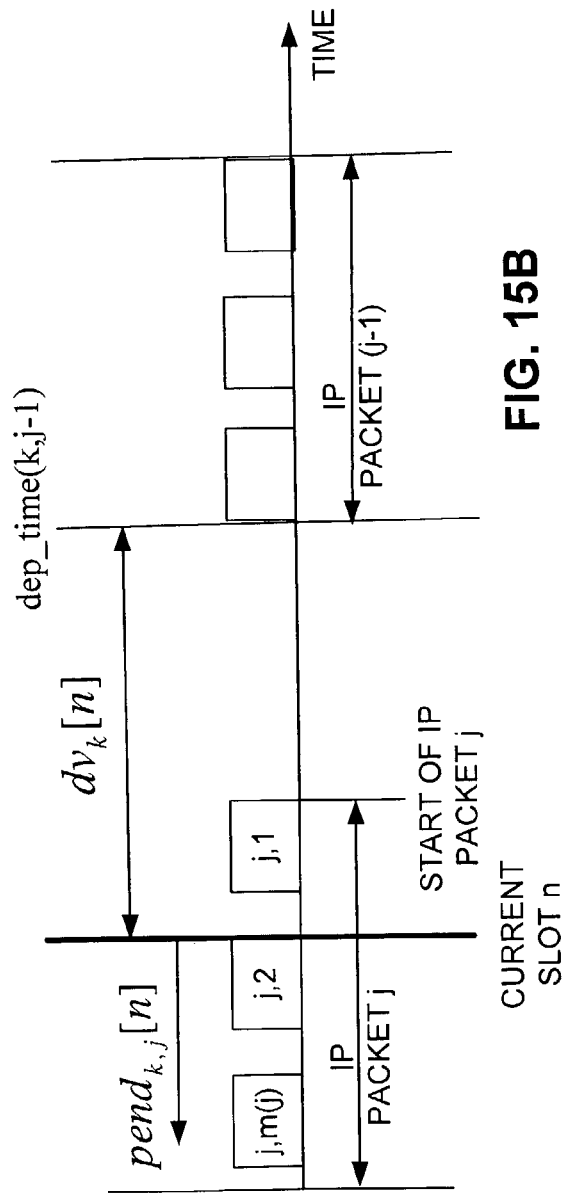
FIG. 15B is a timing diagram illustrating transmission of successive IP packets during time slots for processing an application flow.

To define the jitter bound, j, refer to FIG. 15A, which is a timing diagram including the AN elements and an AT. A first packet is transmitted at time $t_1$ from the PDSN and is received at time $t_1'$ at the AT. A second packet is transmitted at time $t_2$ from the PDSN and is received at time $t_2'$ at the AT. The jitter bound, j, defines the maximum allowable variation between successive packets, wherein the variation is given as $(t_2'-t_1')-(t_2-t_1)$. FIG. 15B further details successive IP packets transmitted over several slots.

In one embodiment, QoS profiles are categorized into groups, referred to as QoS Scheduling Groups (QSGs). Table 3 lists the QSGs by index along with the QoS parameters associated with each. Each QSG has specific parameters that are specified for application flows. Examples of the applications are also listed.

TABLE 3

| Index | Delay bound (D) | Jitter bound (J) | Rate of service (R) | Average Delay (AvgD) | Examples of Applications |
|---|---|---|---|---|---|
| 1 | X | X | X | — | MPEG conference, VoIP, video streaming |
| 2 | — | — | X | X | Web browsing |
| 3 | — | — | X | — | FTP |
| 4 | — | — | — | — | Best Effort |

Figure 16:
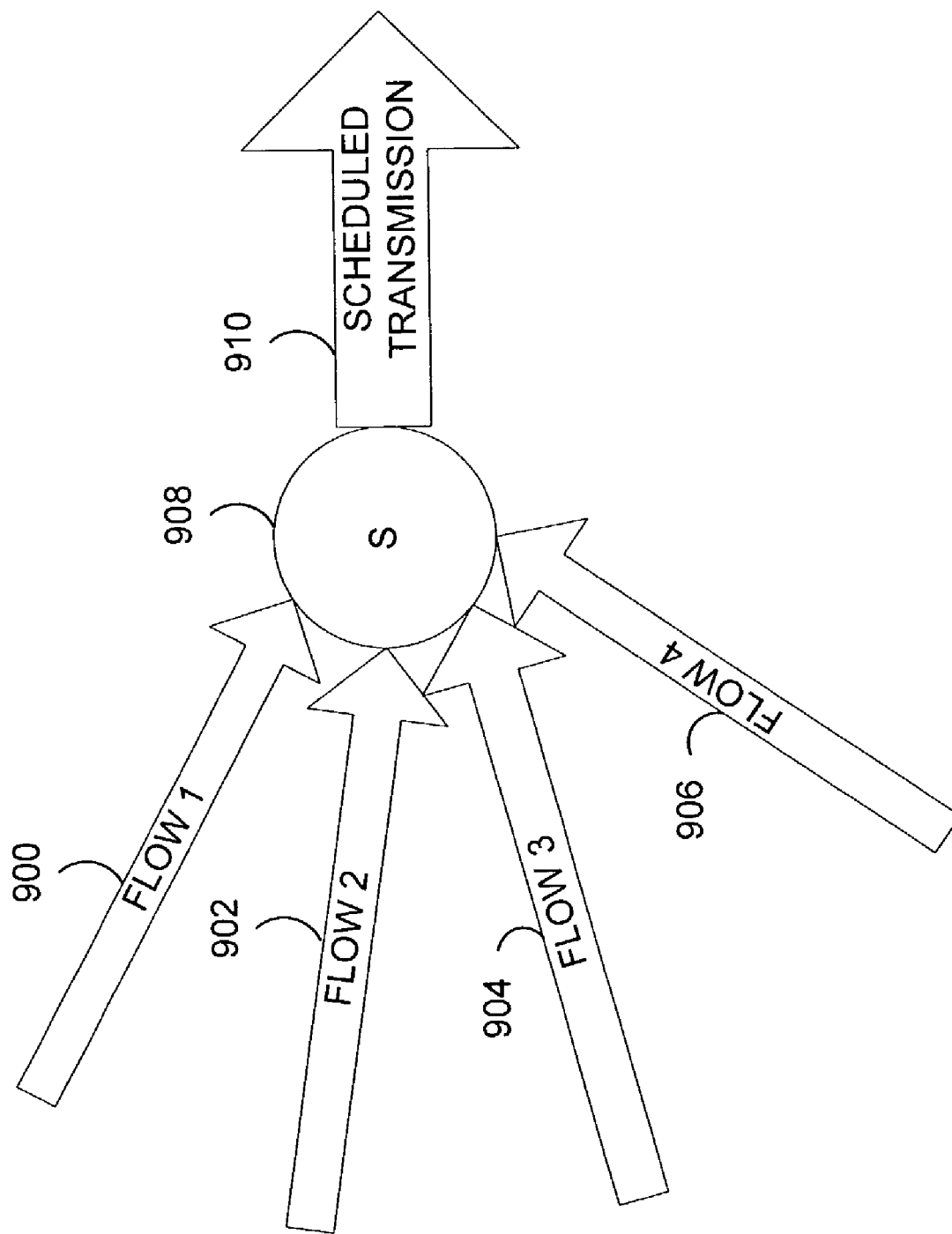
FIG. 16 is a flow diagram illustrating scheduling of application flows in a communication system.

FIG. 16 illustrates the processing of flows according to an adaptive weighted scheduling algorithm. Flows 900, 902, 904, and 906 are processed by a scheduling unit 908 labeled "S." The scheduling unit 908 applies an adaptive weighted scheduling algorithm wherein a QSG profile is used for each of the flows. The QSG profile identifies the variables that are used to calculate the adapted weight as detailed hereinbelow. The scheduling unit 908 then outputs a scheduled transmission to a selected AT.

The PF scheduling algorithm, referred to as the DRC/T algorithm, is described, wherein packets are classified into m queues, for example Q1, Q2, . . . , Qm. Let DRC[k,n] be the DRC requested by the mobile corresponding to flow k for slot n. The scheduler selects a flow with the highest value of the selection metric, Y[ . . . , . . . ], wherein $$Y[k,n+1]=DRC[k,n+1]/T_k[n+1], \forall k, \forall n. \quad (4)$$

Y[k,n+1] is the selection metric for queue Qk in slot (n+1) and $$T_k[n+1] = \left(1 - \frac{1}{t_c}\right)T_k[n] + \frac{1}{t_c}R[k,n], \quad (5)$$

$$\frac{1}{t_c} \leq 1, \text{ and}$$

$$0 < 1/t_c \quad (6)$$

As used herein, $t_c$ is the time constant over which the average is computed.

Adaptive w*DRC/T Algorithm

In one embodiment, the adaptive weighted scheduling algorithm, referred to as the "adaptive w*DRC/T" algorithm, assigns an initial weight to each flow. Suppose the initial weight assigned to flow k is denoted by $w_k$ and the DRC requested by the AT corresponding to the flow k for slot n is DRC[k,n]. The adaptive w*DRC/T algorithm computes the following metric for each flow k in every slot n $$Y_k[n]=aw_k[n]*DRC_k[n]/T_k[n] \quad (7)$$

Here, throughput for flow k and slot n, $T_k[n]$, is as defined for DRC/T in the PF algorithm. As used in the adaptive weighted scheduling algorithm, $aw_k[n]$ is the adaptive weight for flow k in slot n. The adaptive w*DRC/T scheduling algorithm works in several modes, wherein the mode is defined by the QSG. The adaptive weight for flow k in slot n, $aw_k[n]$, is computed based upon the scheduler mode and a set of selected policies or mechanisms, described further hereinbelow. Note that Equation (7) is calculated for each flow, wherein the adaptive weights will be calculated according to a formulation specific to each flow. In other words, the scheduling algorithm considers the QoS profile of a given flow, and uses the QoS profile to form the calculations of the adaptive weight for the flow. In this way, different flows having different QoS requirements may have adaptive weights that are calculated differently. The scheduling algorithm next selects a flow with the maximum value of $Y_k[n]$ to serve in slot n.

The adaptive w*DRC/T scheduler works in the following modes:

Mode I [aw*DRC/T](r, d, j): designed for delay and jitter sensitive applications having tight requirements on delay and jitter bounds, and requiring some minimal rate.

Mode II [aw*DRC/T](r, d): used for applications with average delay and rate requirements.

Mode III [aw*DRC/T](r): used for applications having only rate requirements specified.

Mode IV [DRC/T]: used for flows not specifying any QoS plan but served by the DRC/T algorithm.

Based upon the QoS requirements, a particular mode of the adaptive w*DRC/T algorithm may be used for a given flow. Mode II may also be used on a flow to increase the throughput given to that flow by the scheduler. For example, Mode II may be used for FTP applications so as to potentially increase throughput for the corresponding application flows.

One example of grouping applications, i.e., QSG, is given below:

Group I: Voice over IP (VoIP)-like applications with tight requirements on delay bounds and delay variation. Note that often such applications also have rate requirement(s). Use scheduler Mode I.

Group II: Multimedia conferencing applications with tight requirements on delay bound, and delay variation. Even though some of these applications are adaptive, it is desirable to ensure a rate of service for consistent good quality. Use scheduler Mode I.

Group III: Video streaming applications with requirements on delay bound, rate and delay variation. Use scheduler Mode I.

Group IV: Web browsing applications with rate and (average) delay requirements—Use scheduler Mode II.

Group V: FTP applications with rate requirements. Use scheduler Mode III. Alternatively, use scheduler Mode II with relaxed delay constraints.

Group VI: Best effort applications. Use PF algorithm, i.e., DRC/T algorithm, without adaptive weighting.

Note that database transactions, gaming and other applications may also be classified into suitable groups as per respective QoS requirements.

Figure 17:
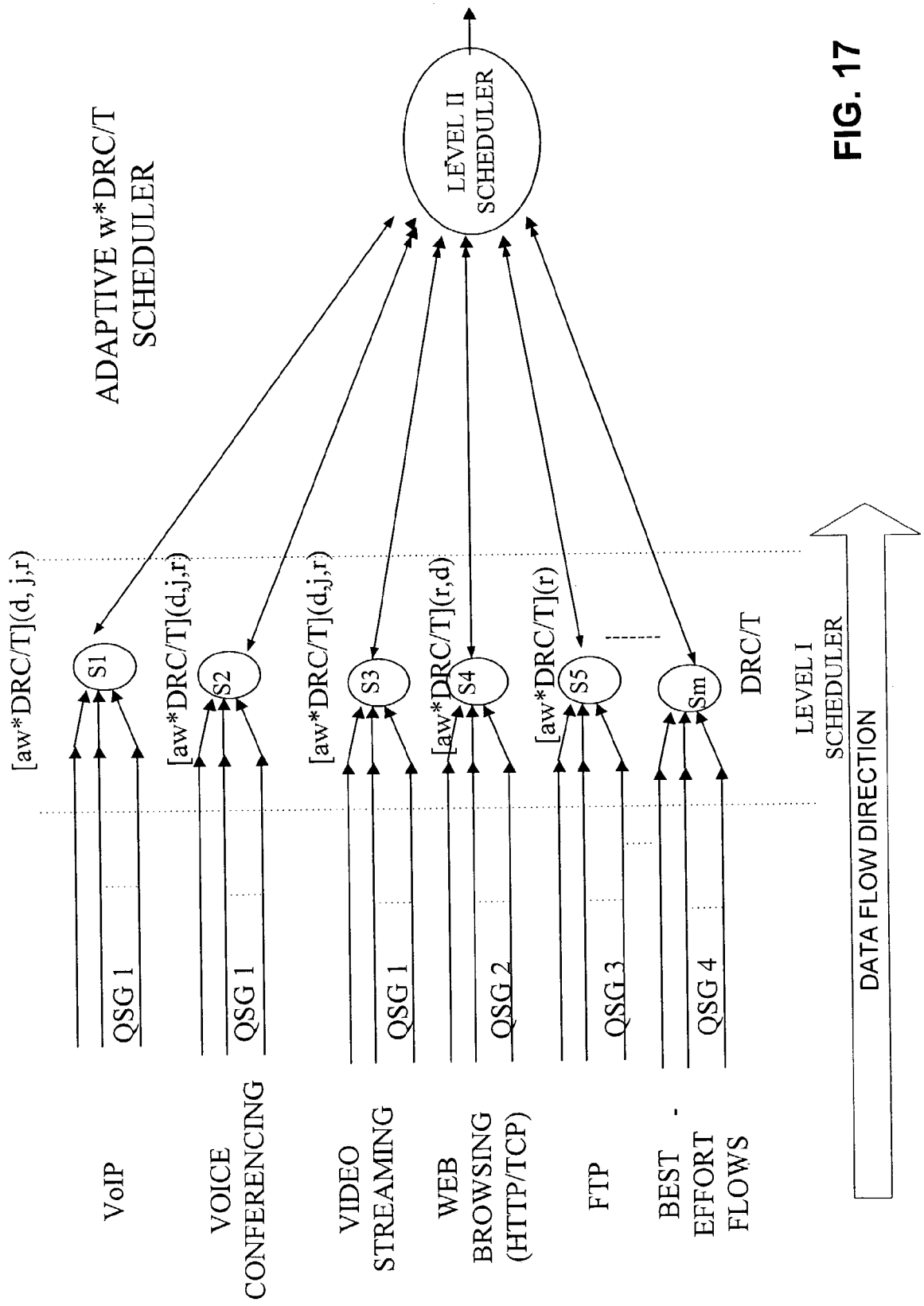
FIG. 17 is a flow diagram illustrating scheduling of application flows having different Quality of Service (QoS) requirements.

FIG. 17 illustrates the adaptive weighted scheduler having multiple levels, including but not limited to, level I and level II. The level I scheduler has multiple schedulers, S1, S2, S3, . . . Sm, wherein m refers to the total number of Groups. Each level I scheduler in FIG. 17 runs a particular operation mode of the adaptive w*DRC/T scheduling algorithm and selects a flow from that group. First, the level I scheduler calculates part of Y, specifically, the throughput, T, and the rate compensation factor, α. Next, the level II scheduler considers flows and provides input to level I scheduler sufficient for complete calculation of the selection metric Y by the level I scheduler. Once Y is completely computed for all pending flows, the level I scheduler evaluates the Y values and selects a flow with the highest value of Y. Each level I scheduler evaluates a group of flows having similar QoS requirements. The selected flow of each level I scheduler is then provided to the level II scheduler for comparison with flows from other groups. The level II scheduler considers one selected flow per group and selects the one having the highest value of the metric (aw*DRC/T) or Y. The process is repeated for every slot when the scheduler needs to select a flow to serve. Alternate embodiments may use a single level scheduler, or may use more levels than illustrated in FIG. 17. Alternate embodiments may include a different number of level I schedulers, wherein the level I schedulers correspond to flow organizations.

EXAMPLES OF SCHEDULER OPERATION

Mode I

In Mode I, each flow is assigned a delay threshold (d), which is less than the required jitter bound (j) for the flow. When the packet enters an AN element, such as the BTS, the initial entry of a packet at the BTS (or other AN element specified for calculation of delay threshold) is referred to as the Head of Line (HOL). The time of receipt of the HOL at the BSC is used to measure the delay threshold. The delay threshold specifies the amount of time that a packet is allowed to be pending in an AN element. The scheduling algorithm uses the delay threshold to ensure that a packet is received by the AT within an allowed delay and jitter bound.

In each slot, the algorithm checks if any packets of a given flow have crossed the delay threshold of that flow. The adaptive algorithm considers all three queues for each flow (i.e. Tx, RTx and ARQ) in checking for delay threshold (d) violation. If the delay experienced by a packet for a given flow in the BTS exceeds the specified delay threshold (d) for that flow, a delay compensation process is triggered for that flow. The delay threshold violation check may be done using one of the following two methods:

Method I: The delay threshold violation check is performed only for the Head Of Line (HOL) packet of each queue (Tx, RTx, ARQ) corresponding to a flow. If one of the HOL packets has stayed in a queue for a period of time exceeding the corresponding delay threshold, the algorithm concludes there is a delay threshold violation.

Method II: As packets coming from a source may not necessarily follow the same path, such as through the Internet, in-order delivery of IP packets corresponding to a flow is not always guaranteed at the PDSN (and hence at the BTS). Therefore, it is possible that the HOL packet incurs no delay threshold violation, however, packets later in the queue could incur delay threshold violations. In this second method, the algorithm considers all packets in the Tx, RTx and ARO queues to detect the threshold violation for a flow (and is not restricted to HOL packets only).

Continuing with the adaptive algorithm, specifically, the adaptive weights are computed as follows:

$$aw_k[n] = Z_k[n] * aw_k^t[n], \forall n, \forall k \qquad (8)$$

The $aw_k^t[n]$ is a function of the initial weight $w_k$ and a selection of delay compensation terms. The term $Z_k[n]$ is detailed hereinbelow. The value of $Z_k[n]$ will depend upon whether packets have violated delay thresholds in the RTx and ARO queues. The term Z is a scaling constant for each flow that helps to give higher weight to a flow when that flow contains packets in the RTx and the ARQ queues. By choosing a proper value for this scaling constant, it also allows a flow with high DRC values and with packets only in the Tx queue to compete with a very low DRC flow that also has packets in the ARQ or the RTx queues. Generally, the adaptive weight calculation is given as a function of several parameters and is given as:

$$a = f(\Phi, \gamma, \alpha, \beta, \delta). \qquad (9)$$

The delay compensation function is identified as Φ. A waiting time parameter is identified as γ. Rate compensation function is identified as α. A DRC compensation function is identified as β. Note that not all of the parameters have substantive values for all multimedia services. For example, when the only QoS requirement for a given flow is a specified data rate, then the variable α will be specified, (the rate parameter will have a substantive value) and all other parameters will be set equal to the value 1. In this case, only the rate parameter will be included in the adaptive weight calculation. In one embodiment, the adaptive weight is calculated as:

$$a = \Phi * \gamma * \alpha * \beta * \delta, \qquad (10)$$

wherein the operator is multiplication. The following discussion provides details of the various compensation terms that may be included in the adaptive weight calculation.

For Mode I applications, the QoS profile specifies all of the parameters indicated in Equation (10). The adaptive weight calculations consider delay compensation due to delay threshold violations, delay compensation due to waiting time threshold violations, rate compensation due to rate violation, and enhanced jitter compensation due to enhanced jitter threshold violation. The concept boosts weights of a flow that is violating the specified QoS requirements. Violation of QoS requirement(s) triggers a credit given to such flow. The credit is implemented by multiplying the weight of the flow by a suitable value for a delay compensation function. This is further muliplied by rate compensation and enhanced jitter compensation.

In contrast, when a flow appears to receive excess service, such flow may be penalized. A flow may be penalized in any of a variety of ways. According to one method, the flow may be directly penalized by reducing the flow weight. According to another method, the flow may be indirectly penalized by maintaining that flow weight while increasing the weights of other users who are lagging (i.e., those flows that have not achieved a required QoS).

There are a variety of mechanisms to compute a delay compensation to account for violation(s) of a delay threshold. Suppose a delay threshold for flow k is denoted by $dth\_\phi_k$ and delay compensation due to delay threshold violation for flow k in slot n is denoted by $\phi_k[n]$. To compute the delay compensation, $\phi_k[n]$, consider the packets in all the three queues (i.e., Tx, RTx and ARQ) for each flow.

For each flow, a max and a min threshold on ϕ are also specified so as to assure a flow doesn't consume several slots consecutively and starve other flows. Such embodiment may ensure a flow's delay compensation term (due to delay threshold violation) is at least as good as the min threshold value. Let $\phi_{thres,min,k}$ and $\phi_{thres,max,k}$ be the minimum and maximum threshold values that are specified for each flow k. This results (for all k and all n) in:

$$\phi_{thres,min,k} \leq \phi_k[n] \leq \phi_{thres,max,k}, \forall k, \forall n. \qquad (11)$$

The following definitions will be used to develop the calculation of delay compensation:

D[n]: defines a set of flows experiencing a delay threshold violation at the beginning of slot n (i.e., each such flow has at least one packet in at the beginning of slot n, which has crossed that flow's delay threshold.)

$defpkts_k[n]$: defines "deficit" packets for flow k at the beginning of slot n.

The deficit packet is a packet not yet transmitted in the flow, and defpkts is specifically defined as the number of equal-size intermediate packets, such as Medium Access Control (MAC) packets, pending in the BTS longer than the delay threshold for flow k.

$required\_rate_k$: defines the required rate of flow k.

$ndefpkts_k$: defines the number of normalized deficit packets for flow k, specifically defined as:

$$ndefpkts_k = \frac{defpkts_k}{required\_rate_k} \quad (12)$$

Delay Compensation Due to Delay Threshold Violation

According to a first mechanism to compensate for delayed packets at the AT (e.g., BTS), there is a compensation to a flow in proportion to the number of packets in its Tx, RTx and ARQ queues crossing the delay threshold (dth_φ) for that flow. The compensation function, $\phi_k$, is computed for the flows that have experienced delay threshold violation in the corresponding queues. Thus, a flow lagging in service directly gains an advantage, while a flow receiving excess service is indirectly penalized. This is performed by maintaining the weight of the excess service flow, while increasing weights for lagging flows. For each flow k that has experienced delay threshold violation, the delay compensation function is defined (at the beginning of slot n) as follows:

$$\phi_k[n] = C_{delay,k} * \frac{ndefpkts_k[n]}{ndefpkts_{min}[n]}, \quad k: k \in D[n], \quad (13)$$

wherein:

$$ndefpkts_{min}[n] = \min_{j:j \in D[n]}\{ndefpkts_j[n]\}, \quad (14)$$

and the $C_{delay,k} \geq 1$. For application of the compensation mechanism to a class of flows that have the same rate requirements (such as MPEG4 streaming flows with same MPEG4 profile), $\phi_k$ simplifies to:

$$\phi_k[n] = C_{delay,k} * \frac{defpkts_k[n]}{defpkts_{min}[n]}, \quad k: k \in D[n]. \quad (15)$$

According to a second mechanism compensation for delayed packets at the BTS, BSC and/or PDSN involves monitoring packets in the BTS and BSC as well as the PDSN (in contrast to just monitoring packets at the BTS scheduler queues) and specifically looking for packets crossing their delay threshold. The mechanism may use a deficit number of bits instead of packets. In this way, if the packets are not identically constructed, the mechanism fairly compensates for different length packets by counting bits. In this case, Equation (15) becomes:

$$\phi_k[n] = \frac{ndefbits_k[n]}{ndefbits_{min}[n]}, \text{ and} \quad (16)$$

$$ndefbits_k = \frac{defbits_k}{required\_rate_k}. \quad (17)$$

Here, ndefbits is the normalized deficit in bits.

$$ndefbits_{min}[n] = \min_k\{ndefbits_k[n]\} \text{ over all } k: k \in D[n]. \quad (18)$$

Note that packets in the BTS, BSC and PDSN may be of unequal sizes and therefore, it is beneficial to count the number of deficit bits here instead of packets.

The above-described mechanisms result in maximum compensation for the queue with the highest number of deficit packets (or bits). A third mechanism does the opposite by attempting to serve the flow with the smallest number of deficit packets first. This is a different policy, wherein a network operator may choose from the various mechanisms presented based on network-wide objectives, user profiles and network conditions. The compensation calculation is given as:

$$\phi_k[n] = C_{delay,k} * \frac{ndefpkts_{max}[n]}{ndefpkts_k[n]}, \quad k: k \in D[n], \quad (19)$$

wherein, the maximum number of allowable normalized deficit packets is given as:

$$ndefpkts_{max}[n] = \max_{j:j \in [n]}\{ndefpkts_j[n]\}, \quad (20)$$

wherein $C_{delay,k} \geq 1$. Application of this third compensation mechanism to a class of flows having the same rate requirements (such as MPEG4 streaming flows with same MPEG4 profile), wherein $\phi_k$ simplifies to:

$$\phi_k[n] = C_{delay,k} * \frac{defpkts_{max}[n]}{defpkts_k[n]}, \quad k: k \in D[n]. \quad (21)$$

Still a fourth mechanism uses the policy of the third mechanism which considers the delayed packets in the BTS, BSC as well as those in the PDSN. As these packets are of different length, count the number of bits instead of packets. The compensation is given as:

$$\phi_k[n] = \frac{ndefbits_{max}[n]}{ndefbits_k[n]}, \text{ and} \quad (22)$$

$$ndefbits_k = \frac{defbits_k}{required\_rate_k}. \quad (23)$$

Again, ndefbits refers to the normalized deficit in bits, wherein:

$$ndefbits_{max}[n] = \max_k\{ndefbits_k[n]\} \text{ over all } k: k \in D[n]. \quad (24)$$

In a fifth mechanism, the delay compensation is calculated as follows:

$$\phi_k[n] = C_{delay,k} * \frac{ndefpkts_k[n]}{ndefpkts_{avg}[n]}, \quad k: k \in D[n], \quad (25)$$

wherein:

$$ndefpkts_{avg}[n] = \frac{\sum_{k: k \in D[n]} ndefpkts_k[n]}{N[n]}, \quad (26)$$

and N[n] is the number of flows in the set D[n]. This mechanism may also be used when deficit bits are counted instead of deficit packets.

A sixth mechanism applies a compensation calculation as:

$$\phi_k[n] = C_{delay,k} * \frac{ndefpkts_{avg}[n]}{ndefpkts_k[n]}, \quad k: k \in D[n]. \quad (27)$$

The sixth mechanism may also be used when deficit bits are counted instead of deficit packets. The sixth mechanism gives less boost than that given by the third mechanism above. Also, the third mechanism gives preference to the flow with the smallest number of deficit packets while the sixth mechanism tries to distribute resources more evenly.

A seventh mechanism uses an exponential compensation function, given as:

$$\phi_k[n] = \exp\left(\frac{b_k * defpkts_k - \frac{\sum_{i: i \in D[n]} b_i * defpkts_i}{N}}{1 + \sqrt{\frac{\sum_{i: i \in D[n]} b_i * defpkts_i}{N}}}\right), \quad (28)$$

$$k: k \in D[n],$$

wherein $b_i$ is a pre-specified constant for flow i and $$\frac{1}{N}\sum_i b_i * defpkts_i,$$

is the average number of deficit packets in a slot. Use of the seventh mechanism gives a higher boost to an adaptive weight for a flow than only using linear compensation mechanisms. A system may decide to use the seventh mechanism for flows with very tight delay and jitter requirements and low data rate such as VoIP flows, wherein the system uses a linear mechanism for other flows.

Note that while a network may implement the first mechanism when channel conditions are relatively good, as channel conditions degrade it is not always possible to meet delay bounds of all the flows. In this case, the network could dynamically trigger the third mechanism and meet delay bounds of at least some flows. Thus one could use an eighth mechanism, which is a combination of the above mechanisms, as given below:

$$\phi_k[n] = \lambda[n] * \phi_{k,mechanismI}[n] + \kappa[n] * \phi_{k,mechanismII}[n]; \\ (\lambda[n] + \kappa[n] = 1). \quad (29)$$

Delay Compensation Using Waiting Time

If the HOL packet of a flow has been in the BTS queue for a time period larger than a pre-specified threshold, the flow may be compensated using the following mechanisms. A waiting time threshold used for this purpose should be larger than or equal to the threshold used for computing $\phi$. For flow k the waiting time threshold is denoted by $dth\_\gamma_k$, wherein the waiting time threshold is constrained by $dth\_\gamma_k \geq dth\_\phi_k$, $\forall k$. To select the HOL packet of a flow, first consider HOL packets from the Tx, RTx and ARQ queues of a flow and select one based on latency at the BTS, i.e., select the one waiting in the BTS for the longest period of time. Let $\gamma_k[n]$ be the waiting time compensation for flow k at the beginning of slot n, and $S_k[n]$ be the time spent in the BTS queue by the HOL packet of flow k at the beginning of slot n. For each flow k, a minimum threshold, $S_{thres,min,k}$ and a max threshold $S_{thres,max,k}$ are also specified, satisfying $S_{thres,min,k} \leq S_k[n] \leq S_{thres,max,k}$, $\forall k \forall n$.

According to a first mechanism for delay compensation incorporating a waiting time, the compensation is calculated as:

$$\gamma_k[n] = C_{wait,k} * \frac{S_k[n]}{S_{min}[n]}, \forall k, \forall n, \quad (30)$$

wherein $S_{min}[n] = \min_j \{S_j[n]\}$, over all flows j such that HOL packet for flow j has been in the BTS queue for a time period larger than $dth\_\gamma_j$ in slot n and $c_{wait,k}$ is a scaling constant for flow k. This mechanism would give a boost to adaptive weights of delay sensitive flows in proportion to the time they have waited (i.e., are pending) in the BTS. A flow wherein an HOL packet has crossed a corresponding flow waiting time threshold and has been in the BTS for the highest time, would be given a maximum boost while computing the waiting time compensation for its adaptive weight.

According to a second mechanism, the compensation is calculated as:

$$\gamma_k[n] = C_{wait,k} * \frac{S_k[n]}{S_{avg}[n]}, \forall k, \forall n, \text{ and} \quad (31)$$

$$S_{avg}[n] = \frac{\sum_j S_j[n]}{N[n]}. \quad (32)$$

For the flow j, the HOL packet has been waiting in the BTS queue for a time period larger than $dth\_\gamma_j$ at the beginning of slot n. The number of such flows is denoted by N[n]. Typically this mechanism would be used for flows belonging to a same scheduling group, though not necessarily. This mechanism would give less boost to adaptive weights than that given by the first mechanism.

Delay Compensation Using Max DRC

According to one embodiment, a delay compensation is applied when a flow is experiencing a delay threshold violation or a waiting time threshold violation. The mechanism applies the DRC data rate request to the adaptive weight. Let $\beta_k[n]$ be the DRC adjustment function for flow k in slot n. A minimum threshold, $\beta_{min,thres,k}$ and a maximum threshold $\beta_{max,thres,k}$ are specified for each flow k and satisfying $\beta_{min,thres,k} \leq \beta_k[n] \leq \beta_{max,thres,k}$.

A first mechanism calculates the compensation term as:

$$\beta_k[n] = \frac{DRC_{max}}{DRC_k[n]}. \quad (33)$$

Here, $DRC_{max}$ is the maximum possible DRC value in a system.

A second mechanism calculates the compensation term as:

$$\beta_k[n] = \frac{DRC_{max}[n]}{DRC_k[n]} \quad (34)$$

Here, $DRC_{max}[n]$ is the maximum DRC value in slot n (considering all flows). The second mechanism requires somewhat more computation than the first mechanism, but provides less (or equal) boost than the first mechanism to the flows that use this $\beta$ function. This in turn helps the flows that do not use the $\beta$ function. Consider two flows having the same values of delay compensation due to delay threshold violation(s) and waiting time (i.e., pending time) threshold violation(s). Also, assume that these two flows have the same throughput, T. In that case, the flow with a higher DRC is given the preference, which may result in poorer performance for the other flow with a lower DRC. Use of $\beta$ function gives some boost to the lower DRC flow, and helps in providing a smooth recovery.

Enhanced Delay Variation (or Jitter) Compensation

While the above-described compensation mechanisms help to reduce delay variation of a flow, for some applications, such as video/audio conferencing, it may be desirable to include delay variation (jitter) control more effectively and reduce the delay variation even further. The following mechanisms provide effective delay variation control by reducing delay variation between consecutive packets of a flow. Flows with larger IP packet sizes benefit more from this compensation mechanism.

Let at(k,j) be the arrival time of the IP packet j of flow k at the ingress of BSC. Let dt(k,j) be the departure time of this IP packet from the BTS, i.e., the time by which all segments of this IP packet have been transmitted by the forward link scheduler at the BTS. Let $pend_{k,j}[n]$ be the total length in bytes of the IP packet j of flow k at the BTS and BSC. Also, assume that $dv_{k,target}$ is the target delay variation (jitter) between consecutive IP packets for flow k and $dv_{k,thres}$ is a pre-specified enhanced jitter threshold for this flow such that $dv_{k,thres} < dv_{k,target}$. The enhanced delay variation compensation mechanisms are triggered for flow k when delay variation between consecutive IP packets goes above $dv_{k,thres}$.

A first compensation mechanism for compensating for jitter computes the enhanced delay variation (jitter) compensation for flow k in slot n as follows:

$$\delta_k[n] = C_{\delta,k} * \frac{pend_{k,j}[n]}{pend_{min}[n]}, \quad (35)$$

if $n-dt(k,j-1) > dv_{k,thres}$ and $at(k,j)-dt(k,j-1) \leq dv_{k,target}$.

Here, assume that some part of the IP packet j of flow k is already in the BTS at slot n but has not been completely transmitted by the BTS forward link scheduler. The length of this remaining IP packet j is $pend_{k,j}[n]$. Also, $C_{\delta,k}$ is a scaling constant for flow k, wherein $pend_{min}[n] = min_j\{pend_{k,j}[n]\}$ over all flows k that are experiencing delay variation threshold violation in slot n.

According to a second mechanism, on occurrence of a delay variation threshold violation the mechanism computes a delay variation compensation for flow k in slot n as follows:

$$\delta_k[n] = C_{\delta,k} * \frac{pend_{k,j}[n]}{pend_{avg}[n]}, \quad (36)$$

if $n-dt(k,j-1) > dv_{k,thres}$ and $at(k,j)-dt(k,j-1) \leq dv_{k,target}$. Again, this assumes the IP packet j of flow k is already in the BTS at slot n, but has not been completely transmitted by the BTS forward link scheduler. Also, the average number of pending bytes is given as:

$$pend_{avg}[n] = \frac{\sum_k pend_{k,j}[n]}{N[n]}, \quad (37)$$

wherein $N[n]$ is the number of flows experiencing delay variation threshold violation in slot n.

According to a third mechanism, on occurrence of a delay variation threshold violation, the mechanism computes a compensation using the following function:

$$\delta_k[n] = C_{\delta,k} * \exp\left(\frac{b_k * pend_{k,j}[n] - \frac{\sum_m b_m * pend_{m,j}[n]}{N[n]}}{1 + \sqrt{\frac{\sum_m b_m * pend_{m,j}[n]}{N[n]}}}\right). \quad (38)$$

Here, $b_k$ is a pre-specified constant for each flow k and other notations are as explained hereinabove. For each flow k, a minimum threshold, $\delta_{thres,min,k}$, and a maximum threshold, $\delta_{thres,max,k}$, are also specified and satisfy $\delta_{thres,min,k} \leq \delta_k[n] \leq \delta_{thres,max,k}$, $\forall k, \forall n$.

Adaptive Weight Computation Algorithms for Mode I

The following discussion presents three algorithms to compute adaptive weights while using Mode I of the adaptive w*DRC/T scheduling algorithm. As noted earlier, the adapted weight is given as:

$$aw_k[n] = Z_k[n] * aw_k^t[n], \forall n, \forall k. \quad (39)$$

Intermediate Adaptive Weight Calculations

The following algorithms are used to compute the adaptive weight term $aw_k^t$, which is an intermediate rate that will be used later in the algorithm. The first algorithm provides a single step weight adaptation method. If either a delay threshold violation or a waiting time threshold violation is detected for flow k at the beginning of slot n, the algorithm compensates this flow by first generating an intermediate weight as:

$$aw_k^t[n] = \beta_k[n] * \gamma_k[n] * \phi_k[n] * w_k. \quad (40)$$

If there is no waiting time threshold violation for flow k at the beginning of slot n, the algorithm uses $\gamma_k[n]=1$. Similarly, if there is no delay threshold violation for flow k at the beginning of slot n, the algorithm uses $\phi_k[n]=1$. If neither delay threshold violation nor waiting time threshold violation is detected for flow k at the beginning of slot n, the algorithm uses:

$$aw_k^t[n]=w_k. \qquad (41)$$

In another embodiment, a multi-step weight adaptation algorithm determines if a delay threshold violation is detected for flow k at the beginning of slot n, and if so compensates this flow as follows:

$$aw_k^t[n]=\beta_k[n]*\phi_k[n]*\gamma_k[n]*aw_k^t[n-1], \qquad (42)$$

wherein the algorithm assumes $aw_k^t[0]=1$. If there is no delay threshold violation for flow k at the beginning of slot n, the intermediate weight is given as $aw_k^t[n]=w_k$. In this situation, the algorithm continues to test for a jitter violation of the jitter bound.

An alternate embodiment uses a combination of the previous algorithms, depending on conditions. Use of the first algorithm may potentially result in higher overall throughput in a network. This may also meet the various QoS requirements in a network while lightly loaded and when the QoS experienced by users reflect favorable channel conditions. As the network loading increases or the channel conditions of some users deteriorate, use of the first algorithm may not be sufficient to satisfy QoS requirements. In such cases, the second algorithm may be dynamically triggered, providing more effective results in satisfying QoS requirements. Specifically, the first algorithm, Equations (40) and (41), is used when a fraction of slots used by all the QoS flows is below pre-specified threshold(s) and a faction of the delayed IP packets is also below a pre-specified threshold for each delay-sensitive flow. The second algorithm, Equation (42) is dynamically triggered for particular delay-sensitive flows when the fraction of slots used by all the QoS flows goes above the pre-specified threshold(s) or a fraction of delayed IP packets goes above a pre-specified threshold for that flow. In this way, the network is able to specify an allowable ratio of violations. Note that the thresholds may be dynamically adjusted.

Mode I is used for applications having specific requirements on delay bound, jitter bound and rate. The Mode I applications include, but are not limited to: VoIP, multimedia conferencing applications with requirements on delay bound, rate and delay variation; video streaming applications with requirements on delay bound, rate and delay variation. Mode I is used for those flows that need more effective delay variation compensation. If a delay threshold violation is detected, the method computes the intermediate weight $aw_k^t$ as specified in the algorithms defined by Equations (40) to (42), and then computes $aw_k[n]=Z_k[n]*aw_k^t[n]$, $\forall n, \forall k$.

If a delay variation threshold violation is detected for flow k at the beginning of slot n, the algorithm computes a selection metric as follows:

$$Y_k[n]=aw_k[n]*\delta_k[n]*DRC_k[n]/T_k[n]. \qquad (43)$$

If this flow does not need more effective delay variation compensation or if no delay variation threshold violation is detected, the algorithm sets $\delta_k[n]=1$. The following definitions of $Z_k[n]$ may be used, according to conditions.

Definition 1

$Z_k[n]=1$, if there is no delay threshold violation for the HOL packets in the ARQ and RTx queues (or RTx and ARQ queues are empty), $Z_k[n]=D_k$, if there is a delay threshold violation for the HOL packet in the ARQ queue and no delay threshold violation for the HOL packet in the RTx queue (or RTx queue is empty), $Z_k[n]=C_k$, if there is a delay threshold violation for the HOL packet in the RTx queue.

Definition 2

Typically, IP routing protocols deliver packets in order, wherein Definition 1 above uses the HOL packet only, a more precise definition considers multiple or all packets in a queue to decide whether or not there is a delay threshold violation for some packets. In that case, $Z_k[n]$ would be defined as follows:

$Z_k[n]=1$, if there is no delay threshold violation for any packet in the ARQ and RTx queues (or RTx and ARQ queues are empty), $Z_k[n]=D_k$, if there is a delay threshold violation for any packet in the ARQ queue and no delay threshold violation for any packet in the RTx queue (or RTx queue is empty), $Z_k[n]=C_k$, if there is a delay threshold violation for any packet in the RTx queue.

C and D are pre-specified scaling constants which give higher boost to flows having packets in the RTx and ARQ queues violating delay thresholds. By choosing appropriate values, the C and D constants also allow a high DRC flow with packets in the Tx queue only to compete with a very low DRC flow that has packets in the RTx or ARQ queues.

The adaptive weighting algorithm presented hereinabove may work with either of the above definitions of $Z_k[n]$. Values of these parameters could be either specified statically or inferred dynamically by obtaining information in signaling protocols. Among other factors, values of $C_k$ and $D_k$ may also depend on the type of application. For example, a conferencing application may use higher values of these constants than an FTP application. This method potentially allows packets, corresponding to a conferencing application, pending in the ARQ or RTx queues to get higher priority over pending packets of other applications. In this case, a scheduler may make an attempt to transmit the packets of the conferencing application before becoming stale (i.e., their life period in the BTS goes above the target BTS delay bound for that microflow). Basically, low-latency applications are given priority over applications without strict latency requirements.

For some flows, $C_k$ may be set to zero. For example, this may be beneficial for some VoIP flows when two wireless hops are involved (e.g., between two mobile units across a wireline network). On the other hand, it could be set to a very high value for other VoIP applications. If the BTS sends VoIP packets to an AT and some of these are lost, the reverse link requires time (from AT to BTS or BSC) for feedback to arrive. If this reverse link delay is high, it may not be useful to retransmit those packets from the BTS to AT (as they might have already become stale). In such cases, the network may set $C_k$ to zero. On the other hand, if there is some time to retransmit VoIP packet, the network could set a very high value of $C_k$ so that there is a higher chance for these packets to be retransmitted before they become stale (i.e., there is delay or jitter violation).

Use of these constants also allows flows that have packets in the RTx and ARQ queues to compete with flows that have packets only in the Tx queues. In some cases, this may be desirable as flows with packets in the ARQ and RTx queues may be experiencing very low values of DRC, and forcing the scheduler to serve those flows could bring down the overall throughput of the system.

It is also possible for some packets to receive service earlier than the deadlines associated with the corresponding flow, wherein the flows still enters the ARQ or RTx queue. The above Definition 2 ensures that such flows are not given extra weight if there is no delay threshold violation (even though such packet may be in RTx or ARQ queue). This is done so that flows actually experiencing delay threshold violations have a chance to be serviced first.

Definition 3

$Z_k[n]1$, if the RTx queue is empty (irrespective of ARQ queue status), $Z_k[n]=C_k$, if the RTx queue is non-empty.

Here a flow may get an extra boost in weight if it has packets in the RTx queue even without crossing corresponding delay thresholds. This may happen for a short period of time if other flows experience degraded performance (delay threshold violation), the corresponding weights will be increased.

Upper and Lower Thresholds on Adaptive Weights

Upper and lower thresholds are specified for $aw_k^t[n]$ and $aw_k[n]$.

$$w_{thres,min,k} \leq aw_k^t[n] \leq w_{thres,max,k}, \forall n, \forall k \quad (43)$$

$$w_{thres,min} \leq aw_k[n] \leq w_{thres,max}, \forall n, \forall k \quad (44)$$

Min and max thresholds on the values of adaptive weights are specified for each flow. The min and max thresholds prevent a flow from consuming several slots and attempt to ensure that no single flow consumes the resources for an extended time. These thresholds may be specified statically or determined dynamically. One embodiment uses an admission control algorithm to compute the min and max thresholds.

Adaptive w*DRC/T—Mode II

In Mode II, the adaptive w*DRC/T algorithm provides rate and average delay guarantees for flows. A delay threshold parameter is chosen to be less than the average delay needed. Delay threshold violation checks are done in each slot and flows are compensated via deficit packets and waiting time compensation mechanisms as described hereinabove.

Each flow requiring (or desiring) rate guarantees specifies the required rate and the time scale over which the rate requirement is to be met. Using this information, a rate threshold and a time scale to check for rate violation are specified for that flow. Let $P_k$ be the time scale to check for rate violations for flow k. If a flow is lagging (as considered from a rate point of view), compensation is provided. Let $\alpha_k$ be the rate compensation function for flow k. Each flow also specifies a triggering threshold for rate violation. Flow k is compensated by its $\alpha_k$ only if $\alpha_k \geq \alpha_{trigger\_thres,k}$. In addition, upper and lower thresholds, $\alpha_{thres,max}$ and $\alpha_{thres,min}$, respectively, are specified for each flow ($\alpha_{thres,min,k} \leq \alpha_k[.] \leq \alpha_{thres,max,k}, \forall k$).

Each flow desiring rate guarantees computes the following:

$$\alpha_k[n] = C_{rate,k} * \frac{required\_rate_k}{served\_rate_k}, \forall k. \quad (45)$$

As given above, $C_{rate,k}$ is a scaling constant for flow k and is pre-specified. If $a_k \geq \alpha_{trigger\_thres,k}$, compensation is performed by multiplying the initial weight by the factor in Equation (45), else there is no compensation performed. For notational convenience, assume the following:

$$\alpha_k[\text{slot when session k was originated}]=1 \forall k. \quad (46)$$

Adaptive weights are computed wherein:

$$aw_k[n]=Z_k[n]*aw_k^t[n], \forall k, \forall n. \quad (47)$$

Computation of Intermediate Adaptive Weight

Consider an arbitrary slot n; wherein as the delay violation check is performed every slot and thus is done in slot n also. First, consider the case when the rate violation check is done in slot n for flow k (i.e., n mod $P_k$=0).

The intermediate adaptive weight $aw_k^t[n]$ is computed as follows:

If served_rate$_k \geq$required_rate$_k$, then $$aw_k^t[n]=\gamma_k[n]*\phi_k[n]*w_k. \quad (48)$$

If served_rate$_k <$required_rate$_k$ and
$\alpha_k[n] \leq \alpha_{trigger\_thres,k}$, then $$aw_k^t[n]=\gamma_k[n]*\phi_k[n]*w_k. \quad (49)$$

If served_rate$_k <$required_rate$_k$ and
$\alpha_k[n]>\alpha_{trigger\_thres,k}$, then $$aw_k^t[n]=\gamma_k[n]*\phi_k[n]*\alpha_k[n]*w_k \quad (50)$$

If there is no delay threshold violation in slot n, then the adaptive weight calculation sets $\phi_k[n]=1$; and if there is no waiting time threshold violation in slot n, the adaptive weight calculation sets $\gamma_k[n]=1$.

Next, consider the case when the rate violation check is not done in slot n (i.e., n mod $P_k \neq 0$). Then the intermediate adaptive weight $aw_k^t[n]$ is calculated as:

$$aw_k^t[n]=\gamma_k[n]*\phi_k[n]*\alpha_k[n_{prev,k}(n)]*w_k, \quad (51)$$

wherein:

$$n_{prev,k}(n)=\max\{j:j\leq n, j \bmod P_k=0\}. \quad (52)$$

If there was no rate violation in the slot $n_{prev,k}(n)$, or if it was less than $\alpha_{trigger\_thres,k}$, then $\alpha_k[n_{prev,k}(n)]=1$.

Definition 4

$Z_k[n]=1$, if there is neither a rate violation nor a delay threshold violation, $Z_k[n]=1$, if both the ARQ and the RTx queues are empty (there may or may not be a rate or delay threshold violation for flow k in this case), $Z_k[n]=RD_k$, if the ARQ queue is not empty, the RTx queue is empty and there is only a rate violation, $Z_k[n]=D_k$, if there is a delay threshold violation, the ARQ queue is not empty, and the RTx queue is empty, $Z_k[n]=C_k$, if the RTx queue is not empty, and there is either a rate violation or delay threshold violation.

Further, a simplified two-step process is defined as follows:

$Z_k[n]=1$, if the RTx queue is empty in slot n (ARQ queue may or may not be empty), $Z_k[n]=C_k$, if the RTx queue is not empty in slot n.

Dynamic Delay Thresholds for Deficit Packets

Initially, a flow is assigned a delay threshold. Network loading and the QoS violation statistics are monitored to dynamically change or update the value of the delay threshold. The updating may be performed periodically, after a pre-specified time period. If the rate violation statistics have crossed pre-specified threshold values, then the delay threshold would be changed as follows:

If $\alpha_k[n] > \alpha1_{viol\_dth\_\phi,k}$, then $dth\_\phi_k[n] = dth\_\phi_k[0]/f1$.

If $\alpha_k[n] > \alpha2_{viol\_dth\_\phi,k}$, then $dth\_\phi_k[n] = dth\_\phi_k[0]/f2$.

In these situations, $\alpha1_{viol\_dth\_\phi,k}$, $\alpha2_{viol\_dth\_\phi,k}$, f1 and f2 are pre-specified values. Assuming, $\alpha2_{viol\_dth\_\phi,k} \geq \alpha_{viol\_dth\_\phi,k}$, then the delay threshold compensation factor is given as:

$$dth\_\phi_k[n] = dth\_\phi_k[0], \text{ if } \alpha_k[n] < \alpha1_{viol\_dth\_\phi,k} \quad (53)$$

Similarly, if the fraction of IP packets of a flow having crossed delay bounds has crossed a pre-specified threshold, the above delay thresholds may be changed dynamically for that flow.

Adaptive w*DRC/T—Mode III

Mode III is used for applications, which are relatively latency-independent and have only rate requirements. For Mode III the adaptive weights are computed given as:

$$aw_k[n] = Z_k[n] * aw_k^t[n], \forall k, \forall n. \quad (54)$$

For computation of the intermediate adaptive weight, $aw_k^t[n]$, begin by considering an arbitrary slot n. A delay violation check is not performed at slot n. First, consider the case when a rate violation check is performed in slot n for flow k (i.e., n mod $P_k = 0$). Here the intermediate adaptive weight, $aw_k^t[n]$, is calculated as follows:

If $\alpha_k[n] \leq \alpha_{trigger\_thres,k}$, $aw_k^t[n] = w_k$.

If $\alpha_k[n] > \alpha_{trigger\_thres,k}$, $aw_k^t[n] = \alpha_k[n] * w_k$.

Second, consider the case when a rate violation check is not performed in this slot (i.e., n mod $P_k \neq 0$). The intermediate adaptive weight, $aw_k^t[n]$, is computed as follows:

$$aw_k^t[n] = \alpha_k[n_{prev,k}(n)] * w_k. \quad (55)$$

Here, $n_{prev,k}(n) = \max\{j: j \leq n, j \mod P_k = 0\}$. If there was no rate violation in the slot $n_{prev,k}(n)$, or if it was less than $\alpha_{trigger\_thres,k}$, this results in $\alpha_k[n_{prev,k}(n)] = 1$.

Definition 5

$Z_k[n] = 1$, if there is no rate violation, $Z_k[n] = 1$, if both the ARQ and the RTx queues are empty (there may or may not be a rate violation for flow k in this case), $Z_k[n] = RD_k$, if the ARQ queue is not empty, the RTx queue is empty and there is rate violation, $Z_k[n] = C_k$, if the RTx queue is not empty and there is a rate violation.

A simplified definition is as follows:

$Z_k[n] = 1$, if the RTx queue is empty in slot n, $Z_k[n] = C_k$, if the RTx queue is not empty in slot n.

Figure 18:
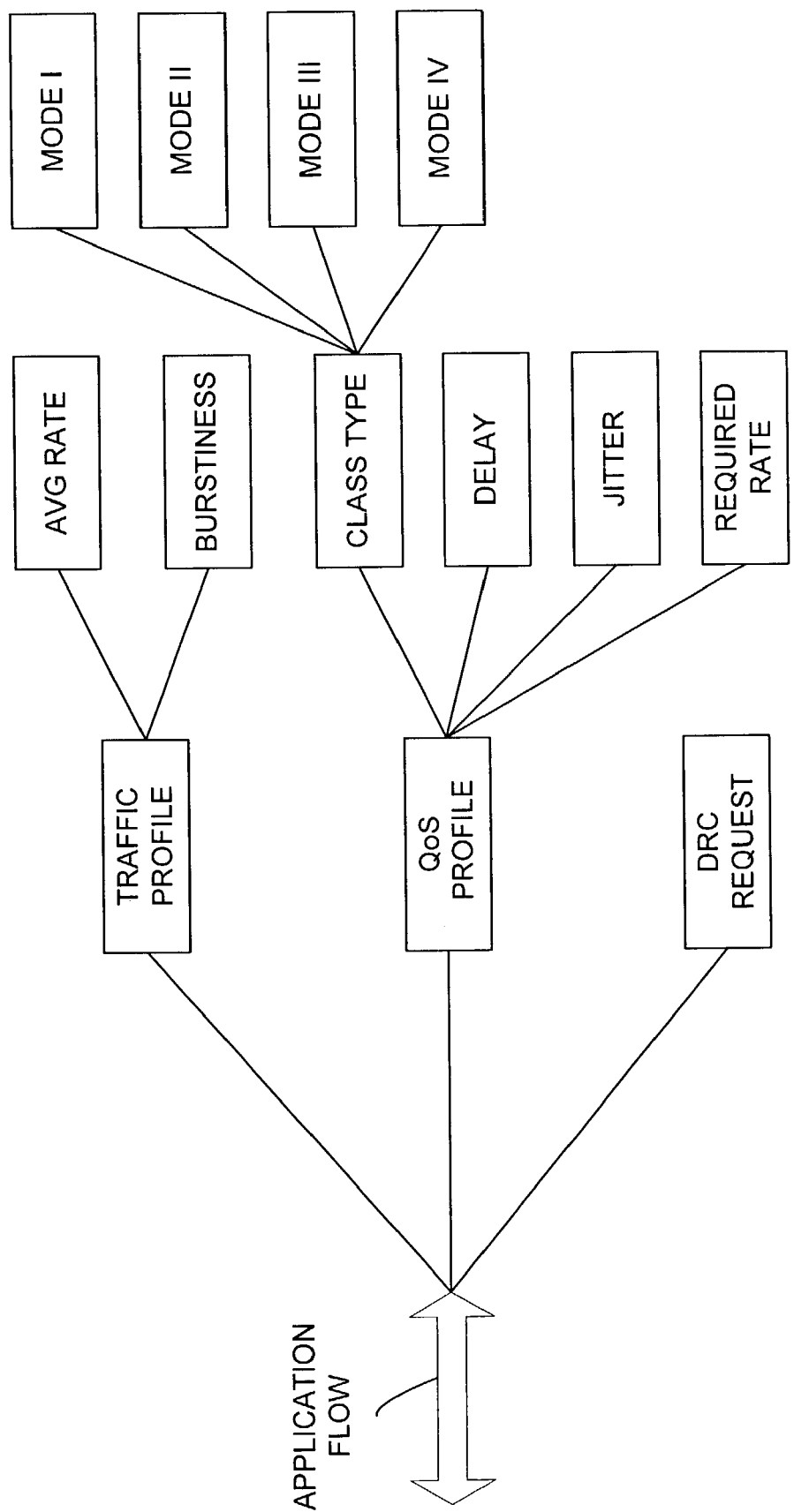
FIG. 18 is an architectural diagram illustrating the definition of each application flow consistent with a scheduling algorithm according to one embodiment.

FIG. 18 provides an architectural diagram corresponding to one embodiment. Each application flow is described by a traffic profile, a QoS profile, and a DRC request, i.e., requested data rate. Each traffic profile includes a measure of burstiness and an average data rate. Each QoS profile includes a class type and the parameter bounds. The class type may be one of Mode I, Mode II, Mode III, or Mode IV. The bounds specify bounds for delay, jitter, and the required data rate. Some applications such as web browsing, may specify average delay instead of delay bound. Delay thresholds for Mode I are chosen to be less than jitter bound; and for Mode II, delay threshold is chosen to be less than the average delay. An enhanced jitter threshold is chosen to be less than the jitter bound. Alternate embodiments may apply more or less information to each application flow, wherein the QoS requirements may be specific to the network and configuration.

FIG. 19 is a table specifying the QoS requirements and QoS parameters for each class type. As indicated, Mode I corresponds to the strictest requirements, while Mode IV corresponds to a Best Effort, wherein no QoS requirements are specified. Alternate embodiments may include other QoS requirements, QoS parameters and/or modes.

Figure 20:
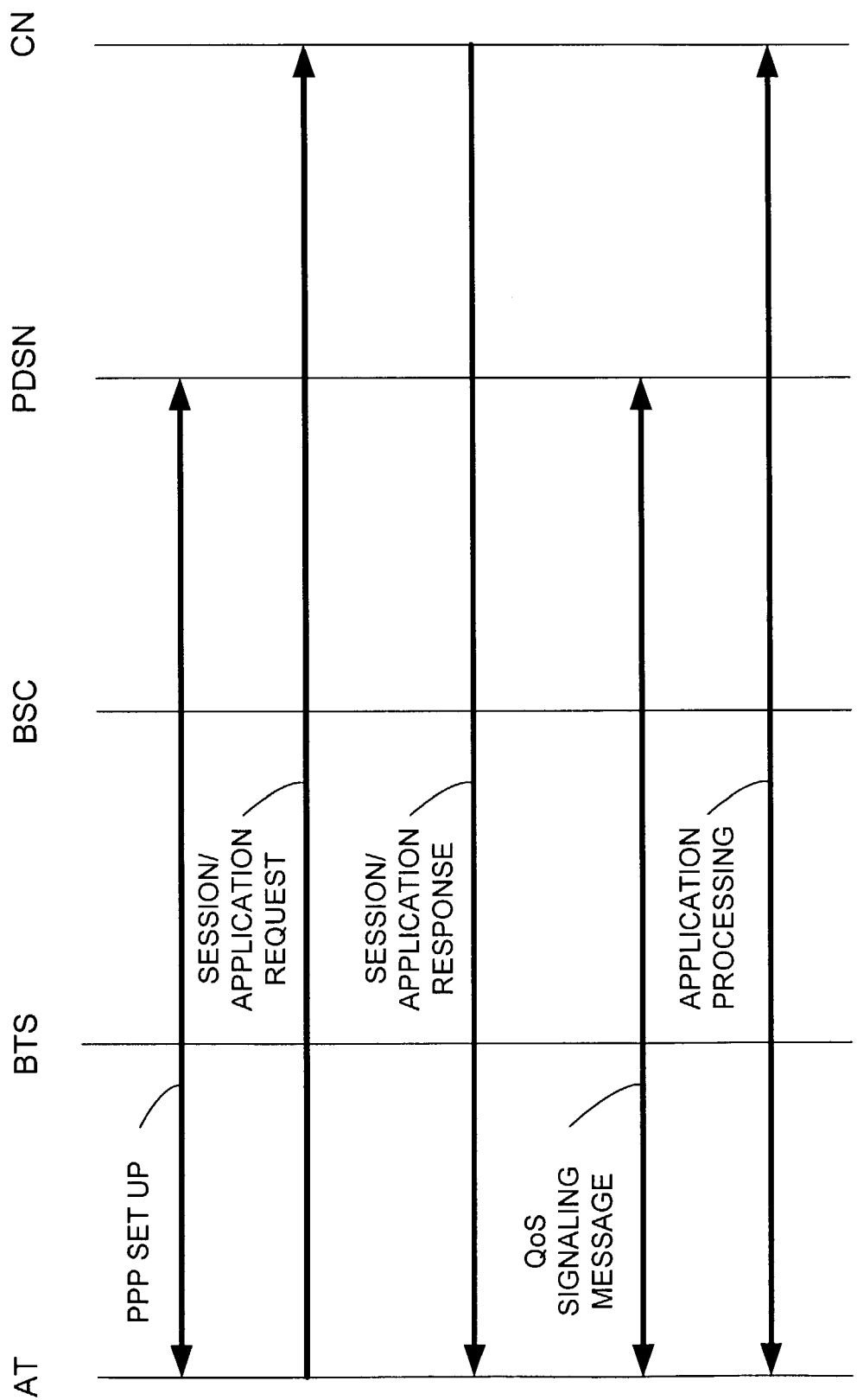
FIG. 20 is timing diagram illustrating provisioning of information used for setting up, maintaining and scheduling an application flow.
Figure 21:
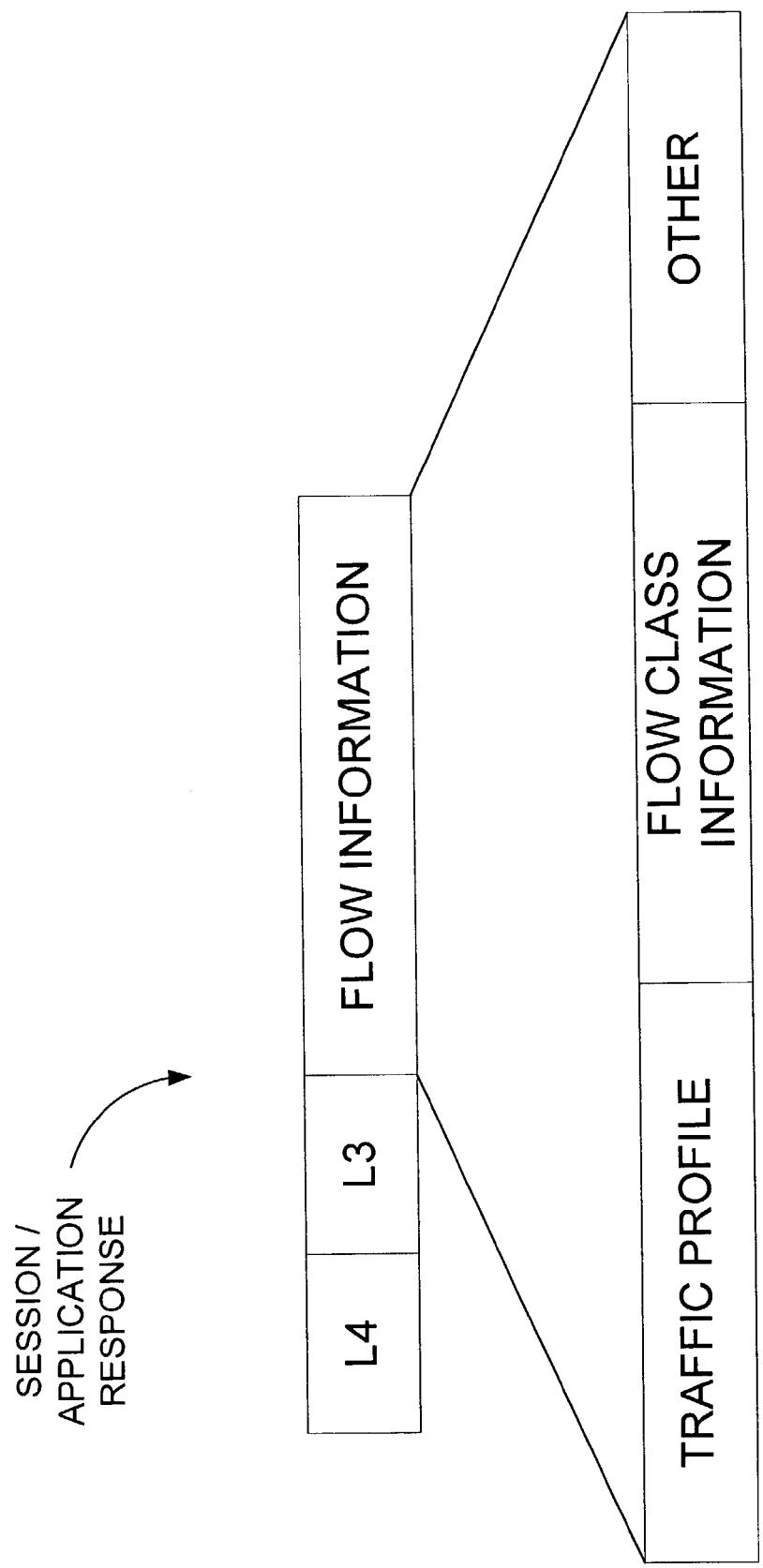
FIG. 21 is a detailed description of a signaling message transmitted as in FIG. 20.

FIG. 20 is a signal flow diagram of operation of a system employing one embodiment. The Access Terminal (AT) initially sets up a PPP connection with the Packet Data Service Node (PDSN). The PPP connection allows the AT to participate in IP communications through the PDSN. The AT requests a session or application service from the Corresponding Node (CN). The CN responds to the request providing information necessary for setting up and maintaining a flow for the requested application or session. The information provided by the CN to the AT is further detailed in FIG. 21. The AT receives the information from the CN and provides all or a subset of the information to the PDSN. The application flow is established and processed with the AT and CN. The QoS information is used by the Access Network (AN) to schedule application flows among the various ATs. The PDSN provides the information as needed to the BTS, wherein the BTS performs the scheduling according to an adaptive weighted proportional fair algorithm. The algorithm is further detailed in FIGS. 22A to 22E.

Figure 22A:
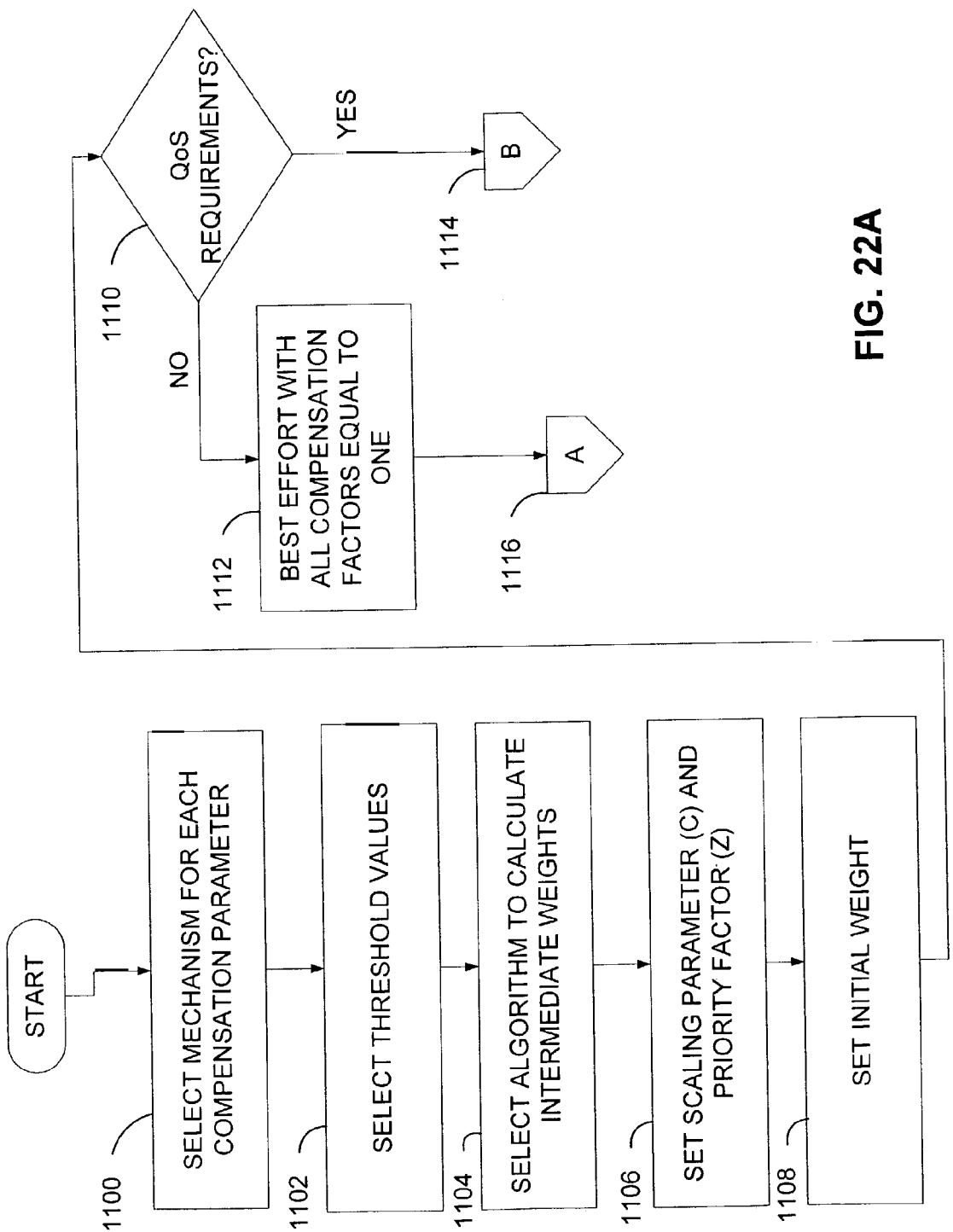
FIG. 22A illustrates a portion of a scheduling algorithm according to one embodiment, including initialization of an application flow.

FIGS. 22A through 22E illustrate processing of an application flow and scheduling of that application flow as part of the active application flows. FIG. 22A is a flow diagram illustrating the initialization and set up for an individual application flow. The process starts at step 1100 to select the mechanisms used for each compensation parameter. The compensation parameters include, but are not limited to: delay ($\Phi$); pending time ($\gamma$); DRC ($\beta$); jitter ($\delta$); and rate ($\alpha$). At step 1102 the threshold values are selected for applicable compensation parameters. Note that compensation parameters may include any parameter of the application flow of significance to the AN. The algorithm calculates intermediate weights at step 1104, wherein the intermediate weights are used in calculating the adaptive weights used for scheduling. At step 1106 the scaling parameter (C) and the priority factor (Z), both used in calculating adaptive weights, are set. At step 1108 the initial weight for this application flow is set. At step 1110 the QoS requirements of the application flow are evaluated. If there are no specified QoS requirements, other than the rate identified by the DRC request, the default condition is used. The default condition is referred to as "Best Effort" as described hereinabove. In this case, the default processing sets all of the compensation factors used for this application flow equal to one. The Best Effort processing continues at steps 1112 and 1116. The resultant scheduling factor calculation is consistent with the proportional fair calculation. If the application flow has QoS requirements, processing continues to step 1114. Steps 1114 and 1116 indicate processing continued in subsequent figures.

Figure 22B:
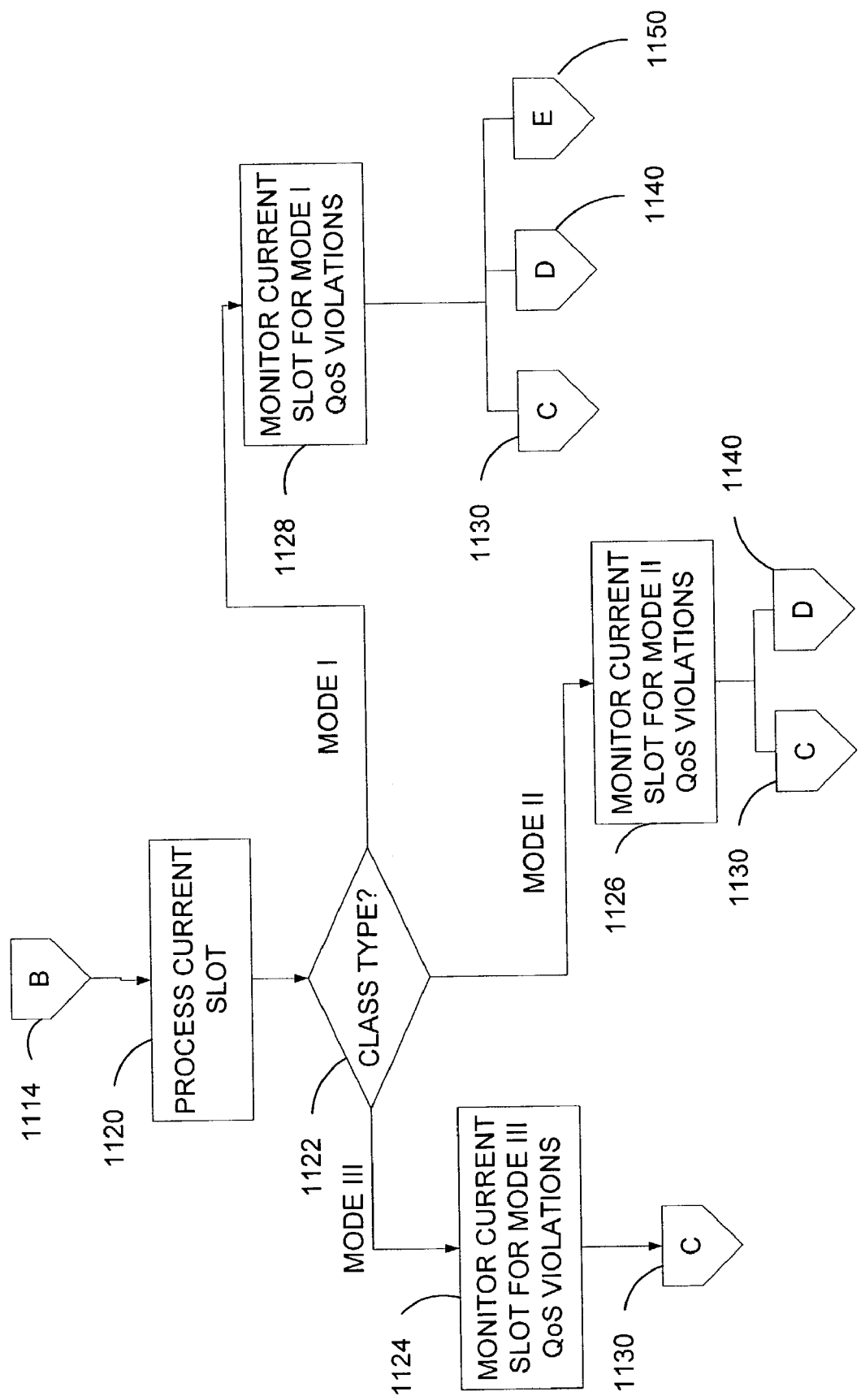
FIG. 22B illustrates a portion of a scheduling algorithm according to one embodiment, including processing of an application flow as a function of class type.

FIG. 22B continues the processing of FIG. 22A from step 1114. At step 1120 processing of the current slot starts. At step 1122 a decision is made as to the class type of the application flow. Mode I is processed at step 1128, Mode II is processed at step 1126, and Mode III is processed at step 1124. Mode I QoS parameters are monitored at step 1128; Mode II QoS parameters are monitored at step 1126; and Mode III QoS parameters are monitored at step 1124. QoS violation checks are then made at steps 1130, 1140, and 1150, further detailed in FIGS. 22C and 22D.

Figure 22C:
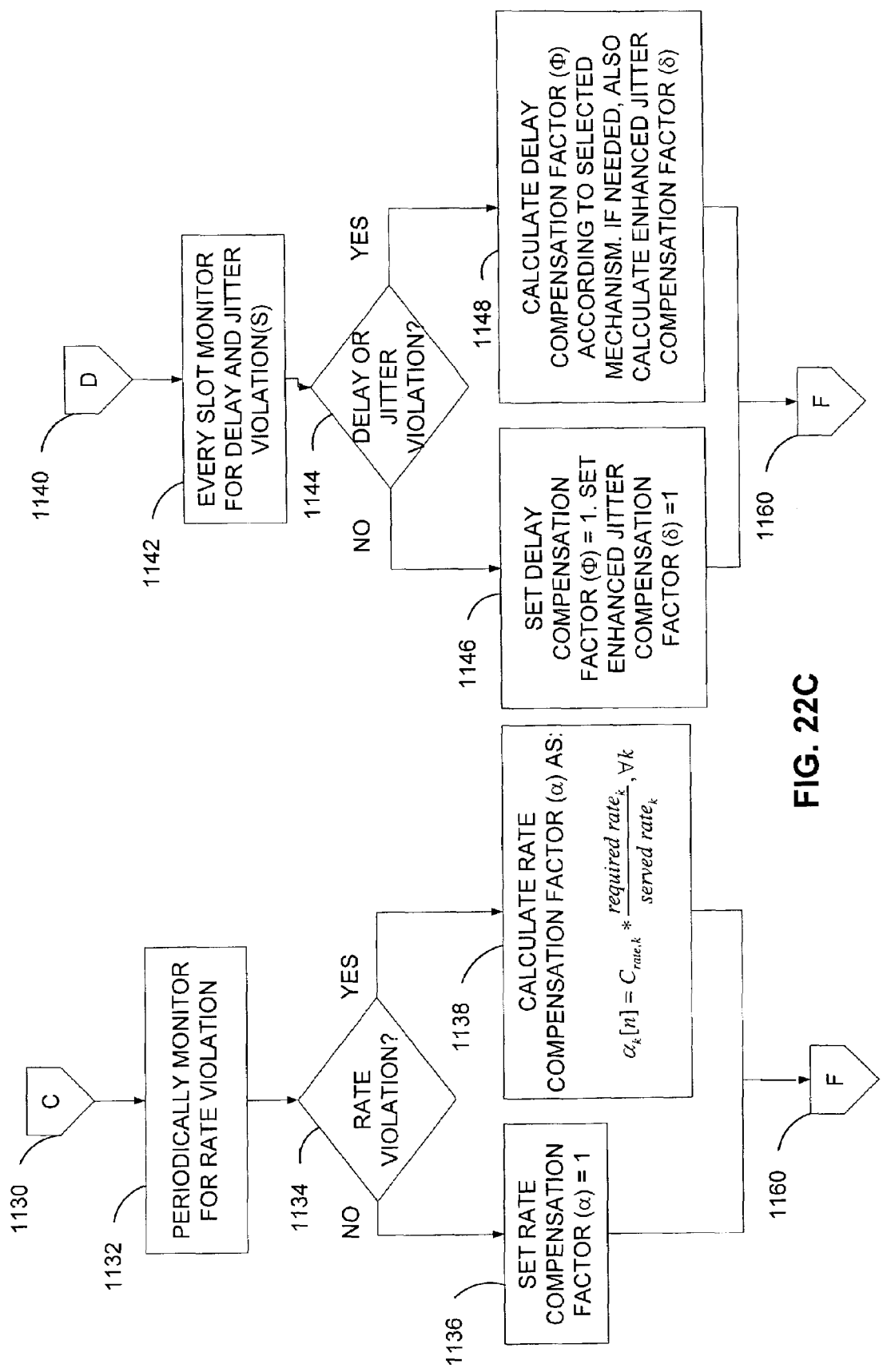
FIG. 22C illustrates a portion of a scheduling algorithm according to one embodiment, including processing of a Mode II application flow and processing of a Mode III application flow.

Processing of the application flow continues at step 1130 of FIG. 22C for a Mode I, II or III application. At step 1132 periodically monitors for rate violations. Note that the rate compensation calculation is performed periodically and used for multiple slots thereafter. If a rate violation is detected at step 1134, processing continues to step 1138 to calculate the rate compensation factor ($\alpha$), given as in Equation (45) hereinabove. Else, the rate compensation factor ($\alpha$) is set equal to one at step 1136. Processing then continues to step 1160 further detailed in FIG. 22E.

Processing of the application flow continues at step 1140 of FIG. 22C for a Mode I or II application. At step 1142 the method monitors for delay and jitter violations at every slot. If a delay and/or jitter violation is detected at step 1144, processing continues to step 1148 to calculate the delay compensation factor ($\Phi$), according to the mechanism selected at initialization. For a Mode I flow which has requested enhanced jitter compensation, the enhanced jitter compensation factor ($\delta$) is also computed. For Mode I flows which have not requested enhanced jitter compensation and for mode II flows, $\delta$ is set equal to 1. Else, the delay compensation factor ($\Phi$) is set equal to one at step 1146 and $\delta$ is set equal to 1. Processing then continues to step 1160 further detailed in FIG. 22E. Note that for a Mode I or II application flow, violation checks may be done in tandem or in parallel. In other words, rate violation and delay/jitter violation checks may be performed successively in time, or concurrently.

Figure 22D:
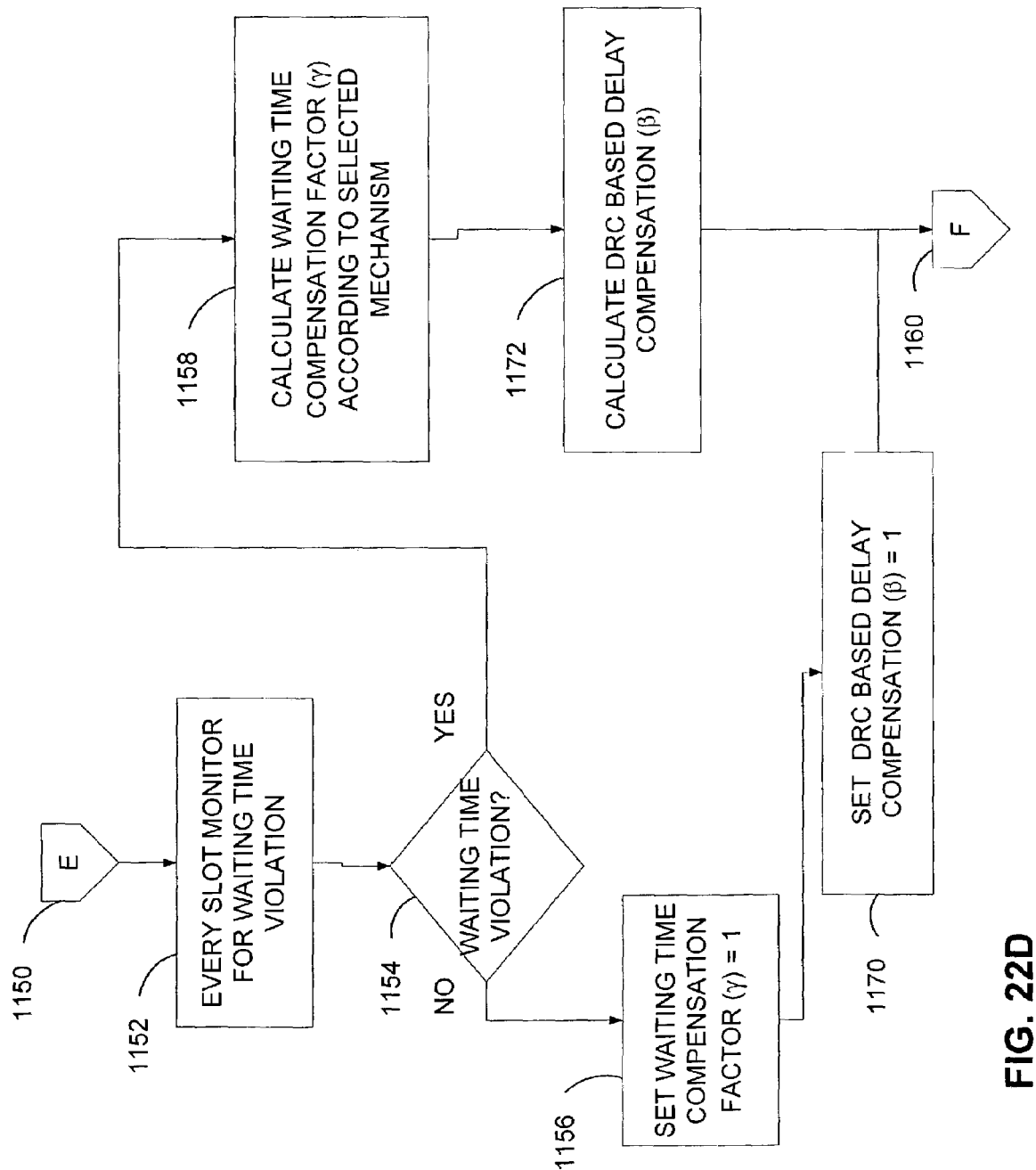
FIG. 22D illustrates a portion of a scheduling algorithm according to one embodiment, including processing of a Mode I application flow.

Processing of the application flow continues at step 1150 of FIG. 22D for a Mode I application. At step 1152 the method monitors for waiting time violations. If a waiting time violation is detected at step 1154, processing continues to step 1158 to calculate the waiting time compensation factor ($\gamma$), according to the mechanism selected at initialization, and to calculate the DRC based delay compensation at step 1172. Else, the waiting time compensation factor ($\gamma$) is set equal to one at step 1156. The DRC based delay compensation is set to 1 at step 1170. Processing then continues to step 1160 further detailed in FIG. 22E. Note that for a Mode I application flow, violation checks may be done in tandem or in parallel. In other words, rate violation, delay/jitter violation, and waiting time checks may be performed successively in time, or concurrently.

Figure 22E:
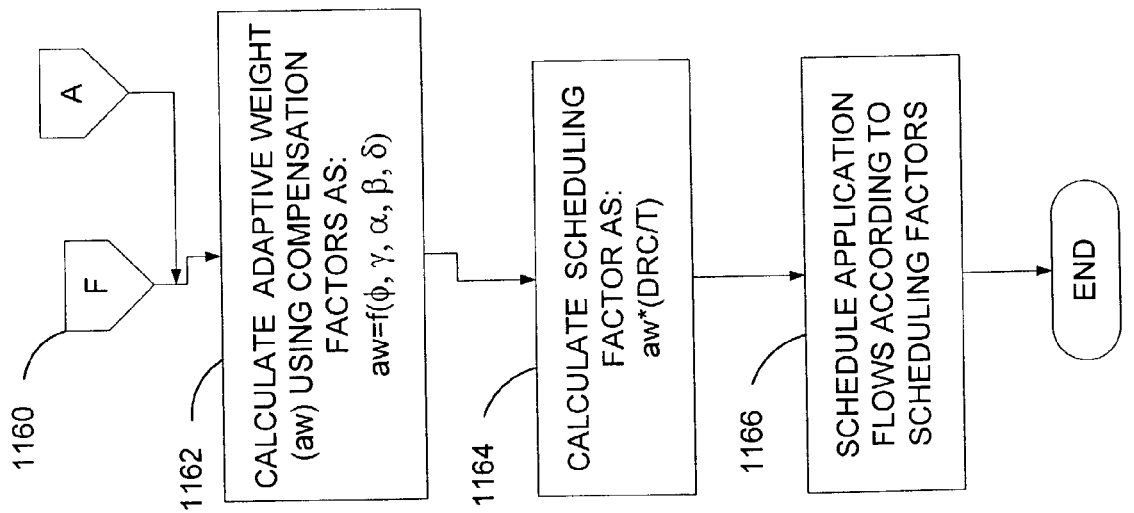
FIG. 22E illustrates a portion of a scheduling algorithm according to one embodiment, including adaptive weighting and scheduling based thereon.

FIG. 22E illustrates processing from step 1160 and step 1116. At step 1162, the algorithm calculates an adaptive weight for the application flow as a function of the QoS parameters and compensation factors, given as:

$$aw = f(\Phi, \gamma, \alpha, \beta, \delta). \quad (56)$$

At step 1164 the scheduling factor or scheduling metric is calculated as:

$$\text{Scheduling Factor} = aw^*(DRC)/T. \quad (57)$$

The scheduling algorithm then schedules application flows according to the scheduling factors calculated for each of the active application flows.

Figure 23:
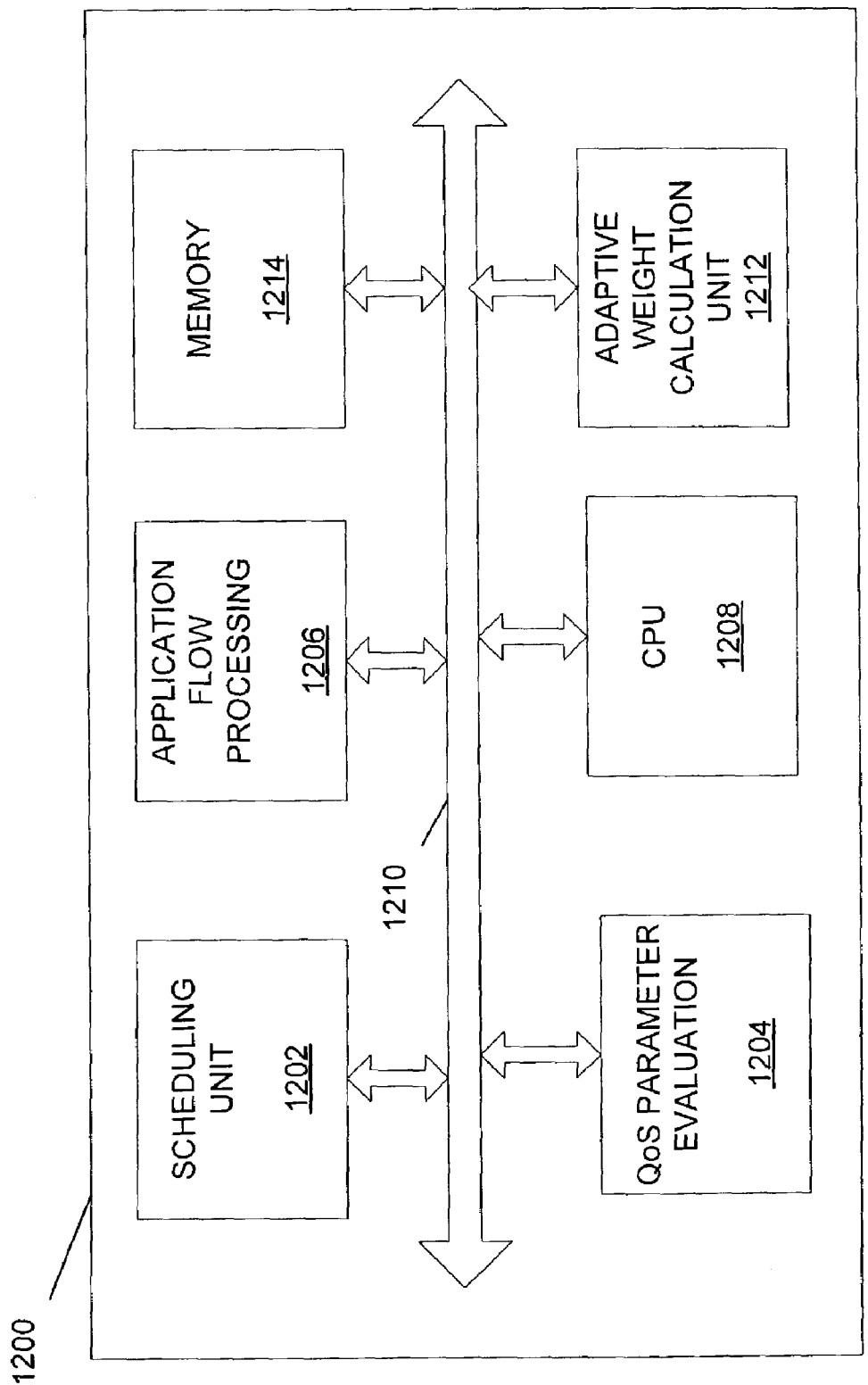
FIG. 23 illustrates a Base Station Transceiver System (BTS) for implementing an algorithm for scheduling application flows using an adaptive weighted algorithm in a wireless communication system.

FIG. 23 illustrates a BTS 1200 adapted for applying a scheduling algorithm according to one embodiment. The BTS 1200 includes a scheduling unit 1202, application flow processing unit 1206, QoS parameter evaluation 1204, adaptive weight calculation unit 1212, and CPU 1208, each coupled to a communication bus 1210. The scheduling unit 1202 performs the scheduling by preparing scheduling factors for each application flow, and then selecting among the various active application flows according to the scheduling factors. The policy and goals of a given system are incorporated into the scheduling algorithm. QoS parameter evaluation 1204 monitors for QoS violations, and provides information to scheduling unit 1202 and weight calculation unit 1212. Application flow processing performs processing including, but not limited to, directing packets to the destination AT, receiving from the destination AT QoS information used for scheduling, and providing such information to the QoS parameter evaluation 1204. The BTS 1200 also includes a memory 1214 for storing intermediate information, and maintaining data used for calculating averages, flow queues, etc. Violation checks are done at the BTS. One embodiment keeps counting the number of bytes sent out for each flow and uses that for a rate violation check. Each packet is time stamped when it arrives at the BSC. The time keeps incrementing as long as the packet remains in the AN, BSC or BTS. The BTS uses this time for detection of threshold violations and then computes delay, waiting time or enhanced jitter compensation functions according to the flow.

Figure 24:
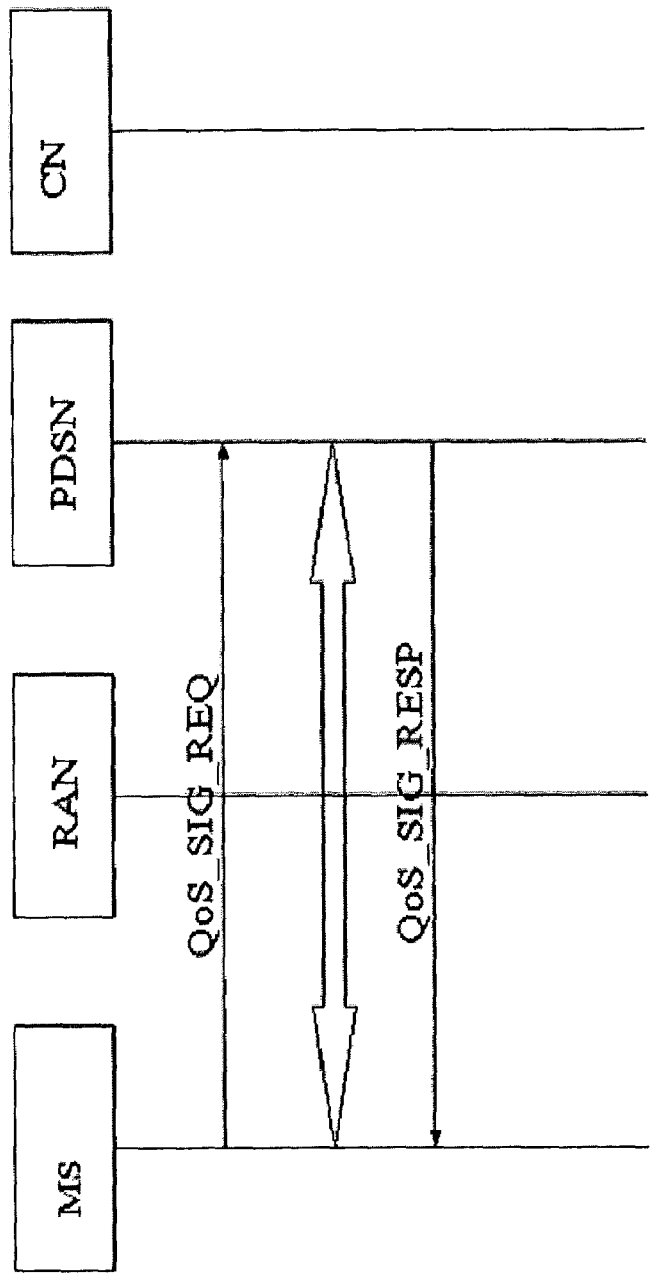
FIGS. 24 and 25 illustrate Quality of Service (QoS) signaling in a communication system.
Figure 25:
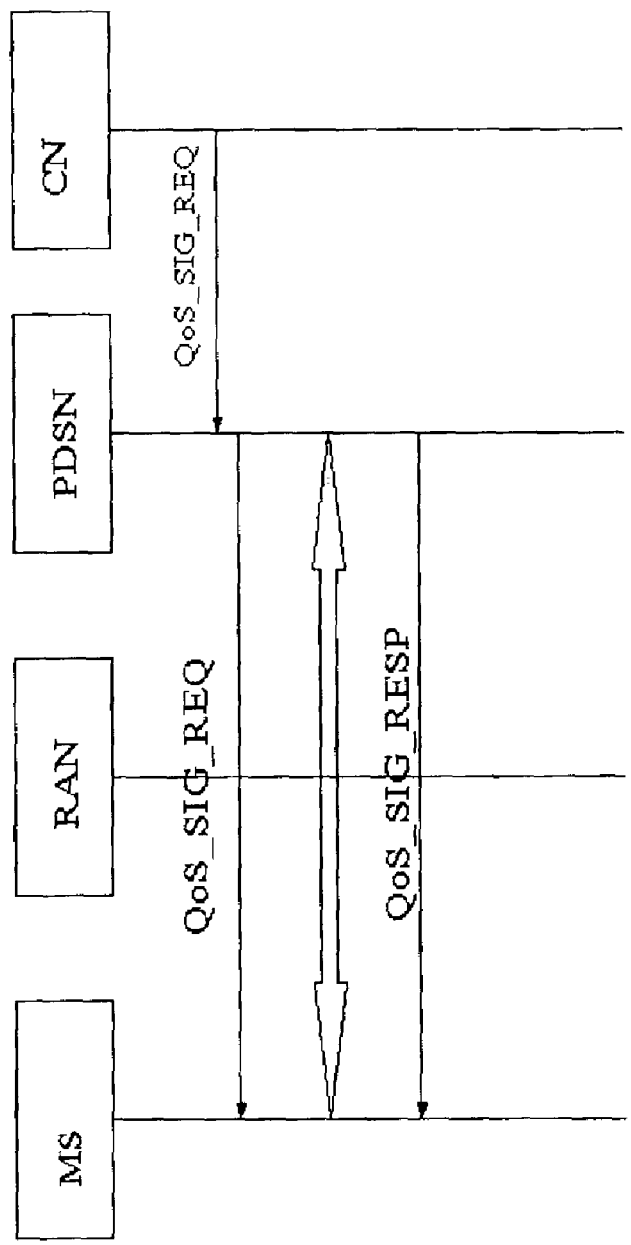

For reference in understanding the above algorithms, methods and signal flow graphs, FIGS. 24 and 25 illustrate generic QoS messages. Two generic messages are illustrated, QoS_SIG_REQ for QoS request and QoS_SIG_RESP for QoS response. A network may use any type of signaling protocol to ensure that the PDSN and the MS have access to the relevant information for each flow. Such signaling messages should map to the illustrated messages. As illustrated, the MS communicates via a Radio Access Network (RAN) with a PDSN and a CN.

The PDSN receives the signaling request in a QoS_SIG_REQ message. The QoS_SIG_REQ message may be generated by either the MS, the CN, or both, depending upon the type of signaling protocol used in a network. If the PDSN receives the message from the MS as well as from the CN, it may merge resource management requests from the two messages to formulate a new QoS_SIG_REQ message for the wireless QoS domain.

Upon receipt of the QoS_SIG_REQ message, the PDSN initiates the process for data and control path establishment for that flow in the wireless QoS domain. The PDSN responds to the MS in a QoS_SIG_RESP message. The PDSN may also send QoS_SIG_RESP to the CN.

Figure 26:
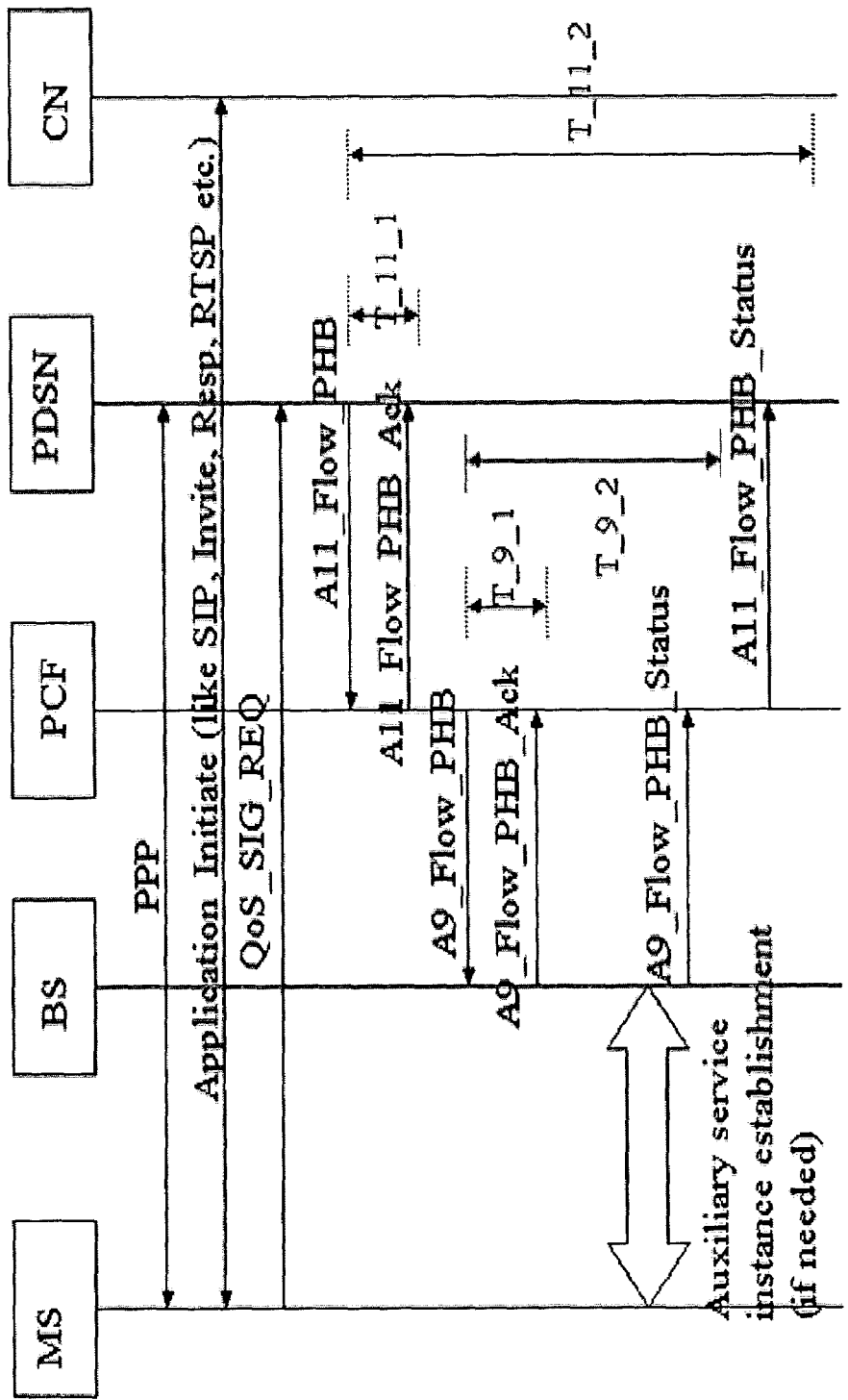
FIGS. 26-28 are signaling diagrams for initiating and processing application flows, illustrating call flow in a communication system.
Figure 27:
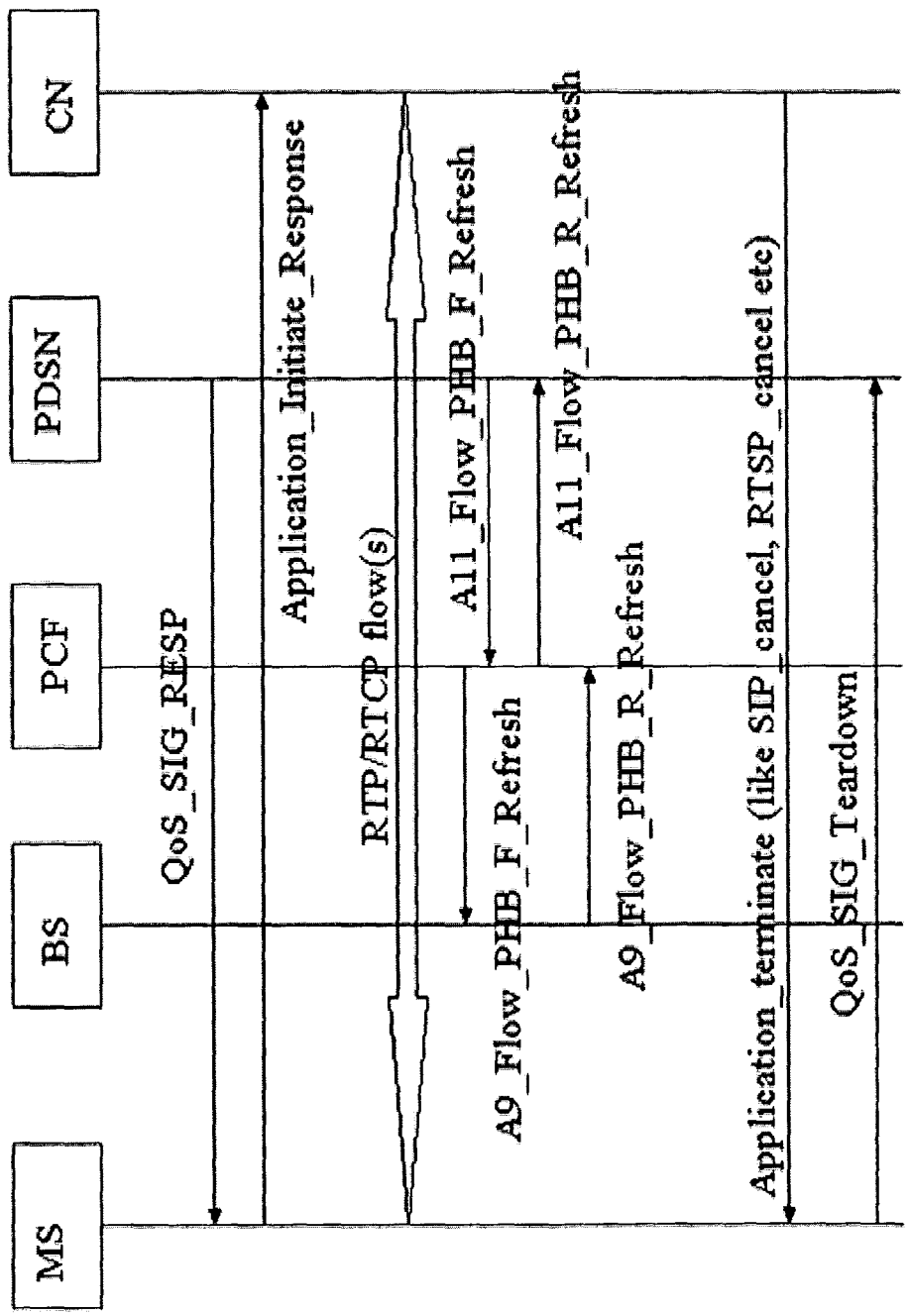
Figure 28:
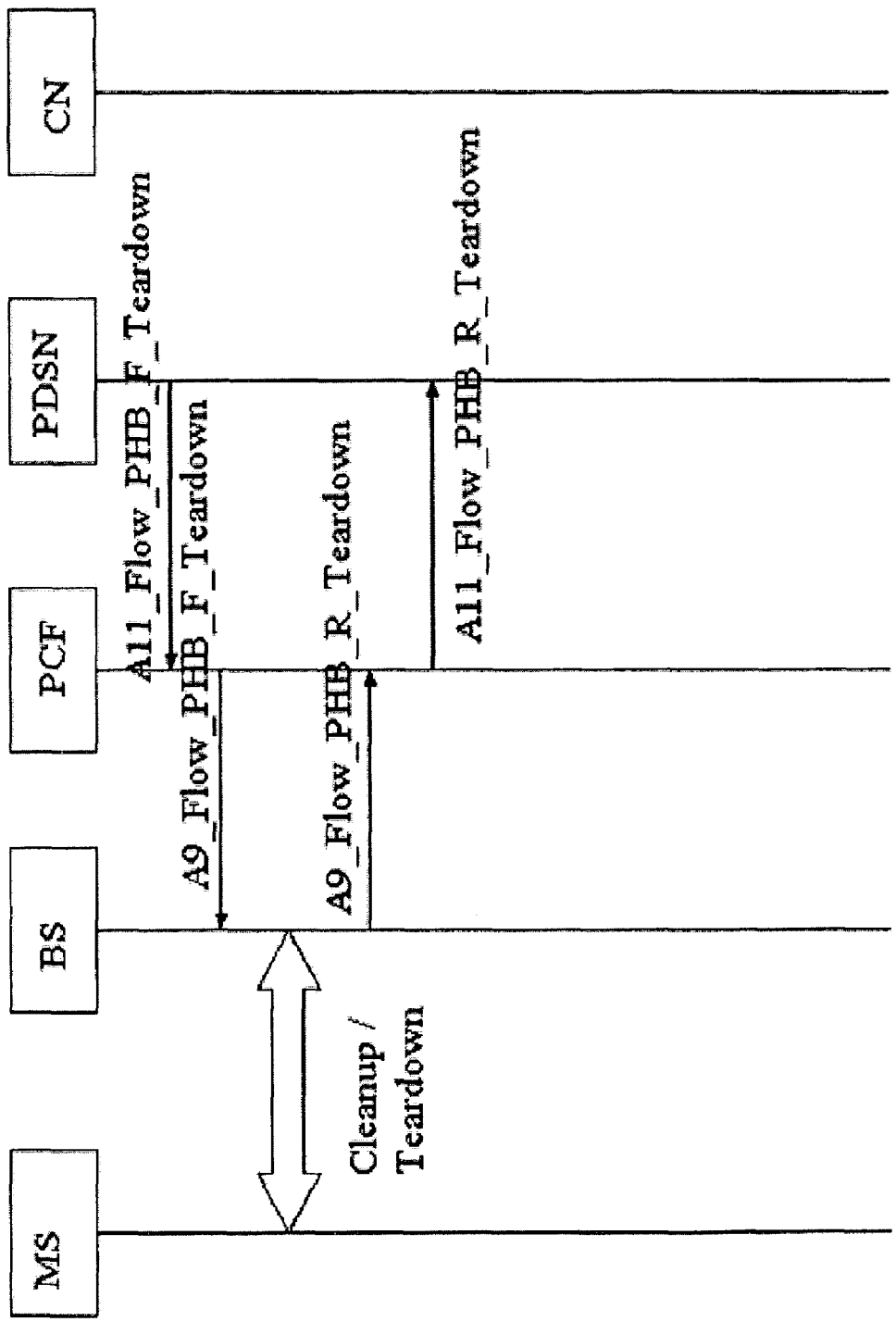

FIGS. 26 to 28 illustrate signaling in setting up an application flow. First, a PPP session is established between mobile (MS) and PDSN. Next, there is an initial exchange of application and session level messages between the MS and the correspondent node (CN). These could be done using existing Internet Engineering Task Force (IETF) protocols such as Session Initiation Protocol (SIP), Real Time Streaming Protocol (RTSP), etc. Once MS has relevant flow classification and QoS related information, it sends a signaling message, QoS_SIG_REQ to PDSN. The PDSN conveys the information to the PCF using an A11_Flow_PHB message. If the PDSN does not get an acknowledgement message, e.g. A11_Flow_PHB_Ack message, back from the PCF within a pre-specified time period, T_11_1, the PDSN may resend the A11_Flow_PHB message. The PCF creates state blocks for the flow and sends the information to the Base Station (BS). At this point, the BS has all the QoS related information (such as traffic profile, QoS profile and flow identifier). The BS uses the information to set up queues and scheduling parameters for the flow. The BS creates an auxiliary service instance over the air (at the BS-MS interface) to carry data for this flow. The result of such processing is sent back to the PCF in an A9_Flow_PHB_Status message and the PCF in turn sends it to the PDSN in an A11_Flow_PHB_Status message.

These messages are sent over a User Datagram Protocol (UDP) protocol from one node to another. Each node starts a timer after sending a message from one node to another and expects the response to be back before the expiration of the timer. If a response is not received within a pre-specified time period, a node may retry sending that message a finite number of times. Once the processing is complete, the PDSN sends a response message, QoS_SIG_RESP, to the MS. The MS then indicates to the CN (using RTSP or SIP response messages) that it is ready to receive data. The CN may start sending data to the MS at this stage. A similar process is followed when the MS or the CN wants to teardown the connestion.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of allocating a resources in a communication system supporting Internet Protocol (IP) applications, the communication system including an Access Network (AN) and a plurality of Access Terminals (ATs), each of the ATs sending a requested data rate to the AN, the method comprising the steps of:

assigning an initial weight for each of the plurality of ATs;

adapting the initial weight to form an adaptive weight value as a function of a Quality of Service (QoS) profile for each application flow active for each of the plurality of ATs;

calculating a ratio of requested data rate to throughput;

applying the adaptive weight value to the ratio to result in an adapted ratio; and selecting an application flow based on the adapted ratio, wherein the selected application flow is to be served by the AN.

2. The method as in claim 1, wherein the adaptive weight value is a function of a service application of the application flow.

3. The method as in claim 2, wherein the QoS profile includes a delay threshold value, wherein the adapting the initial weight comprises:

adapting the initial weight to form an adaptive weight value as a function of a delay threshold compensation for violation of the delay threshold value.

4. The method as in claim 2, wherein the QoS profile includes a wait time threshold value for data packets pending in a transmission queue in the AN, wherein the adapting the initial weight comprises:

adapting the initial weight to form an adaptive weight value as a function of a wait time compensation for violation of the wait time threshold.

5. The method as in claim 2, wherein the QoS profile includes an enhanced jitter threshold, wherein adapting the initial weight comprises:

adapting the initial weight to form an adaptive weight value as a function of a enhanced jitter compensation factor for violation of the enhanced jitter threshold.

6. The method as in claim 2, wherein the QoS profile includes a data rate requirement, wherein the adapting the initial weight comprises:

adapting the initial weight to form an adaptive weight value as a function of a rate compensation factor for violation of the data rate requirement.

7. The method as in claim 1, wherein adapting the initial weight to form an adaptive weight value further comprises:

calculating the adaptive weight value as:

$$aw = f(\phi, \gamma, \alpha, \beta, \delta),$$

wherein $\phi$ corresponds to a delay compensation factor, $\gamma$ corresponds to a waiting time compensation factor, $\beta$ corresponds to a requested data rate compensation factor, and $\delta$ corresponds to an enhanced jitter compensation factor.

8. The method as in claim 7, wherein adapting the initial weight to form an adaptive weight value further comprises:
calculating the adaptive weight value as:

$$aw=\phi*\gamma*\alpha*\beta*\delta,$$

wherein the * operator is multiplication.

9. The method as in claim 8, further comprising:
monitoring each application flow for quality of service violations.

10. The method as in claim 9, wherein monitoring further comprises:
monitoring for delay and jitter violations every transmission slot.

11. The method of claim 9, wherein monitoring further comprises:
monitoring for rate violations periodically.

12. The method as in claim 11, wherein the QoS profile includes a data rate requirement, wherein the adapting the initial weight comprises:
adapting the initial weight to form an adaptive weight value as a function of a rate compensation factor for violation of the data rate requirement,
wherein the rate compensation factor is applied for a plurality of transmission slots.

13. The method as in claim 8, wherein a compensation factor is set equal to one when no corresponding violations occur.

14. The method as in claim 8, wherein an application flow is assigned to a mode based on quality of service requirements, and wherein the application flow is monitored for the quality of service requirements associated with the assigned mode.

15. The method as in claim 1, wherein the adapted ratio is given as:

$$\text{Scheduling Factor}=aw*(DRC)/T,$$

wherein DRC corresponds to a requested data rate from a destination Access Terminal (AT) for an application flow, T corresponds to a throughput of the application flow, and aw corresponds to the adaptive weight for the application flow.

16. A method for scheduling resources in a wireless communication system supporting packet data application flows, the method comprising:
selecting at least one compensation factor for a quality of service parameter associated with an application flow,
calculating the at least one compensation factor based on a the quality of service parameter;
calculating a weight for the application flow as a function of the at least one compensation factor;
calculating a scheduling factor using the weight; and
scheduling the application flow based on the scheduling factor.

17. The method as in claim 16, wherein the selecting comprises:
determining a mode of the application flow;
selecting the at least one compensation factor based on the mode;
monitoring the quality of service parameter associated with the at least one compensation factor; and
if no violation of the quality of service parameter occurs, setting the at least one compensation factor to a default value, the default value providing a default compensation value.

18. The method as in claim 17, wherein the mode is determined by a set of quality of service requirements for the application flow.

19. The method as in claim 18, wherein the at least one compensation factor includes a rate compensation.

20. The method as in claim 18, wherein the at least one compensation factor includes a delay compensation.

21. The method as in claim 18, wherein the at least one compensation factor includes a waiting time compensation.

22. An Access Network (AN) apparatus in a wireless communication system supporting application flows having various quality of service requirements, the apparatus comprising:
application flow processing unit adapted to receive packets of an application flow and process the packets for transmission to an Access Terminal (AT);
quality of service monitoring unit adapted to receive the packets of the application flow and evaluate quality of service requirements for the application flow;
adaptive weight calculation unit adapted to generate an adaptive weight for the application flow according to evaluation of the quality of service requirements for the application flow; and
scheduling unit adapted to schedule transmissions of the application flow by applying the adaptive weight.

23. The apparatus of claim 22, wherein quality of service requirements comprise data rate requirements.

24. The apparatus of claim 23, wherein quality of service requirements further comprise jitter requirements.

25. The apparatus of claim 23, wherein quality of service requirements further comprise waiting time requirements for packets pending in the apparatus for transmission.

26. The apparatus of claim 22, wherein the scheduling unit is further adapted to schedule transmissions using a proportional fair scheduling algorithm.

27. The apparatus of claim 26, wherein the scheduling unit is further adapted for:
calculating a ratio of requested data rate to throughput for the application flow;
applying the adaptive weight value to the ratio to result in an adapted ratio; and
selecting an application flow based on the adapted ratio, wherein the selected application flow is to be served by the AN.

28. The apparatus as in claim 27, wherein the adaptive weight calculation unit is further adapted for:
calculating the adaptive weight value as:

$$aw=f(\phi,\gamma,\alpha,\beta,\delta),$$

wherein $\phi$ corresponds to a delay compensation factor, $\gamma$ corresponds to a waiting time compensation factor, $\beta$ corresponds to a requested data rate compensation factor, and $\delta$ corresponds to a jitter compensation factor.

29. The apparatus as in claim 28, further comprising:
memory storage unit adapted for storing a plurality of queues corresponding to an application flow, including a transmission queue and a retransmission queue.

30. An apparatus for allocating a resources in a communication system supporting Internet Protocol (IP) applications, the communication system including an Access Network (AN) and a plurality of Access Terminals (ATs), each of the ATs sending a requested data rate to the AN, the apparatus comprising:
means for assigning an initial weight for each of the plurality of ATs;
means for adapting the initial weight to form an adaptive weight value as a function of a Quality of Service (QoS) profile for each application flow active for each of the plurality of ATs;

means for calculating a ratio of requested data rate to throughput;

means for applying the adaptive weight value to the ratio to result in an adapted ratio; and means for selecting an application flow based on the adapted ratio, wherein the selected application flow is to be served by the AN.

31. The apparatus as in claim 30, wherein the adaptive weight value is a function of a service application of the application flow.

32. The apparatus as in claim 31, wherein the QoS profile includes a delay threshold value, wherein the means for adapting the initial weight comprises:

means for adapting the initial weight to form an adaptive weight value as a function of a delay threshold compensation for violation of the delay threshold value.

33. The apparatus as in claim 31, wherein the QoS profile includes a wait time threshold value for data packets pending in a transmission queue in the AN, wherein the adapting the initial weight comprises:

means for adapting the initial weight to form an adaptive weight value as a function of a wait time compensation for violation of the wait time threshold.

34. The apparatus as in claim 31, wherein the QoS profile includes a jitter threshold, wherein means for adapting the initial weight comprises:

means for adapting the initial weight to form an adaptive weight value as a function of a jitter compensation factor for violation of the jitter threshold.

35. The apparatus as in claim 31, wherein the QoS profile includes a data rate requirement, wherein the means for adapting the initial weight comprises:

means for adapting the initial weight to form an adaptive weight value as a function of a rate compensation factor for violation of the data rate requirement.

36. The apparatus as in claim 30, wherein means for adapting the initial weight to form an adaptive weight value further comprises:

means for calculating the adaptive weight value as:

$$aw = f(\phi, \gamma, \alpha, \beta, \delta),$$

wherein $\phi$ corresponds to a delay compensation factor, $\gamma$ corresponds to a waiting time compensation factor, $\beta$ corresponds to a requested data rate compensation factor, and $\delta$ corresponds to a jitter compensation factor.

37. The apparatus as in claim 36, wherein means for adapting the initial weight to form an adaptive weight value further comprises:

means for calculating the adaptive weight value as:

$$aw = \phi * \gamma * \alpha * \beta * \delta,$$

wherein the * operator is multiplication.

38. The apparatus as in claim 37, further comprising:

means for monitoring each application flow for quality of service violations.

39. The apparatus as in claim 38, wherein means for monitoring further comprises:

means for monitoring for delay and jitter violations every transmission slot.

40. The apparatus of claim 38, wherein means for monitoring further comprises:

means for monitoring for rate violations periodically.

41. The apparatus as in claim 40, wherein the QoS profile includes a data rate requirement, wherein the means for adapting the initial weight comprises:

means for adapting the initial weight to form an adaptive weight value as a function of a rate compensation factor for violation of the data rate requirement, wherein the rate compensation factor is applied for a plurality of transmission slots.

42. The apparatus as in claim 37, wherein a compensation factor is set equal to one when no corresponding violations occur.

43. The apparatus as in claim 37, wherein an application flow is assigned to a mode based on quality of service requirements, and wherein the application flow is monitored for the quality of service requirements associated with the assigned mode.

44. The apparatus as in claim 30, wherein the adapted ratio is given as:

$$\text{Scheduling Factor} = aw*(DRC)/T,$$

wherein DRC corresponds to a requested data rate from a destination Access Terminal (AT) for an application flow, T corresponds to a throughput of the application flow, and aw corresponds to the adaptive weight for the application flow.

45. A processor-readable medium, comprising:

instructions for causing a processor to assign an initial weight for each of the plurality of ATs;

instructions for causing a processor to adapt the initial weight to form an adaptive weight value as a function of a Quality of Service (QoS) profile for each application flow active for each of the plurality of ATs;

instructions for causing a processor to calculate a ratio of requested data rate to throughput;

instructions for causing a processor to apply the adaptive weight value to the ratio to result in an adapted ratio; and instructions for causing a processor to select an application flow based on the adapted ratio, wherein the selected application flow is to be served by the AN.

46. A processor-readable medium, comprising:

instructions for causing a processor to select at least one compensation factor for a quality of service parameter associated with an application flow, instructions for causing a processor to calculate the at least one compensation factor based on a the quality of service parameter;

instructions for causing a processor to calculate a scheduling factor using the weight; and instructions for causing a processor to schedule the application flow based on the scheduling factor.

* * * * *